(12) United States Patent
Shiga et al.

(10) Patent No.: US 7,475,902 B2
(45) Date of Patent: Jan. 13, 2009

(54) STEERING WHEEL

(75) Inventors: Ichizo Shiga, Aichi-ken (JP); Michihisa Asaoka, Aichi-ken (JP); Naohiko Ishiguro, Aichi-ken (JP); Masanari Sakamoto, Aichi-ken (JP); Tsutomu Ishii, Aichi-ken (JP); Yoshinori Masatsugu, Aichi-ken (JP); Akira Tomita, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 111 days.

(21) Appl. No.: 11/727,595

(22) Filed: Mar. 27, 2007

(65) Prior Publication Data
US 2007/0235995 A1 Oct. 11, 2007

(30) Foreign Application Priority Data
Mar. 30, 2006 (JP) .............................. 2006-094974
Mar. 30, 2006 (JP) .............................. 2006-094995
Feb. 1, 2007 (JP) .............................. 2007-023430

(51) Int. Cl.
*B60R 21/16* (2006.01)
(52) U.S. Cl. ............................. 280/731; 74/492; 74/552
(58) Field of Classification Search ................. 280/731; 74/492, 493, 495, 496, 552
See application file for complete search history.

(56) References Cited

U.S. PATENT DOCUMENTS

| 3,890,516 | A  | * | 6/1975  | Widdowson et al. | ......... 310/111 |
|---|---|---|---|---|---|
| 4,893,520 | A  | * | 1/1990  | Endo et al. | .................... 74/552 |
| 5,156,243 | A  | * | 10/1992 | Aoki et al. | .................. 192/218 |
| 5,244,230 | A  | * | 9/1993  | Komiya et al. | ............... 280/777 |
| 7,185,915 | B2 | * | 3/2007  | Fujita et al. | .................. 280/731 |
| 7,404,343 | B2 | * | 7/2008  | Andersson et al. | ............ 74/552 |
| 2001/0039851 | A1 | * | 11/2001 | Hosoi et al. | .................... 74/552 |
| 2005/0223843 | A1 | * | 10/2005 | Andersson et al. | ............ 74/552 |
| 2007/0046013 | A1 | * | 3/2007  | Bito | ........................... 280/777 |

FOREIGN PATENT DOCUMENTS

| JP | A-2001-277983 | 10/2001 |
|---|---|---|
| JP | A-2003-306122 | 10/2003 |

* cited by examiner

*Primary Examiner*—Toan C To
(74) *Attorney, Agent, or Firm*—Posz Law Group, PLC

(57) ABSTRACT

The steering wheel includes a wheel body and an airbag apparatus disposed on top of a boss. The wheel body is divided into a shaft side division joined to the steering shaft, and a ring side division disposed proximate the ring. The ring side division is rotatable with respect to the shaft side division such that a ring plane is aligned generally vertically. The boss includes an actuator that rotates and moves the ring side division to align the ring plane generally vertically. The actuator completes its operation to align the ring plane generally vertically by the time a driver contacts the inflated airbag in the course of forward motion.

20 Claims, 36 Drawing Sheets

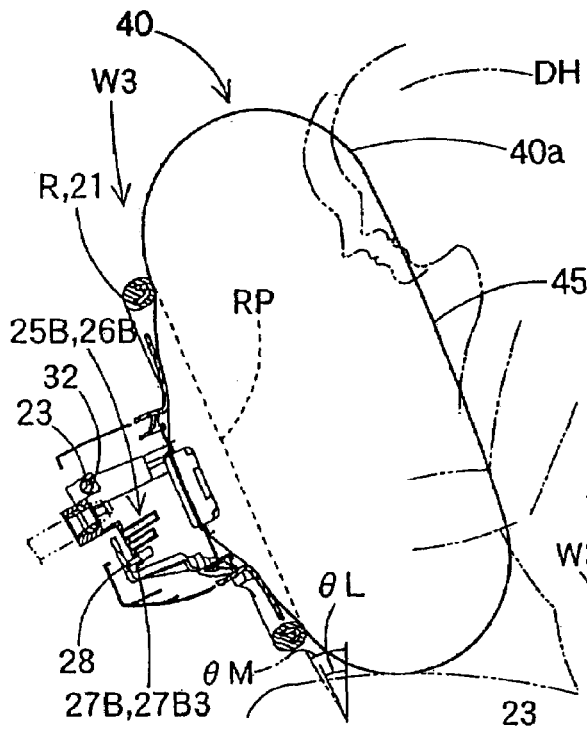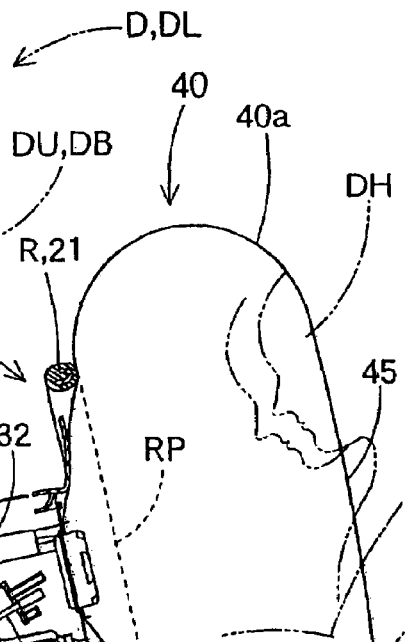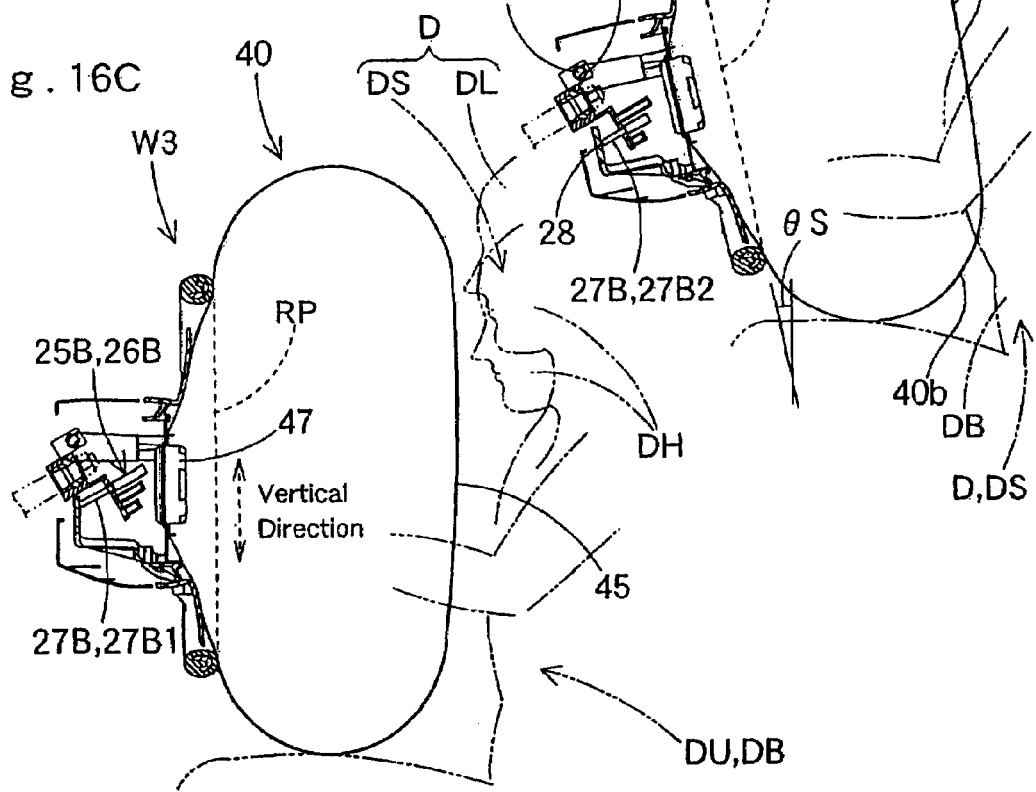

Fig. 26A
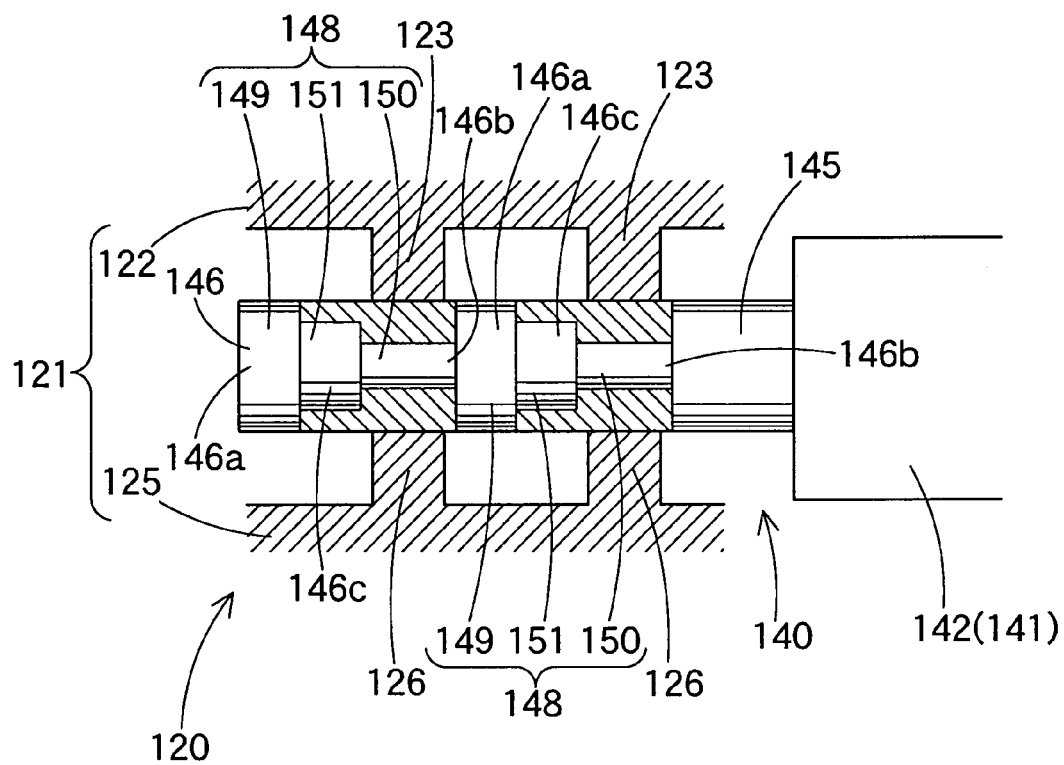
Fig. 26B
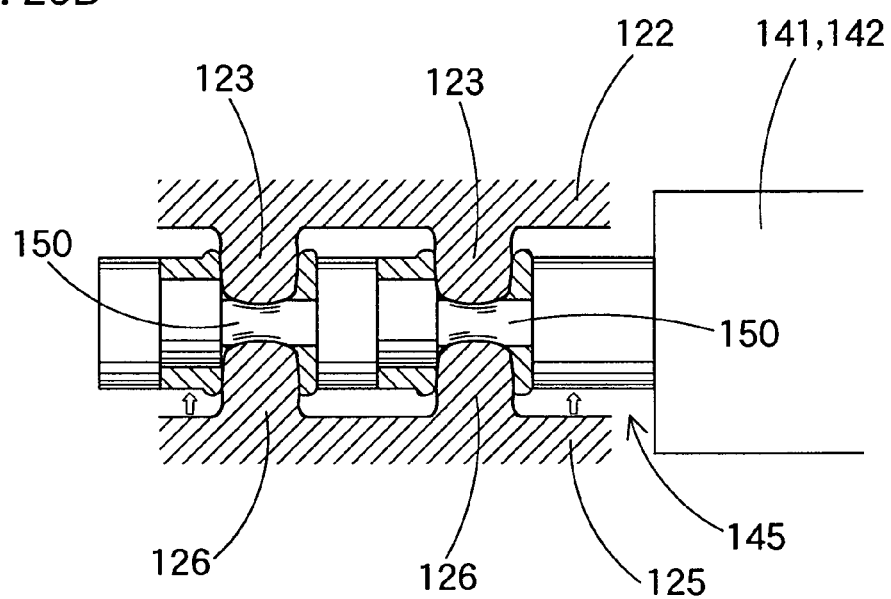

Fig.27A
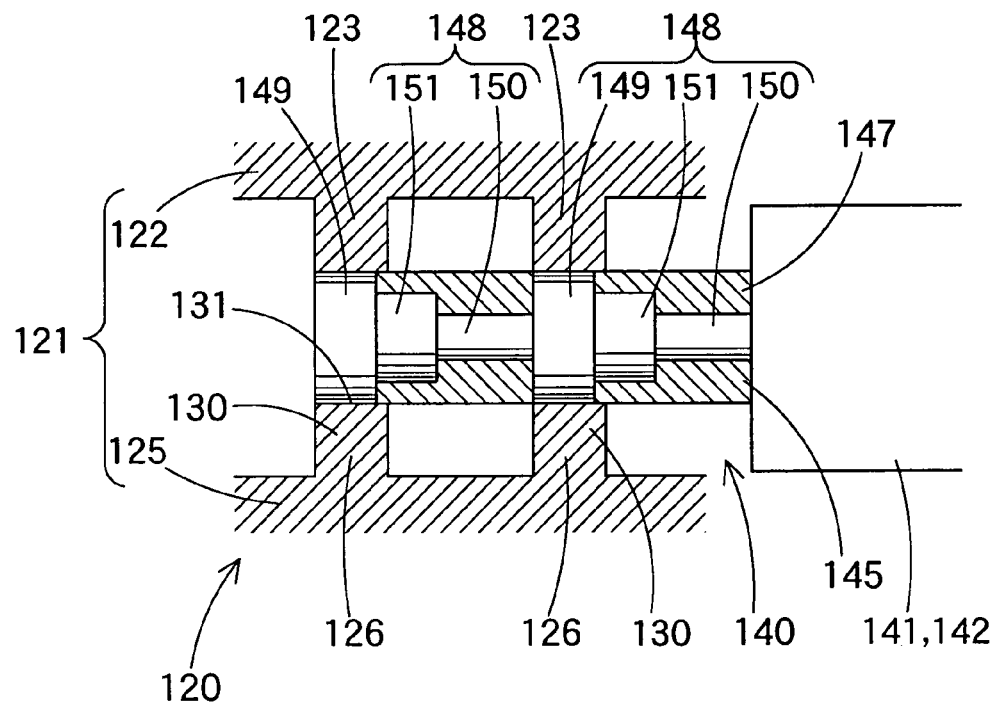
Fig.27B
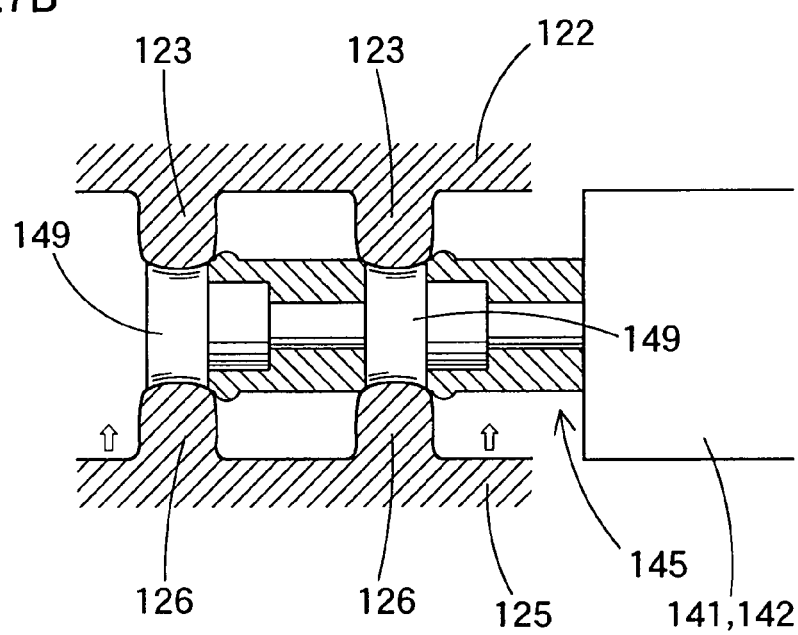

Fig. 31A
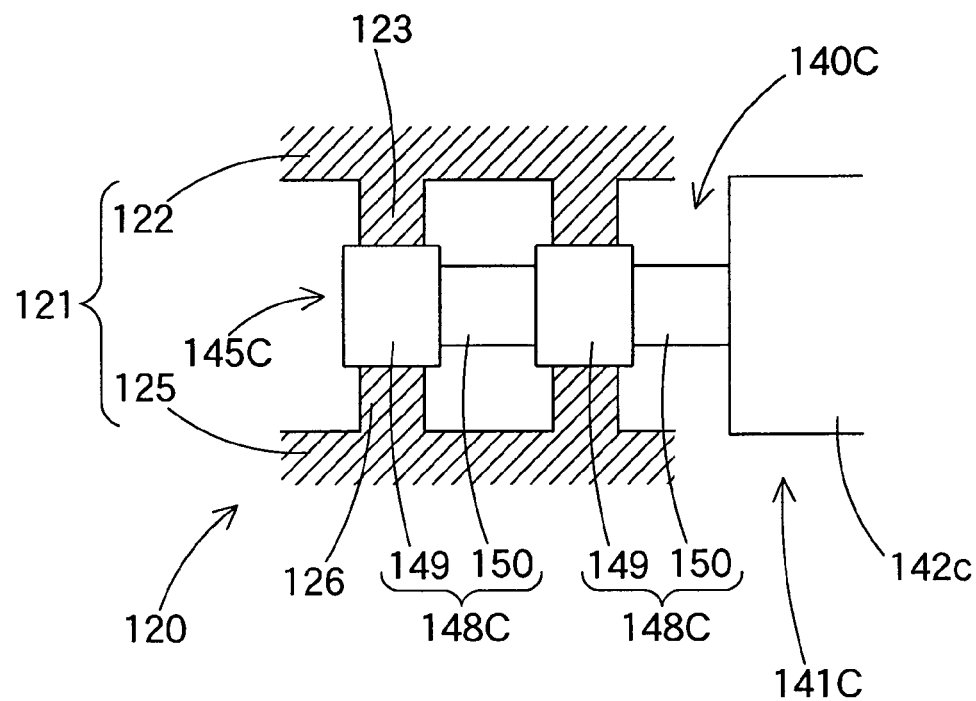
Fig. 31B
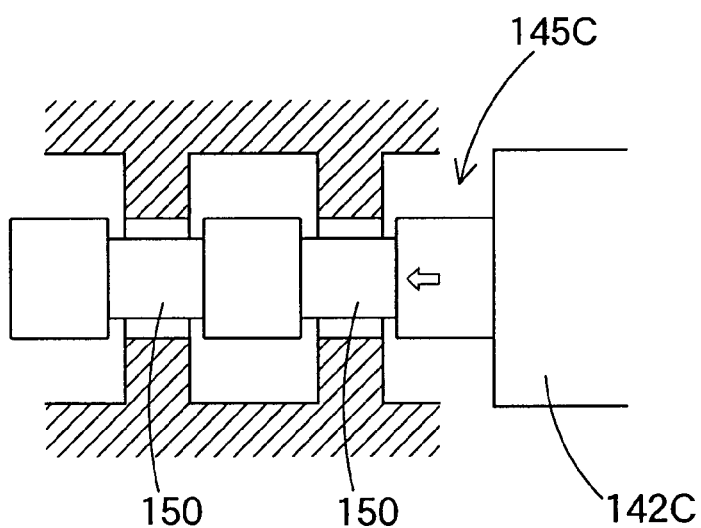

STEERING WHEEL

The present application claims priority from Japanese Patent Application No. 2006-094974 of Shiga et al., filed on Mar. 30, 2006, Japanese Patent Application No. 2006-094995 of Shiga et al., filed on Mar. 30, 2006, Japanese Patent Application No. 2007-023430 of Shiga et al., filed on Feb. 1, 2007 the disclosures of which are hereby incorporated into the present application by reference.

BACKGROUND OF THE INVENTION

1. Field of the Invention

The present invention relates to a steering wheel used to steer a vehicle, and more particularly, relates to a steering wheel whose ring plane constituted by a top plane of steering wheel can be aligned along generally vertical direction.

2. Description of Related Art

A conventional steering wheel includes a wheel body and an airbag apparatus for protection of a driver. The wheel body includes a ring for holding at steering, a boss disposed at the center of the ring and joined with a steering shaft and on which boss the airbag apparatus is disposed, and a spoke connecting the ring and the boss. The wheel body is coupled to the steering shaft in such a manner that a ring plane, i.e. a top plane, of the ring is disposed diagonally downward and rearward. JP2001-277983 A shows such a steering wheel wherein an airbag apparatus is activated upon an impact to inflate an airbag such that the airbag expands from inside of the ring toward outside, and eventually is formed greater than the outer diameter of the ring on top of the ring, thereby preventing a driver from hitting against the ring.

Another steering wheel system is shown in JP 2003-306122 A, wherein the ring supports an inflated airbag in such a stable manner that the airbag hardly moves out of place in the event of bumping against the driver. In this steering wheel system, whenever an airbag apparatus is activated, the ring plane or top plane of the ring is mandatorily aligned along the vertical direction. That is, a front part of the ring is raised upward. Accordingly, the front side of the inflated airbag is stably supported by the front part of the raised ring, which prevents a protection plane of the airbag facing toward the driver from moving forward at its upper edge and enables the airbag to receive the driver with sufficient cushioning property.

However, in the latter steering wheel system, the rotational displacement of the ring plane is conducted at the location of a tilt mechanism arranged on the steering shaft below the steering wheel. With this structure, the turning radius of the movement of the ring plane, that is, the radius from the tilt mechanism to the ring plane is large and so is the downward displacement of the ring before the ring plane is brought close to the upright orientation. Consequently, the moved ring is likely to narrow a space around knees of the driver.

JP 2001-277983 a mentioned above also describes a feature of a steering wheel wherein the entire ring plane aligns itself along the vertical direction by deformation so it is expanded in parallel to the front side of upper body of the driver when the steering wheel contacts with the driver upon an impact. Specifically, when the steering wheel contacts with the driver moving forward, the entire ring plane, which is usually diagonally oriented with the front part arranged upward and rear part downward, is aligned vertically by plastically deforming its predetermined portion, thereby absorbing an impact energy.

In the above steering wheel, however, the portion to be deformed upon the alignment of the ring has a uniform absorption property of the impact energy. The absorption property is not adjustable depending upon the size of a driver, the distance from steering wheel to the seated position of the driver, or the speed of vehicle.

SUMMARY OF THE INVENTION

A first object of the present invention is to provide a steering wheel wherein a downward displacement of a ring is suppressed when a ring plane is aligned along the vertical direction while the wheel supporting an airbag in a stable manner.

A second object of the present invention is to provide a steering wheel in which an absorption property of impact energy is adjustable at the alignment of the steering wheel along the vertical direction.

A steering wheel attaining the first object of the present invention includes a wheel body joined to a steering shaft and an airbag apparatus. The wheel body includes as components a ring for holding at steering operation, a boss disposed proximate a center of the ring to be coupled to the steering shaft, and a spoke connecting the ring and the boss. When the boss is coupled to the steering shaft, a ring plane on top of the ring is disposed diagonally downward and rearward. The wheel body is divided into a shaft side division disposed proximate the steering shaft and joined to the steering shaft, and a ring side division disposed proximate the ring, the ring side division being rotatable with respect to the shaft side division such that the ring plane is aligned along the vertical direction. The boss includes a rotation drive mechanism that rotates the ring side division to align the ring plane generally vertically. The air bag apparatus includes an inflatable airbag and is disposed on top of the boss of the wheel body. The airbag, when inflated, expands from inside of the ring toward outside of the ring, and is formed greater than an outer diameter of the ring. The rotation drive mechanism completes its operation to align the ring plane generally along the vertical direction by the time a driver contacts the inflated airbag in the course of forward motion.

In the above steering wheel, the airbag apparatus is activated to inflate the airbag, and the airbag expands from inside of the ring toward outside, and eventually is formed greater than the outer diameter of the ring on top of the ring. Since the rotation drive mechanism has completed its operation to rotate the ring side division to align the ring plane vertically by this point, the inflated airbag receives an upper body (chest and abdomen) of a driver softly with sufficient cushioning property by its wide protecting plane expanding along the vertical direction parallel to the ring plane.

Moreover, a back side of the airbag is supported by the ring entirely along the circumference of the ring. Accordingly, even if the airbag receives a driver moving forward, it is prevented from moving out of place, e.g. moving upward, downward, leftward or rightward, so that the airbag receives the driver in a stable manner while covering the ring.

Furthermore, the rotation drive mechanism serving to rotate the ring side division to align the ring plane vertically is mounted on the steering wheel body itself, not on the steering shaft away downward from the wheel body. This structure makes the turning radius of the ring side division small, and therefore, when the ring is rotated, the downward displacement of the ring is kept to a minimum.

In addition, since a rear portion of the ring is moved forward with the small turning radius of the ring when the rotation drive mechanism is activated, the inflating airbag is easily deployed in a space between an abdomen of the driver and a lower (or rear portion before being rotated) portion of the ring even if the driver was located proximate the ring. Accordingly, the inflated airbag is capable of locating its lower portion in front of the driver's abdomen for covering the rear side of the lower portion of the ring.

Therefore, in the first steering wheel of the present invention, the downward displacement of the ring is suppressed when the ring plane is aligned along the vertical direction while the wheel supporting the airbag in a stable manner. Moreover, the airbag is smoothly deployed between a driver and the ring even provided the driver is positioned proximate the ring.

It is desired that the rotation drive mechanism includes a rotary axis about which the ring rotates, which rotary axis extending along the lateral direction when the steering wheel is steered straight ahead, and that the rotation drive mechanism is activated only when the steering wheel is steered straight ahead.

Collisions of vehicle often take place when the steering wheel is being steered straight ahead, and frontal collisions are most likely. The above arrangement aligns the ring plane vertically without tilting toward the lateral direction upon such frontal collisions.

Of course, the rotation drive mechanism may be constructed to be activated exclusively when the vehicle makes a frontal collision during straight-ahead driving.

If the rotation drive mechanism further includes an actuator for pressing and rotating the ring side division downward in addition to the rotary axis extending along the lateral direction, it is desired that the rotary axis is disposed forward relative to the steering shaft whereas the actuator is disposed rearward relative to the steering shaft.

If the actuator taking up much space is disposed rearward of the steering shaft whereas the small rotary axis and its bearings are disposed forward of the shaft like above, a space between a front part of the boss and a front part of the ring will not be narrowed, so that a fair sight is secured in viewing gauges of vehicle through the space. Moreover, since the actuator is constructed to press the ring side division disposed rearward of the steering shaft downward about the rotary axis disposed forward of steering shaft, the ring side division is pressed downward using its own weight. Accordingly, much pressing force is not required when the actuator presses the ring side division, which makes the structure of the steering wheel simple and compact.

It will also be appreciated that only the weight of the ring side division is used as a drive source of the rotation drive mechanism for pushing down the ring side division. In this case, the rotation drive mechanism makes a holding member hold the ring side division from falling down, and makes it stop holding the ring side division so the ring side division rotates by its own weight to align the ring plane vertically.

The steering wheel desirably includes a control device for activating the rotation drive mechanism which is capable of estimating a crash before an actual crash. With this arrangement, the rotation drive mechanism can be activated when the control device estimates a crash, whereas the airbag device is activated by the control device upon an actual crash. Accordingly, if the rotation drive mechanism is activated prior to the actual crash, the ring is disposed in a position where it can support the airbag stably prior to airbag inflation, and in addition the ring can guide the airbag deployment. At this time, even if the driver is in close proximity to the ring, the space for airbag deployment is secured in advance between the driver's abdomen and the lower part (or rear part, before being rotated) of the ring. Therefore, the airbag will smoothly deploy there between.

The control device desirably returns the ring side division to the original position if the actual crash is avoided after the rotation drive mechanism is once operated. This arrangement enables the ring side division to restore the original state and to return to a standby mode for a next chance of crash unless the vehicle actually makes a collision. Consequently, there will be no need to replace the steering wheel.

The airbag apparatus is desirably attached to the ring side division. With this structure, the deployment direction of the airbag as well as a region of the airbag supported by the ring will follow the displacement of the ring plane. Accordingly, the inflated airbag will be constantly supported by the ring in a stable manner.

As mentioned above, the rotation drive mechanism completes its operation to align the ring plane generally vertically by the time an advancing driver contacts the inflated airbag, and then the inflated airbag receives the upper body of the driver at first, and eventually stops its movement. During this course the airbag receives the driver, depending on the way the head of the driver enters the airbag, the rotation drive mechanism may hold the ring side division at a position where the ring plane is aligned generally vertically, return the same to the original position, or may allow the same to return to the original position in order that the head be protected by the airbag supported by the ring suitably to the circumstances.

For example, if the entering degree of the driver's head into the airbag is low, the rotation drive mechanism desirably holds the ring side division at a position where the ring plane is aligned vertically after the airbag inflated on top of the vertically aligned ring receives a torso (chest and abdomen) of the upper body of driver to absorb the kinetic energy of driver. That is, if for example the driver wear a seatbelt, his/her head is likely to move in parallel to his/her torso. If the ring side division is at this time held by the drive mechanism to keep the ring plane upright, the airbag is supported by the ring with its whole plane facing the driver is disposed vertically and in parallel to the upper body (head and abdomen) of the driver. Therefore, the whole upper body, i.e. head and abdomen of the driver will be cushioned securely.

If, for example the driver does not wear a seatbelt, even after the protection plane of the airbag expanded wide and upright receives the torso of the driver and absorb his/her kinetic energy, the driver goes on entering into the airbag with his/her upper body plunged or inclined forward. At this time, if the rotation drive mechanism has stopped controlling the movement of the ring side division and the ring side division is allowed to return to the original position, the whole protection plane of the airbag rotates forward in such a manner as to move an upper part of the airbag forward along with the movement of the upper body of the driver together with the ring side division, thereby allowing the upper part of the airbag to inflate to have enough thickness between the head of driver and the upper part of the ring. Accordingly, the airbag will receive the head of the driver by its upper part with enough cushioning property.

On the other hand, depending on circumstances, in the course the inflating airbag receives the driver moving forward, the rotation drive mechanism may rotate the ring side division once moved back toward an original position and holds the same at a point on the way back. For example, if the driver is unbelted, the driver keeps on entering into the airbag with his/her upper body inclined forward even after his/her torso is received by the protection plane of the airbag expanded wide and upright. At this time, if the rotation drive mechanism forces the ring side division to rotate forward in such a manner as to move the upper part of the ring side division forward, and then holds the ring side division at a point, a space for the upper part of the airbag to be deployed with enough thickness is secured between the driver's head and the upper part of the ring, and the airbag is held thereat without being wobbled. Therefore, the upper part of the airbag will cushion the head of the driver in a stable manner.

If the rotation drive mechanism allows for a return of the ring side division once moved toward the original position, when the rotation drive mechanism determines a position of the ring side division on the way back to the original position, the rotation drive mechanism may adjust an angle of the ring plane from the vertical direction depending upon the driver to be received by the airbag. With this arrangement, the airbag supported by the ring will receive the driver's head in a most desirable manner according to whether the driver is belted or not, or on the size of the driver after the protection plane of the airbag expanded wide and upright receives the torso of the driver to absorb the kinetic energy.

For example, assuming that a large and unbelted driver comes entering the airbag with his/her upper body inclined forward after his/her torso is received by the airbag, since a large driver tends to be seated away from the ring, the angle of forward inclination is presumed great. If, in that case, the rotation drive mechanism determines the position of the ring side division at a point where the angle of the ring plane from the vertical direction is large, the head of the large driver will be stably received by the upper area of the airbag supported by the ring and having an enough thickness. In the case of an unbelted under sized driver, since an undersized driver tends to be seated proximate the ring, the angle of forward inclination is presumed small when he/she comes entering the airbag with his/her upper body inclined forward after his/her torso is received by the airbag. In that case, if the rotation drive mechanism determines the position of the ring side division at a point where the angle of the ring plane from the vertical direction is small, the head of the undersized driver will be stably received by the upper area of the airbag while a lower area of the airbag supported by the ring does not press the torso of the driver. Furthermore, irrespective of the size of the driver, if he/she is belted, the rotation drive mechanism has only to maintain the ring side division at the vertically aligned position. In that case, the whole protection plane of the airbag is expanded upright and in parallel to the upper body (head and abdomen) of the driver moving forward, so that the protection plane will receive the head advancing in parallel to the torso of the driver with enough cushioning property.

In order to achieve the first object of the present invention, the steering wheel may alternatively be constructed without an airbag apparatus, as follows:

The steering wheel includes as components a ring for holding at steering operation, a boss disposed proximate a center of the ring to be coupled to the steering shaft, and a spoke connecting the ring and the boss. The steering wheel is coupled to the steering shaft such that a ring plane on top of the ring is disposed diagonally downward and rearward. The steering wheel is divided into a shaft side division disposed proximate the steering shaft and joined to the steering shaft, and a ring side division disposed proximate the ring and being rotatable with respect to the shaft side division such that the ring plane is aligned along the vertical direction. The boss includes a rotation drive mechanism that rotates the ring side division to align the ring plane generally vertically. The rotation drive mechanism operates when a crash takes place or is estimated to move and stop the ring side division.

With this steering wheel, too, if the rotation drive mechanism is activated, the ring side division is forced to rotate to align the ring plane vertically. Even if a driver engages the ring without an airbag, since the ring plane is aligned vertically, i.e., aligned along the front side of the upper body of driver, the ring will not hit the driver partially with its lower portion, but therefore will receive the driver evenly with respective regions out of its wide face. Moreover, the rotation drive mechanism rotating the ring side division is mounted on the steering wheel body itself, not on the steering shaft away downward from the wheel body. This structure reduces the turning radius of the ring side division, and therefore, when the ring is rotated, the downward displacement of the ring is kept to a minimum.

A steering wheel attaining the second object of the present invention includes a ring for holding at steering operation, a boss disposed proximate a center of the ring to be coupled to the steering shaft and a spoke connecting the ring and the boss. The steering wheel further includes an alignment control unit plastically deformed when the steering wheel contacts with a driver moving forward such that a ring plane formed on top of the ring is aligned generally along the vertical direction. The alignment control unit includes an adjusting mechanism adjusting a plastic deformation load required to deform the alignment control unit at the alignment of the ring plane.

In the second steering wheel of the present invention, the deformation load required to deform the alignment control unit at the vertical alignment of the ring plane is adjustable by the use of the adjusting mechanism. With increased deformation load, more impact energy will be absorbed, and with reduced deformation load, less impact energy will be absorbed.

Consequently, the second steering wheel has an adjustable absorption property of impact energy upon the vertical alignment of the ring plane.

It is desired that the steering wheel further includes a control device for activating the adjusting mechanism, which device being capable of detecting a size of kinetic energy of the driver approaching the ring, and that the control device activates the adjusting mechanism to adjust the deformation load depending on the size of the kinetic energy of the driver.

With this arrangement, if the control device detects that the kinetic energy of a driver is presumed great, that is, the driver is large, heavy, the driver is seated away from the steering wheel, or the vehicle is traveling fast, the control device operates the adjusting mechanism such that the alignment control unit is plastically deformed with high deformation load. Then a great deal of impact energy will be absorbed when the ring plane is aligned vertically, thereby reducing the kinetic energy of the driver considerably and cushioning the shock acting upon the driver when the upright ring plane receives the driver. On the other hand, if the control device detects that the kinetic energy of a driver is presumed small, that is, the driver is undersized, light, the driver is seated proximate the steering wheel, or the vehicle is traveling at low speed, the control device operates the adjusting mechanism such that the alignment control unit is plastically deformed with low deformation load. Then the alignment of the ring plane will be conducted smoothly without pressing the driver unduly with the ring, so that the driver having small kinetic energy will be received softly by the upright ring plane.

The control device will be capable of judging the size of kinetic energy of the driver in activating the adjusting mechanism if it is communicated with a size sensor such as image sensor or camera mounted on gauge panel, instrument panel or roof for detecting the size of driver, a weight sensor mounted on a seat for detecting the weight of driver, a position sensor mounted on the seat or a distance sensor mounted on a meter cluster or the roof for detecting a clearance between the steering wheel and driver, and a speed sensor mounted on a speed meter.

If the steering wheel includes a core interconnecting the ring, the boss and the spoke, and the core includes a bendable region bendable in such a manner as to bring the ring side division close to the shaft side division, it is desired that the alignment control unit is located on the bendable region, that the adjusting mechanism includes a resistive element held between the shaft side division and the ring side division when the alignment control unit is plastically deformed, and a moving mechanism for moving the resistive element, and that the moving mechanism moves the resistive element such that the plastic deformation load required to deform the alignment control unit is adjusted depending on the way the resistive element is held between the shaft side division and the ring side division when the alignment control unit is plastically deformed.

With this structure, the plastic deformation load required to deform the alignment control unit at the alignment of the ring plane is adjusted by varying the way the resistive element is held between the shaft side division and ring side division at the vertical alignment depending on whether the resistive element is moved by the moving mechanism, displacement and moving direction of the resistive element if it is moved. That is, the absorption property of impact energy is easily varied by determining whether to move the resistive element and by adjusting the displacement and moving direction of the resistive element.

When the plastic deformation load is desired to be minimum, the moving mechanism may remove the resistive element from a position between the shaft side division and the ring side division at the plastic deformation of the alignment control unit so that the resistive element cannot be held by the shaft side division and the ring side division. In this case, the resistive element has only to be removed from the position where it can be held by the shaft side division and the ring side division, and high accuracy is not required with respect to where to locate the removed resistive element. Accordingly, such arrangement will be made with ease.

The resistive element may include a shift portion varying a load required to deform the resistive element along a moving direction of the resistive element when the resistive element is held between the shaft side division and the ring side division upon the plastic deformation of the alignment control unit. With the shift portion, the deformation load is properly adjusted depending on the position of the shift portion upon the movement of the resistive element.

If the resistive element has a rod-like shape extending orthogonal to the moving direction of the ring side division toward the shaft side division when the alignment control unit is plastically deformed, it is desired that each of the shaft side division and ring side division has a butt portion to butt against and hold the resistive element at two spaced positions on an axis of the resistive element.

With this structure, the resistive element is held between the shaft side division and the ring side division at two spaced positions on its axis upon the plastic deformation of the alignment control unit. Therefore, the resistive element is held more stably in comparison with an instance where it is held at only one position, and the bendable portion including the butt portions is plastically deformed in a stable manner.

Moreover, if the moving mechanism is capable of returning the resistive element to an original position after once moving the resistive element, the resistive element is moved when an impact is estimated and the same is returned to the original position when the impact is avoided. That is, the resistive element is usable repeatedly if returned to the original position.

It will also be appreciated that the bendable portion is located in a boss core disposed in the boss area of the core, that the boss core includes a tubular region extending along the axial direction of the steering shaft and a plate-shaped region extending from an upper side of the tubular region outward and orthogonally to the axial direction of the steering shaft, and that the shaft side division is arranged on an outer circumference of the tubular region whereas the ring side division is arranged on a lower side of the plate-shaped region.

With this structure, the bendable portion is located on the lower side of the boss core positioned proximate the steering shaft supporting the steering wheel. Since a bending deformation load acting upon the ring upon the vertical alignment is likely to concentrate on the bendable portion, even if the rigidity of the core of the steering wheel is enhanced in order to secure the strength in the circumferential direction of the steering shaft, steering wheel will secure a proper strength as a whole.

The steering wheel may include more than one alignment control units around the steering shaft, each of which unit including the shaft side division, the ring side division and the adjusting mechanism disposed between the shaft side division and the ring side division, such that the plastic deformation takes place in one of the alignment control units located rearward of the steering shaft with the plastic deformation load adjusted by the adjusting mechanism.

With this structure, the steering wheel deals with not only an impact during straight-ahead driving, but also an impact during the driving with the wheel turned, by plastically deforming a region of the bendable portion proximate a rear portion of the ring to engage an abdomen of driver such that the ring plane is aligned vertically. In addition, the deformation load is adjusted by the adjusting mechanism depending on the kinetic energy of driver.

The ring plane does not necessarily have to be aligned vertically as a whole as long as it is displaced in such a manner that the absorption property of impact energy is adjusted upon the plastic deformation of the alignment control unit. Nevertheless if the entire ring plane is aligned vertically when the ring engages a driver, the upper body of the driver will be received by the flat and wide ring plane while the reaction force is suppressed.

BRIEF DESCRIPTION OF DRAWINGS

FIGS. 16A, 16B and 16C illustrate the way the steering wheel of FIG. 14 deals with a driver coming close with his head plunged forward and the way the rotation drive mechanism operates then;

FIGS. 26A and 26B are schematic sections of the resistive element of FIG. 25A taken axially for explaining the operation of the adjusting mechanism, wherein the plastic deformation load is set low;

FIGS. 27A and 27B are schematic sections of the resistive element of FIG. 25A taken axially for explaining the operation of the adjusting mechanism, wherein the plastic deformation load is set high;

FIGS. 31A and 31B are schematic sections of a resistive element taken axially for explaining the operation of an adjusting mechanism of yet another modification of the seventh embodiment;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
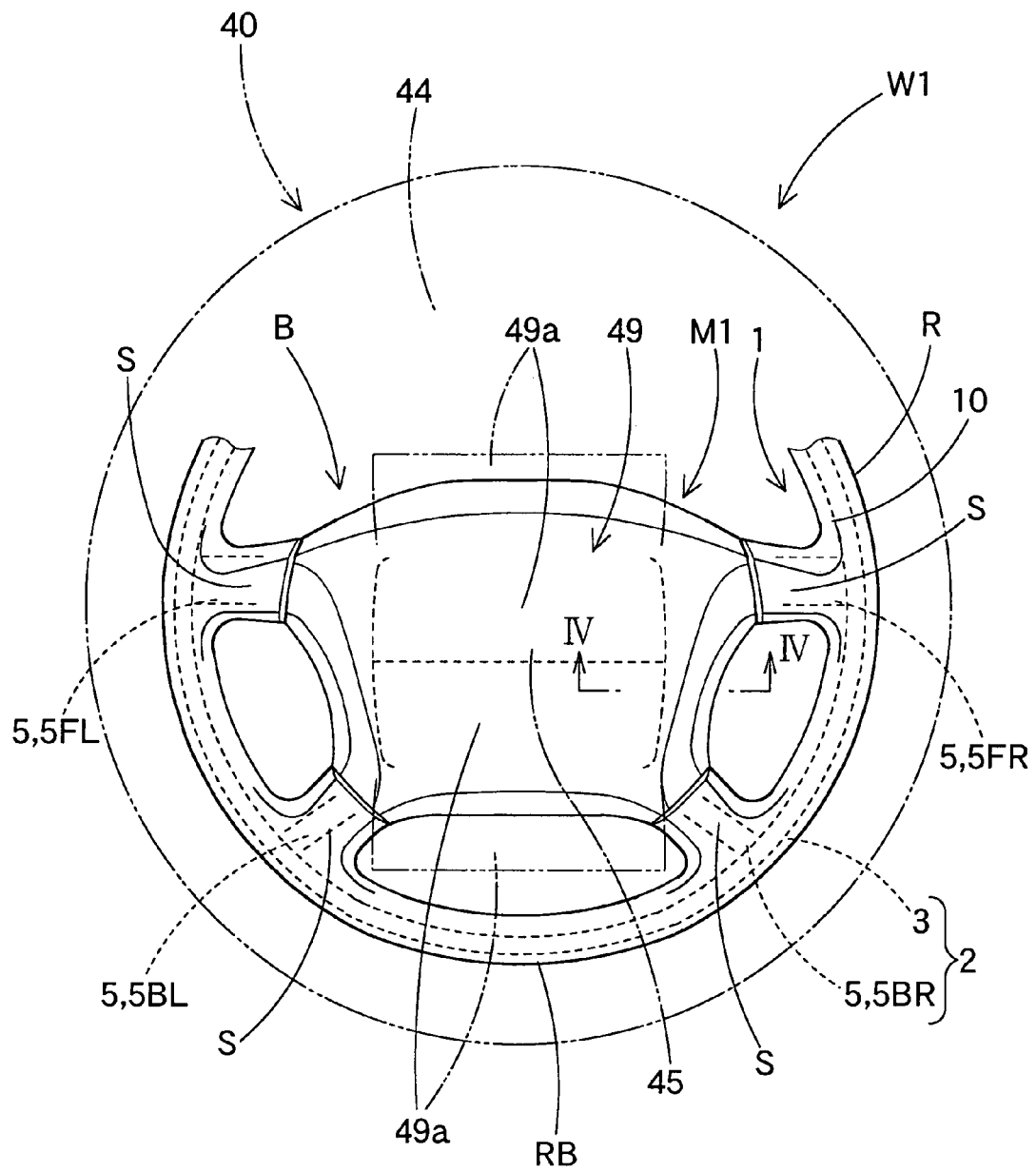
FIG. 1 is a partially omitted plan view of a steering wheel according to the first embodiment of the present invention.
Figure 2:
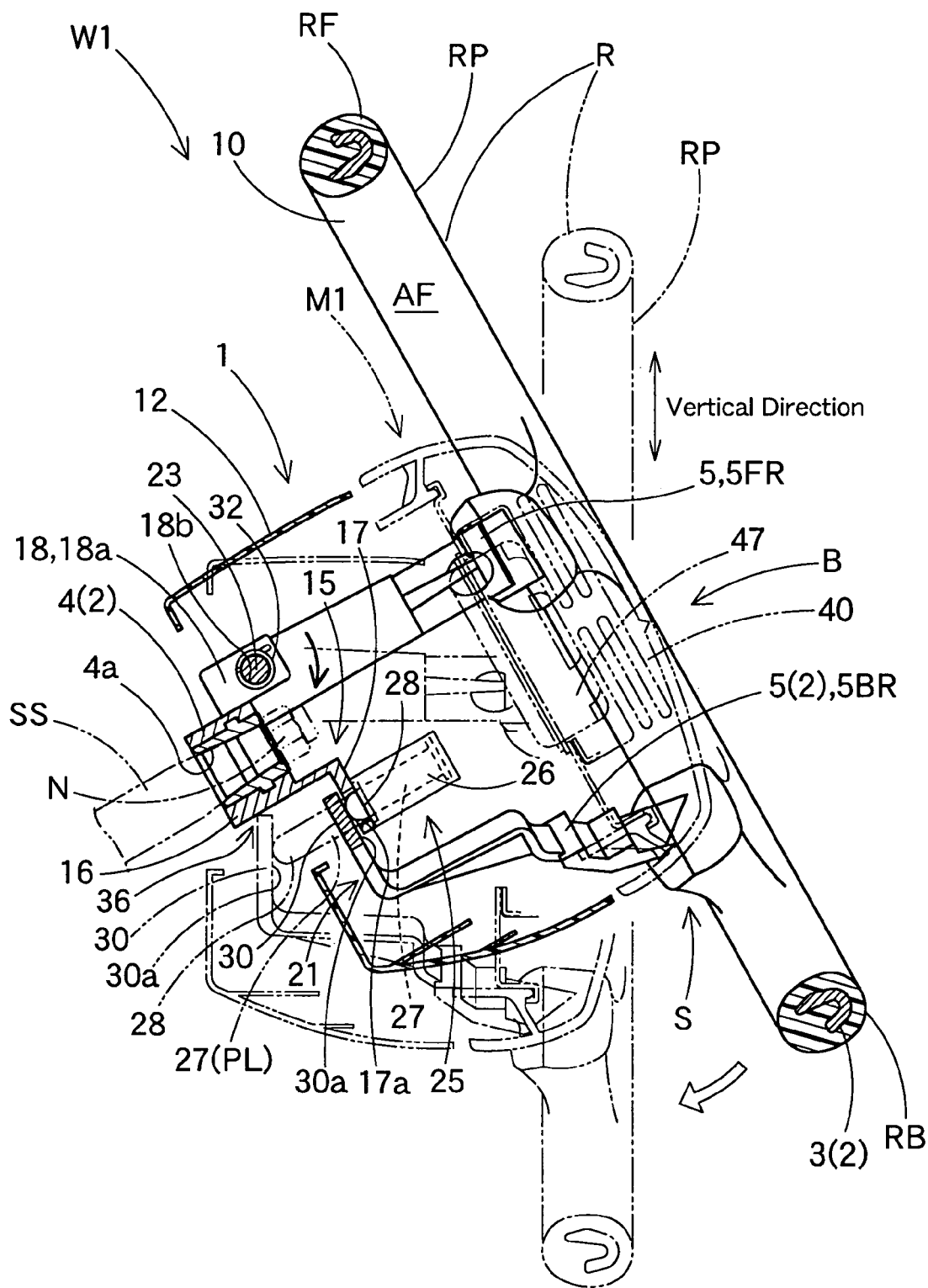
FIG. 2 is a schematic section of the steering wheel of FIG. 1 as is mounted on a vehicle.

FIGS. 1 and 2 illustrate a steering wheel W1 according to a first embodiment of the present invention. Steering wheel W1 includes a wheel body 1 and an airbag apparatus M1 disposed on top of a boss area B at the center of wheel body 1. Wheel body 1 includes an annular ring R, a boss area B and four spokes S. Ring R is for holding at the time of steering operation. Boss area B is disposed at the center of ring R, and is joined with a steering shaft SS. Spokes S connect ring R and boss area B. Two of the four spokes S are arranged at the left hand side of steering wheel 1 whereas the rest of spokes S are arranged at the right hand side. Underneath wheel body 1 is a lower cover 12 made from synthetic resin for covering the lower side of boss B. Since steering shaft SS diagonally extends downward and forward along the longitudinal direction, a ring plane RP, i.e. a top plane of ring R expands orthogonal to the axial direction of steering shaft SS when wheel body 1 or steering wheel W1 is secured to the upper end of steering shaft SS. That is, ring plane RP is disposed diagonally downward and rearward.

Unless otherwise specified, the up-down, front-rear, and left-right directions in the first to sixth embodiments described in this specification are based on a vehicle being steered straight ahead.

Figure 3:
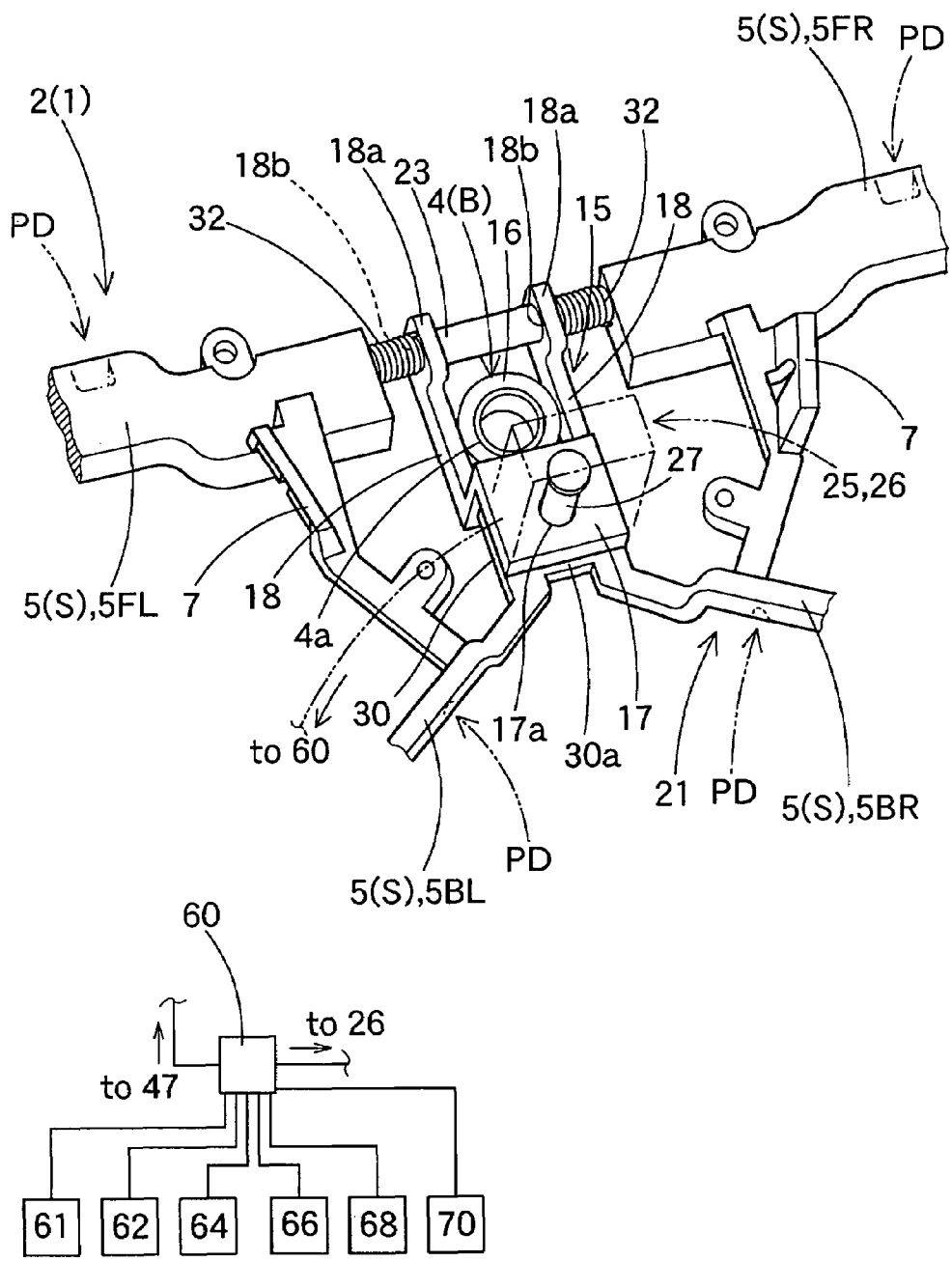
FIG. 3 is a perspective view of the vicinity of a boss core of a core of the steering wheel of FIG. 1 as viewed from above.
Figure 4:
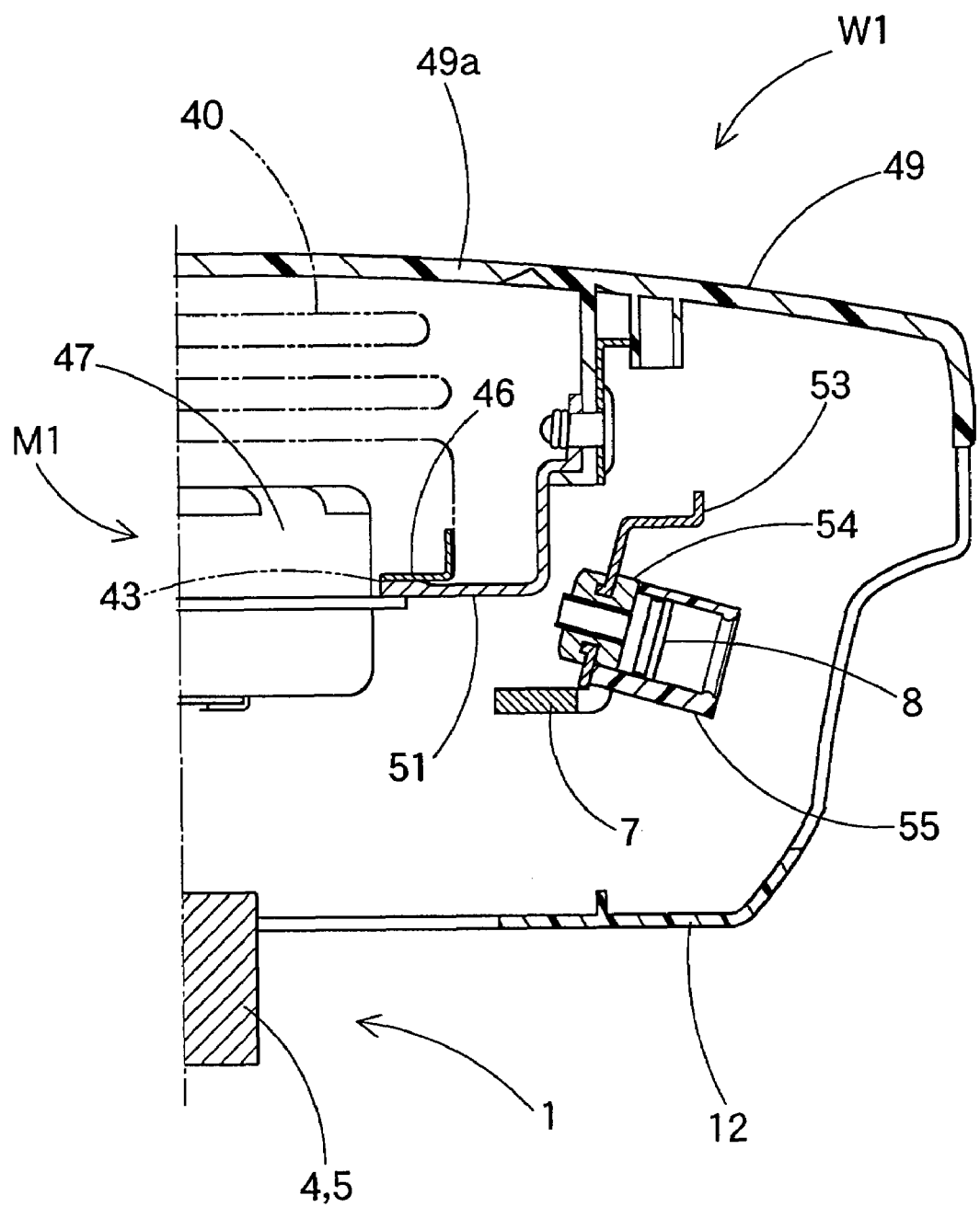
FIG. 4 is a schematic vertical section of steering wheel of FIG. 1 taken along line IV-IV of FIG. 1.

As shown in FIG. 4, airbag apparatus M1 includes a folded and housed airbag 40, an inflator 47 for supplying airbag 40 with inflation gas, a pad 49 for covering the folded airbag 40 from above, and a case 51 for housing airbag 40 and inflator 47 and for supporting pad 49. Pad 49 includes two doors 49a (FIG. 1) which are adapted to open forward and rearward when pushed by the inflated airbag 40. Each one joining plate 53 is provided on the left and right hand side for mounting airbag apparatus M1 on wheel body 1. Each of joining plates 53 is coupled to the lower side of case 51 at its first end, while having an unillustrated horn switch interposed between joining plate 53 and case 51. Joining plates 53 are secured to mounting seats 7 (FIGS. 3 and 4) of wheel body 1 at their second end by fastening bolts 8 into nuts 54 attached to joining plates 53. Inflator 47 is actuated by a control device 60 when it detects a collision of vehicle by signals fed from crash sensor 61 (FIG. 3). A member shown at numeral 55 in FIG. 4 is a holder for holding bolts 8 at the side of airbag apparatus M1 until airbag apparatus M1 is mounted on wheel body 1.

Figure 6:
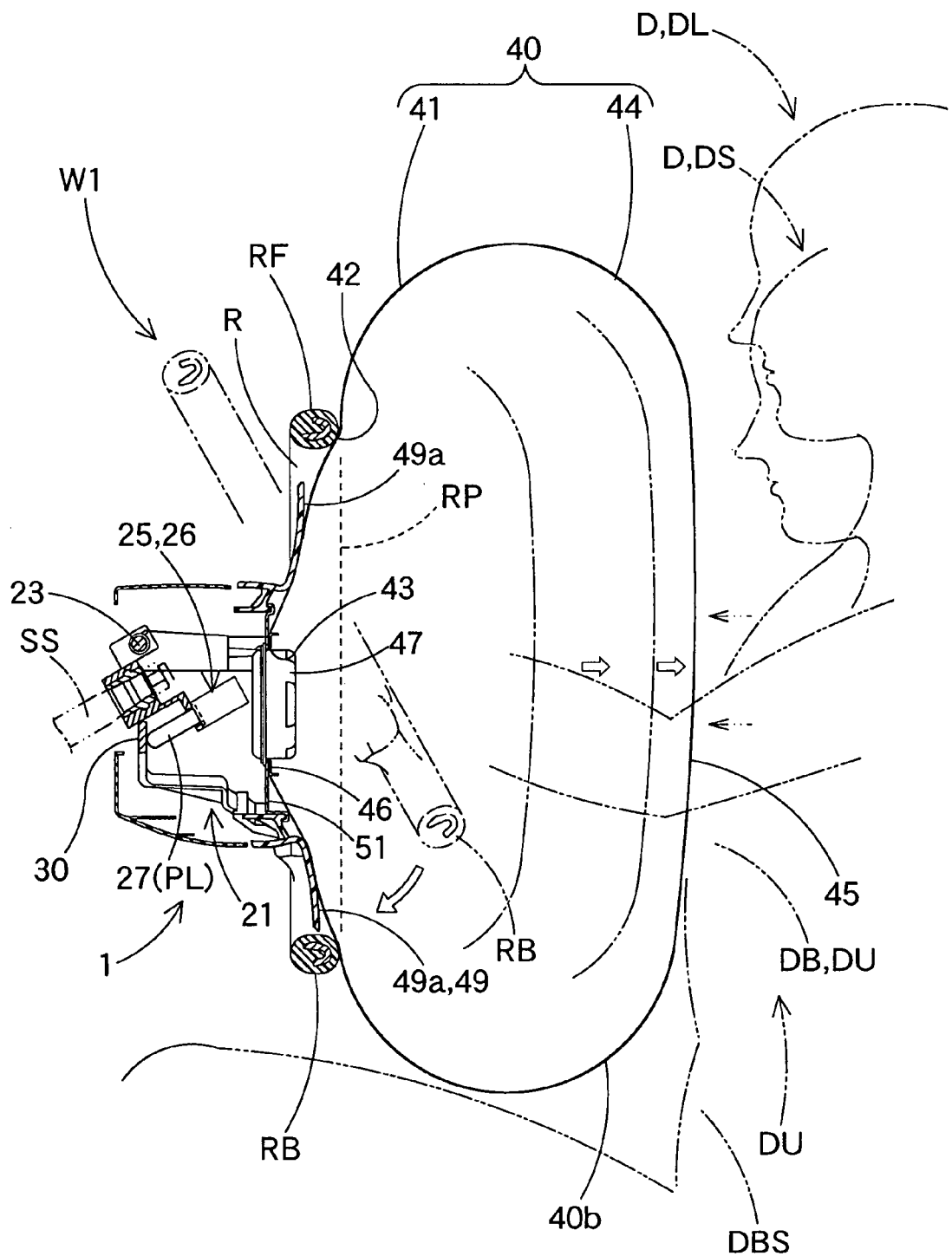
FIG. 6 is a schematic vertical section of the steering wheel of FIG. 1 and an inflated airbag.

Airbag 40 inflates with inflation gas from inflator 47. Upon inflation, airbag 40 pushes and opens doors 49a of pad 49 and projects therefrom as shown in FIG. 6. Then airbag 40 expands from inside of ring R toward outside, and eventually is formed greater than the outer diameter of ring R on top of ring R, thereby hiding ring R as viewed from a driver. Airbag 40 includes a wheel side wall 41 and a seat side wall 44 both of which are made of flexible cloth material. Airbag 40 is formed by sewing up circumferential edges of generally circular walls 41 and 44. Airbag 40 further internally includes an unillustrated tether for regulating the distance between walls 41 and 44. With this structure, airbag 40 is formed into a discoid contour having a greater thickness at the center when inflated. A flat region located at the center of seat side wall 44 serves as a protecting plane 45 for receiving a driver. As shown in FIGS. 4 and 6, airbag 40 is provided at the center of wheel side wall 41 with an inlet port 43 for receiving inflator 47 to admit inflation gas. Airbag 40 is attached to case 51 at the periphery of inlet port 43 using a retainer 46.

As shown in FIGS. 1 to 3, steering wheel body 1 has such a contour that ring R, boss area B and spokes S are interconnected. Wheel body 1 includes a core 2 of die-cast metal, for instance such light alloy as aluminum. Core 2 includes a ring core 3 arranged at ring R, boss core 4 arranged at boss B, and spoke cores 5 arranged at spokes S. Ring core 3 and regions of spoke cores 5 in the vicinity of ring R are coated by synthetic resin, thereby providing a coating layer 10. Between each pair of front and rear spoke cores 5 in the left hand side and right hand side, mounting seat 7 is disposed in such a manner as to connect front and rear spoke core 5 as shown in FIG. 3. As described before, joining plate 53 is bolt 8 fixed to each of mounting seats 7 (FIG. 4) to mount airbag apparatus M1 on steering wheel body 1. Boss core 4 includes a steel boss 4a (FIG. 2) through which steering shaft SS is inserted and then fixed by nut N.

In the first embodiment, as shown in FIGS. 2 and 3, steering wheel body 1 is divided into a shaft side division 15 joined to steering shaft SS and a ring side division 21 disposed proximate ring R. Boss core 4 corresponds to shaft side division 15 whereas remaining parts of wheel body 1 except boss core 4 correspond to ring side division 21. Ring side division 21 is rotatably supported by shaft side division 15 such that ring plane RP is aligned generally vertically. Shaft side division 15 includes a rotation drive mechanism 25 that rotates ring side division 21 to align ring plane RP along generally vertical direction.

To describe shaft side division 15 more specifically referring to FIG. 3, shaft side division 15 is composed of a tubular region 16 including boss 4a of boss core 4 and its peripheral parts, a plate-shaped mounting base 17 extending from the rear side of tubular region 16 rearward and perpendicular to the axial direction of steering shaft SS, and two supports 18 extending forward from the left and right sides of tubular region 16. Supports 18 each has a plate shape and oppose each other in the lateral direction. Front parts 18a of supports 18 extend further forward of boss 4a, and each have a pivot hole 18b running through the lateral direction at a position forward of steering shaft SS in the direction perpendicular to the axial direction of steering shaft SS. A rotary shaft or axis 23 is put through pivot holes 18b to be supported by supports 18, around which shaft 23 ring side division 21 is adapted to rotate.

Springs 32 exemplified by torsion coil spring are mounted around rotary shaft 23 at two positions. Springs 32 are coupled to shaft side division 15 and ring side division 21 at opposite ends, and constantly exert such a biasing force as to shift a rear portion RB of ring R in ring side division 21 upward about rotary shaft 23, i.e. turn rear portion RB counter-clockwise about rotary shaft 23 in FIG. 2.

Figure 5A:
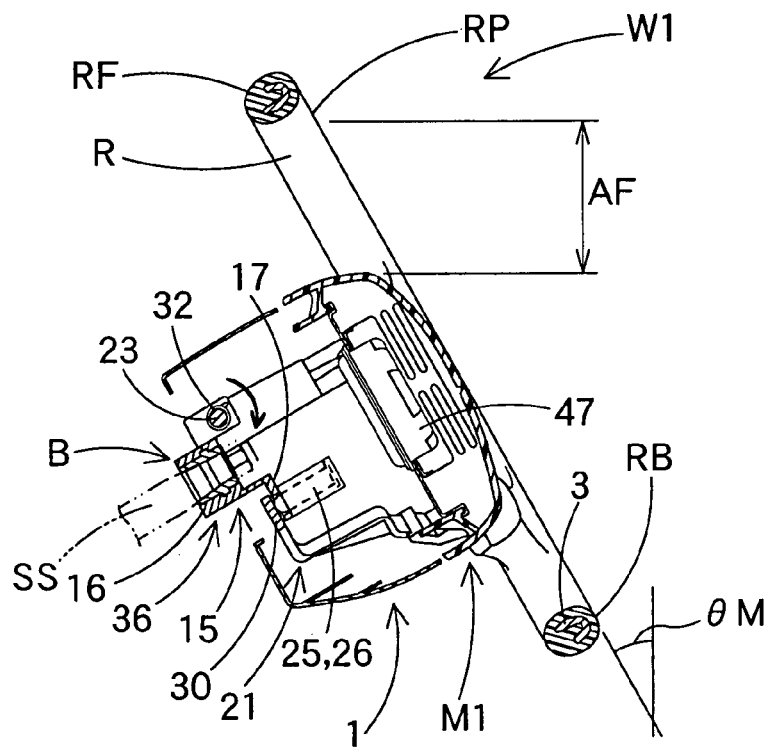
FIGS. 5A and 5B schematically show the way a ring plane is aligned vertically by vertical sections.
Figure 5B:
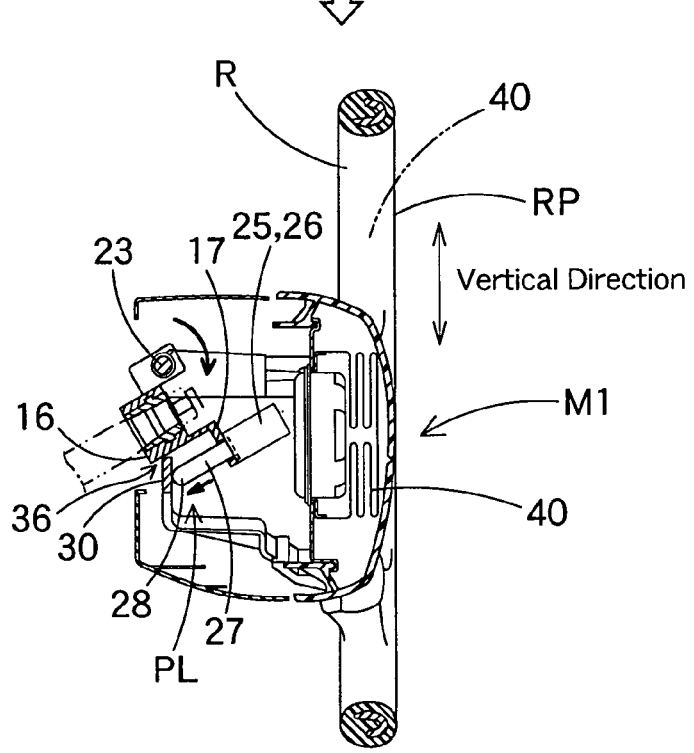

An actuator 26 constituting rotation drive mechanism 25 is attached on top of mounting base 17. Actuator 26 of the first embodiment is constituted by an electromagnetic solenoid or the like which is capable of returning to the original position after operation. In operation, actuator 26 shifts a rod 27 to project through an insert hole 17a of mounting base 17 (FIG. 3) downward along steering shaft SS, as shown in FIGS. 5A and 5B. Moreover, actuator 26 is capable of shifting rod 27 up to a maximum projected position PL shown in FIG. 5B as well as stopping it at an intermediate position PS between the maximum projected position PL and the original position (FIG. 9B). The lower end of rod 27 serves as a pressing portion 28 and abuts on a top face 30a of a movable base 30 in ring side division 21 located rearward of steering shaft SS. Since ring side division 21 is so biased by springs 32 that rear portion RB of ring R is turned upward, movable base 30 is constantly biased to be pressed against pressing portion 28.

Describing ring side division 21, rotary shaft 23 is disposed in boss B area and forward with respect to steering shaft SS in such a manner as to connect leading ends of left and right spoke cores 5 (5FL and 5FR) in the front side whereas movable base 30 abutting against pressing portion 28 of rod 27 at top face 30a is disposed in boss B area and rearward with respect to steering shaft SS in such a manner as to connect leading ends of left and right spoke cores 5 (5BL and 5BR) in the rear side.

If movable base 30 is pressed downward by rod 27 projecting up to the maximum projected position PL, ring side division 21 rotates clockwise and rear portion RB of ring R moves downward about rotary shaft 23 as shown in FIGS. 2, 5A and 5B, such that ring plane RP is aligned vertically. At this time, movable base 30 abuts against a stopper 36 which is an outer circumference of tubular region 16 of shaft side division 15, thereby stopping further rotation of ring side division 21.

Operation of actuator 26 serving as rotation drive mechanism 25 is controlled by control device 60 shown in FIG. 3 as well as inflator 47 of airbag apparatus M1. More specifically, in addition to crash sensor 61 for detecting an actual impact exemplified by an acceleration sensor or the like, control device 60 also receives inputs from a pre-crash sensor 62 for predicting a possible crash, such as a radar mounted on a front bumper. If control device 60 judges that an impact is unavoidable based on signals fed from pre-crash sensor 62, it activates actuator 26. However, if then control device 60 does not receive a signal from crash sensor 61 that have detected an actual crash within a predetermined period of time, it judges that the crash is avoided and then activates actuator 26 to return rod 27 which is projected up to maximum projected position PL to the original state. Control device 60 also decides on how much rod 27 of actuator 26 should project while judging a desired receiving manner of driver by airbag 40 inflated by inflator 47 (FIGS. 8A, 8B, 9A and 9B).

In this embodiment, control device 60 is also constructed to receive signals from a rudder angle sensor 64 disposed proximate the lower end of steering shaft SS for detecting the rudder angle of steering wheel W1. Control device 60 is constructed to activate actuator 26 only when it judges that the vehicle is advancing straight ahead, i.e. only when rotary shaft 23 horizontally extends along the lateral direction, based on signals from rudder angle sensor 64.

Moreover, pre-crash sensors 62 are mounted on both sides, i.e. left and right sides, of vehicle e.g. on the front bumper. Control device 60 is not adapted to activate actuator 26 when a possible crash is predicted as an asymmetric crash only on left- or right-side, not a head-on collision.

In addition to the above-described sensors, control device 60 is electrically communicated with a driver sensor 66 for monitoring the size of driver D, which is exemplified by a CCD camera mounted for instance on an instrument panel or a roof head liner (both not shown), a distance sensor 68 mounted for instance on the instrument panel or roof head liner for monitoring a clearance between steering wheel W1 and seated driver D, which may be an optical sensor, and a seatbelt sensor 70 mounted for example on a buckle of seatbelt for ensuring that driver D wears the seatbelt. If, after control device 60 activates actuator 26 to launch rod 27 to the maximum projected position PL while activating inflator 47, control device 60 makes sure that driver D wears the seatbelt based on signals from seatbelt sensor 70, it keeps rod 27 projected up to the maximum projected position PL. If control device 60 fails to make sure if driver D wears the seatbelt, device 60 further judges based on signals from driver sensor 66 whether the seated driver D is large or undersized. If driver D is identified as a large driver DL, control device 60 retracts rod 27 to the original position before being activated. If driver D is identified as an undersized driver DS, it retracts rod 27 up to the intermediate position PS. The timing to retract rod 27 is the timing at which the inflated airbag 40 receives the head DH of advancing driver D (DL, DS) after it receives a torso (chest and abdomen) DB of upper body DU of driver D and which timing is calculated from vehicle speed, acceleration, and the clearance between steering wheel W1 and driver D (DL, DS) provided by distance sensor 68. The timing to retract rod 27 may also be set for a predetermined time after activation of inflation 47 according to the calculated average time that airbag 40 receives the advancing head DH.

In steering wheel W1 of the first embodiment, in the course of driving, if it is judged based on signals from pre-crash sensor 62 that a frontal crash is inevitable whereas judged based on signals from rudder angle sensor 64 that the vehicle is traveling straight ahead, control device 60 activates actuator 26 of rotation drive mechanism 25 to push out rod 27 downward up to the maximum projected position PL. Then the rod 27 pushes movable base 30 of ring side division 21 downward by its pressing portion 28, so that ring side division 21 rotates clockwise and rear portion RB of ring R moves downward about rotary shaft 23 such that ring plane RP is aligned vertically.

If then control device 60 detects an impact based on signals fed from crash sensor 61, it activates inflator 47, so that airbag 40 pushes and opens doors 49a of pad 49, expands from inside of ring R toward outside, and eventually is formed greater than the outer diameter of ring R on top of ring R as shown in FIG. 6. Since the ring side division 21 has completed its rotary displacement to align ring plane RP vertically by rotation drive mechanism 25 by this point, the inflated airbag 40 is capable of receiving the torso (chest and abdomen) DB of upper body DU of driver D softly with sufficient cushioning property by its wide plane of protecting plane 45 of seat side wall 44 expanding along the vertical direction parallel to ring plane RP.

As shown in FIG. 6, wheel side wall 41 of airbag 40 is supported by ring R, whose ring plane RP is aligned vertically, entirely along the circumference of ring R. That is, a supported region 42 of wheel side wall 41 is arranged all over the circumference of ring R. Accordingly, even if airbag 40 receives driver D moving forward, it is prevented from moving out of place i.e. moving upward, downward, leftward or rightward, so that airbag 40 receives driver D in a stable manner while covering the ring R.

Moreover, rotation drive mechanism 25 serving to rotate and displace ring side division 21 such that ring plane RP is aligned vertically is mounted on steering wheel body 1 itself, not on steering shaft SS away downward from wheel body 1. This structure makes the turning radius of ring side division 21 small, and therefore, when ring R is rotated to align ring plane RP vertically, the downward displacement of ring R is kept to a minimum.

Furthermore, since a portion RB of ring R, which is usually located at the rear side, is moved forward with the small turning radius of ring 21 when rotation drive mechanism 25 is activated, the inflating airbag 40 is easily deployed in a space between abdomen DBS of driver D and a lower portion RB, or rear portion RB, before displacement, of ring R even if driver D was located proximate ring R. Accordingly, the inflated airbag 40 is able to locate its lower portion 40b for covering a rear side of lower or rear portion RB of ring R in front of abdomen DBS of driver D.

Therefore, in steering wheel W1 of the first embodiment, the downward displacement of ring R is suppressed when ring plane RP is aligned along the vertical direction while wheel W1 supporting airbag 40 in a stable manner. Moreover, the inflating airbag 40 is smoothly deployed between driver D and ring R even provided driver D is positioned proximate ring R.

In the first embodiment, rotary shaft 23 of rotation drive mechanism 25 is arranged along the lateral direction when the steering wheel W1 is steered straight ahead, and rotation drive mechanism 25 is adapted to be active only when steering wheel W1 is steered straight ahead.

Collisions of vehicle often take place when steering wheel W1 is being steered straight ahead. The first embodiment is suitably constructed in consideration of a frontal collision, which is most likely, such that ring plane RP is aligned vertically without tilting toward the lateral direction upon a frontal collision.

Rotation drive mechanism 25 of the first embodiment is constructed to be activated exclusively when the vehicle makes a frontal collision during straight-ahead driving, by the use of control device 60. Ring R is not aligned upon an asymmetric collision of vehicle. If mechanism 25 is activated upon an asymmetric collision to align ring R vertically, ring R is liable to have a projected region to engage a driver unduly since the driver may come close to the ring diagonally. Such a situation will be avoided in the first embodiment.

Without considering the above advantage, rotation drive mechanism 25 may be activated when a vehicle is not traveling straight ahead or upon impacts other than a frontal collision, especially in such a circumstance where a vehicle speed is slow.

In rotation drive mechanism 25 of the embodiment, when rotary shaft 23, which belongs to ring side division 21, extends along the lateral direction, shaft 23 is disposed in boss area B forward relative to steering shaft SS whereas actuator 26 for pressing and rotating ring side division 21 downward is disposed rearward relative to shaft SS.

That is, actuator 26 taking up much space is disposed rearward relative to steering shaft SS whereas small rotary shaft 23 and supports 18 are disposed in an area forward of shaft 23. This structure will not narrow a space AF between a front part of boss area B and a front part RF of ring R as shown in FIGS. 2 and 5A, so that a fair sight is secured in viewing gauges of vehicle through space AF. Moreover, since actuator 26 is constructed to press ring side division 21 disposed rearward of steering shaft SS downward about rotary shaft SS disposed forward of steering shaft SS, ring side division 21 is pressed downward using its own weight. Accordingly, much pressing force is not required when actuator 26 presses ring side division 21, which makes the structure of steering wheel W1 simple and compact.

In this embodiment, actuator 26 of rotation drive mechanism 25 is controlled by control device 60 which is capable of estimating a crash before an actual crash. If rotation drive mechanism 25 is operated when control device 60 estimates a crash, ring R is disposed in a position where it can support airbag 40 stably prior to airbag inflation, and in addition ring R can guide the airbag deployment. At this time, even if driver D is in close proximity to ring R, a space for airbag deployment is secured in advance between abdomen DBS of driver D and lower or rear part RB of ring R. Therefore, airbag 40 will smoothly deploy there between as shown in FIG. 6.

Even in the event that driver D contacts ring R in a condition where rotation drive mechanism 25 is operated to align ring plane RP along the vertical direction and airbag 40 is not inflated (FIG. 7B), since ring plane RP is aligned vertically, i.e., aligned along the front side of upper body DU of driver D, ring R will not hit driver D partially with its rear or lower portion RB, but therefore will receive driver D evenly with its respective regions out of wide face.

Figure 7A:
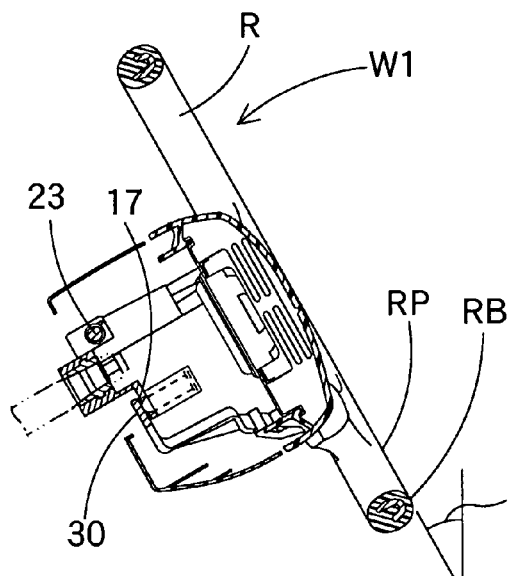
FIGS. 7A, 7B and 7C schematically show a returning process of the ring plane to the original position by operation of a rotation drive mechanism of the steering wheel of FIG. 1 in order.
Figure 7B:
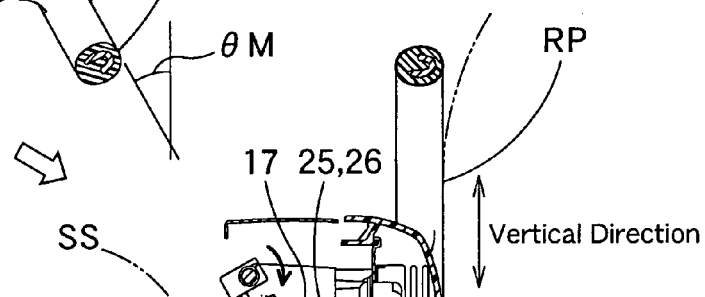
Figure 7C:
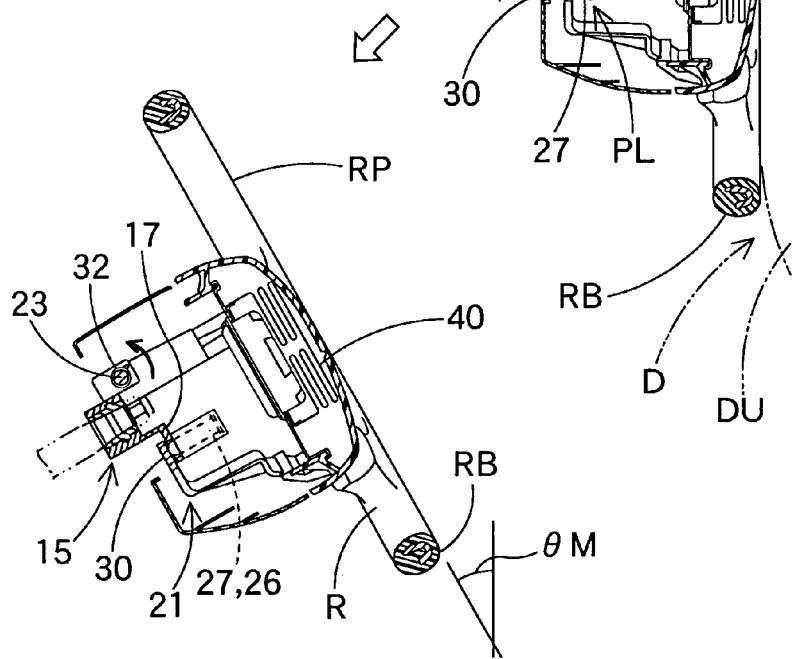

Moreover, actuator 26 of rotation drive mechanism 25 is controlled by control device 60 to return ring side division 21 to the original position when an actual crash is avoided after once operated. More specifically, if control device 60 judges that an impact is unavoidable based on signals fed from pre-crash sensor 62, it activates actuator 26 as shown in FIGS. 7A and 7B. If then control device 60 does not receive a signal from crash sensor 61 that have detected an actual crash within a predetermined period of time, it judges that the crash is avoided and then activates actuator 26 to retract the projected rod 27 to the original state. Then by the biasing force of springs 32, ring side division 21 rotates counter-clockwise about rotary shaft 23 as shown in FIGS. 7B and 7C, and returns to the original disposition before the operation of actuator 26. This structure enables ring side division 21 to restore the original state and to return to a standby mode for a next chance of crash unless the vehicle actually makes a collision. Consequently, there will be no need to replace steering wheel W1.

In this embodiment, furthermore, airbag apparatus M1 is attached to mounting seats 7 formed on spoke cores 5, and spoke cores 5 belong to ring side division 21. That is, airbag apparatus M1 is attached to ring side division 21. With this structure, the deployment direction of airbag 40 as well as a region 42 of airbag 40 supported by ring R are adjusted along with the displacement of ring plane RP. Accordingly, the inflated airbag 40 will be constantly supported by ring R in a stable manner.

In the first embodiment, additionally, after control device 60 activates actuator 26 to launch rod 27 to the maximum projected position PL while activating inflator 47, if control device 60 fails to make sure if driver D wears a seatbelt based on signals from seatbelt sensor 70, device 60 further judges based on signals from driver sensor 66 whether the seated driver D is large or undersized. If driver D is identified as a large driver DL, control device 60 retracts rod 27 to the original position in time with the entrance of head DH into airbag 40.

Figure 8A:
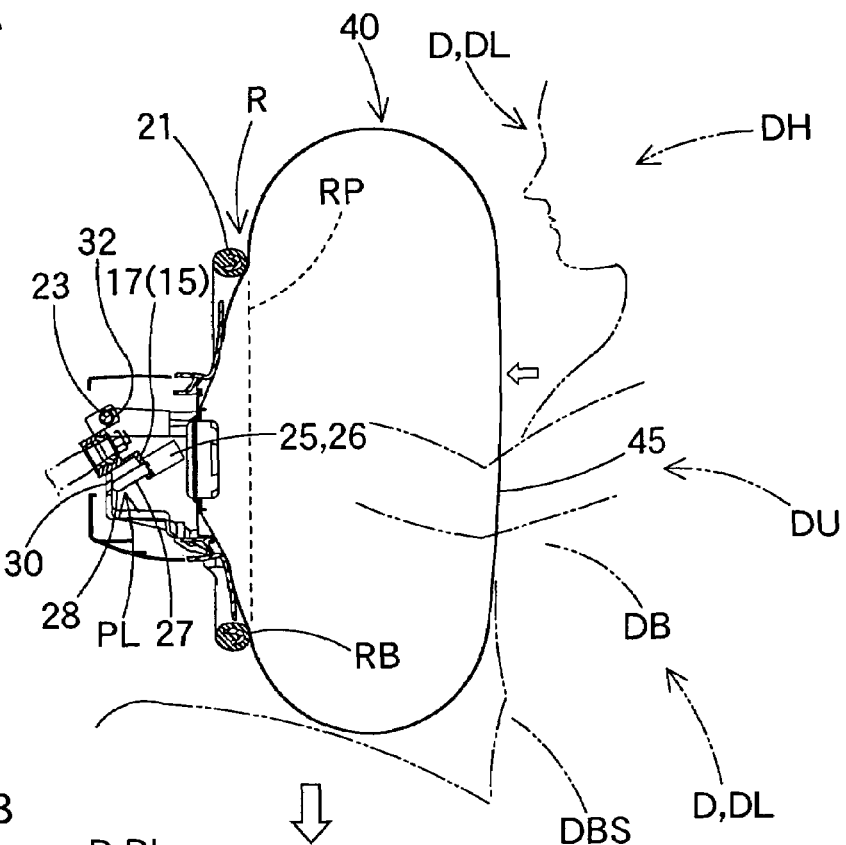
FIGS. 8A and 8B illustrate the way the steering wheel of FIG. 1 deals with a large driver coming close with his head plunged forward and the way the rotation drive mechanism operates then.
Figure 8B:
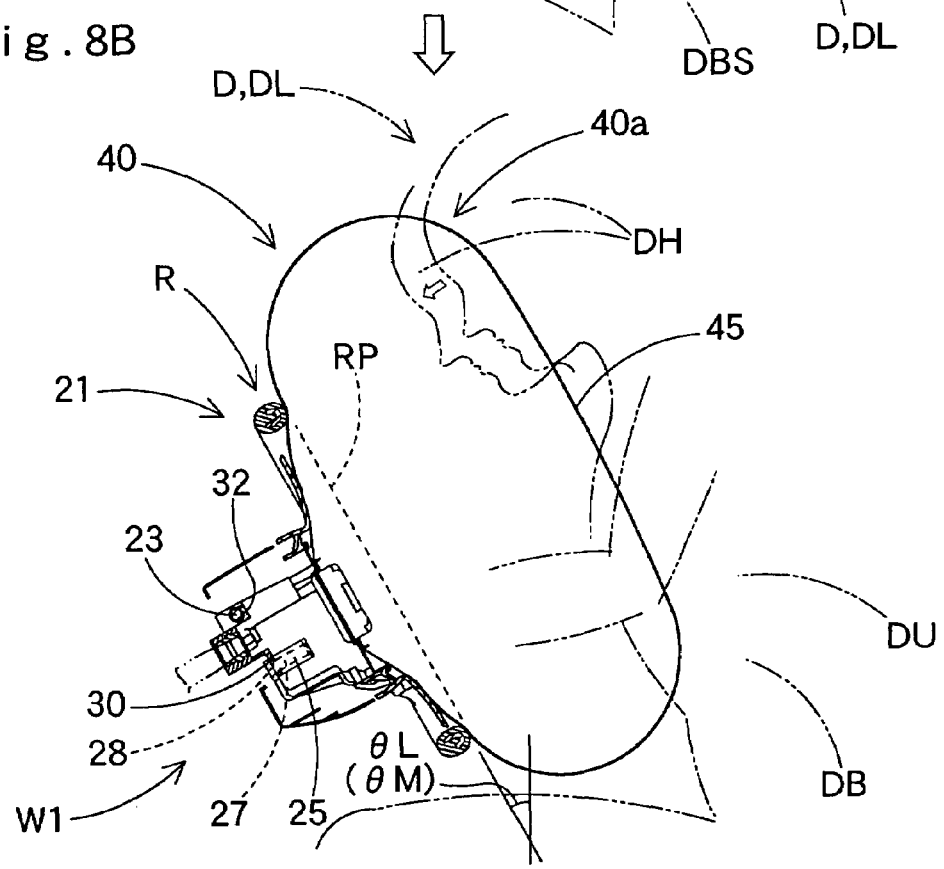

Specifically, in an instance where the seated driver D is an unbelted large driver DL, upon engagement of driver DL and airbag 40, airbag 40 initially receives torso DB of large driver DL with its protection plane 45 expanded wide and upright as shown in FIG. 8A, thereby the kinetic energy of driver DL is absorbed. However, large driver DL goes on entering into airbag 40 with his/her upper body DU plunged or inclined forward as shown in FIG. 8B. Since large driver DL tends to be seated away from ring R, the angle of forward inclination is assumed great. To cope with these circumstances, control device 60 controls actuator 26 of rotation drive mechanism 25 such that rod 27 is retracted to the original position in time with the entrance of head DH into airbag 40. Then as shown in FIGS. 8A and 8B, by the biasing force of springs 32, ring side division 21 rotates counter-clockwise about rotary shaft 23 and returns to the original disposition. Thus rod 27 or pressing portion 28 of rotation drive mechanism 25 and springs 32 determine the position of ring side division 21 at a point where the angle of ring plane RP from the vertical direction is a large angle θL. Accordingly, as shown in FIG. 8B, head DH of large driver DL is stably received by an upper area 40a of airbag 40 supported by ring R and having an enough thickness to exert cushioning property with no wobbling.

Figure 9A:
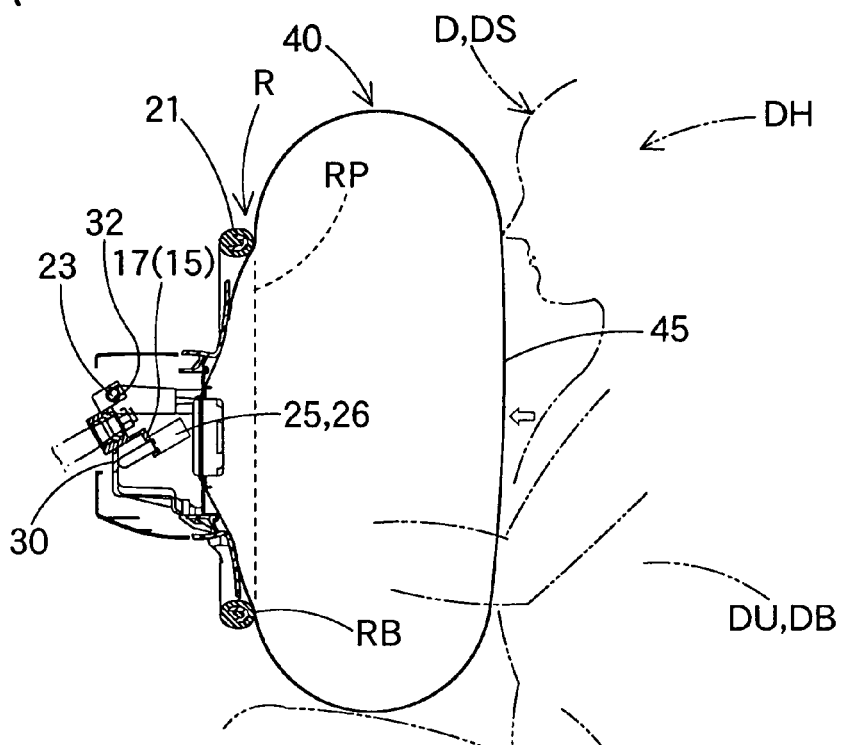
FIGS. 9A and 9B illustrate the way the steering wheel of FIG. 1 deals with an undersized driver coming close with his head plunged forward and the way the rotation drive mechanism operates then.
Figure 9B:
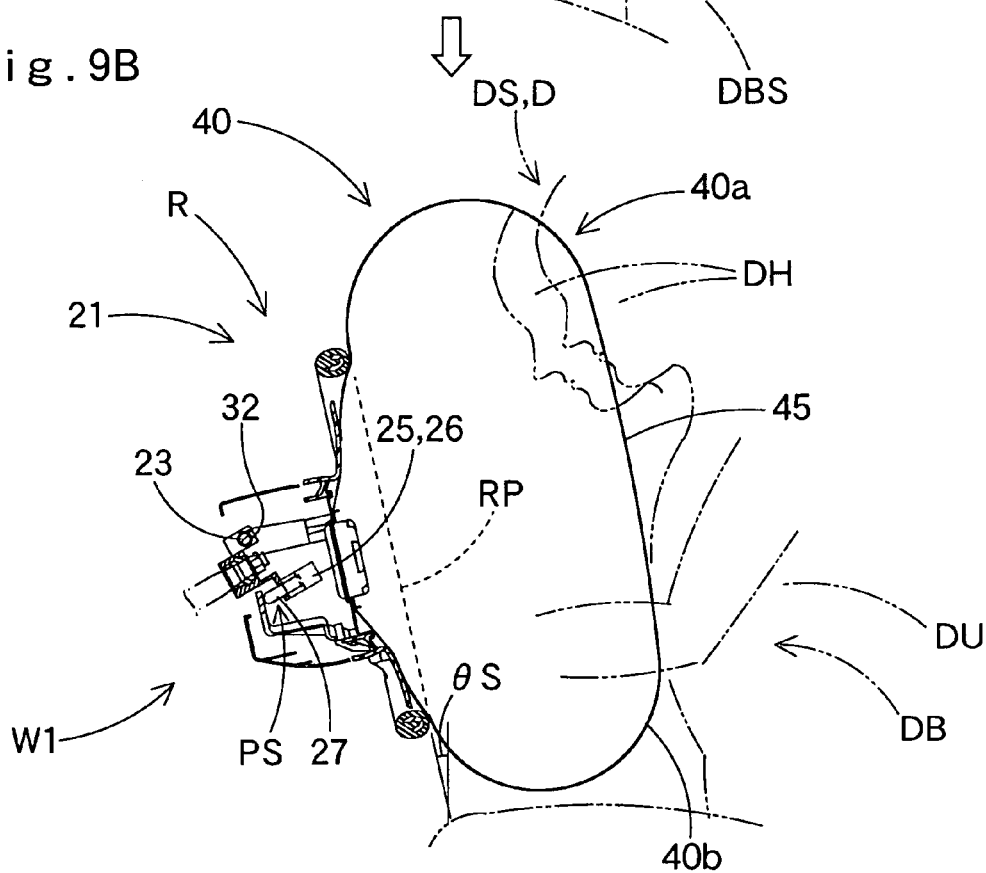

On the other hand, after actuator 26 operates to launch rod 27 to the maximum projected position PL while activating inflator 47, if control device 60 recognizes that a driver D does not wear a seatbelt and is an undersized driver DS, control device 60 controls actuator 26 to retract rod 27 up to the intermediate position PS in time with the entrance of head DH into airbag 40 as shown in FIGS. 9A and 9B. Then by the biasing force of springs 32, ring side division 21 rotates counter-clockwise about rotary shaft 23 and is positioned by rod 27 of rotation drive mechanism 25 and springs 32 at a point where the angle of ring plane RP from the vertical direction is a small angle θS. Small angle θS is about half of large angle θL. In the case of undersized driver DS, after his/her torso DB engages airbag 40 as shown in FIG. 9A so that the kinetic energy is absorbed, driver DS also goes on entering into airbag 40 with his/her upper body DU inclined forward. Since driver DS is seated proximate ring R, however, the angle of forward inclination is assumed small. Accordingly, if ring side division 21 is positioned at the point where the angle of ring plane RP from the vertical direction is small angle θS, as shown in FIG. 9B, head DH of undersized driver DS is stably received by upper area 40a of airbag 40 while a lower area 40b of airbag 40 supported by ring R does not press torso DB of driver DS.

Of course, if control device 60 makes sure that a seated driver D (DL or DS) wears a seatbelt based on signals fed from seatbelt sensor 70 after activating actuator 26 to launch rod 27 to the maximum projected position PL while activating inflator 47, control device 60 maintains the state where rod 27 is located at the maximum projected position PL and positions ring side division as it is. In that case, the states shown in FIGS. 8A and 9A will be maintained so that the whole protection plane 45 of airbag 40 will expand along the vertical direction, i.e., in parallel to upper body DU including torso DB and head DH of driver D (DL or DS) moving forward. Therefore, airbag 40 will be able to receive head DH of driver D with enough cushioning property, which head will move forward in this case in parallel to torso DB without being inclined forward.

In the first embodiment, actuator 26 operates to move ring side division 21 to align ring plane RP along the vertical direction, whereas springs 32 operate to return ring side division 21 to the original state. However, as a rotation drive mechanism 25A of a steering wheel W2 of the second embodiment shown in FIGS. 10A, 10B, 11, 12A, 12B and 12C, it will also be appreciated to employ an actuator 26A or an electromagnetic solenoid or the like which returns to the original state after once being operated in order to rotate ring side division 21 or return the same to positions where the angles of ring plane RP become large angle θL or small angle θS.

Figure 10A:
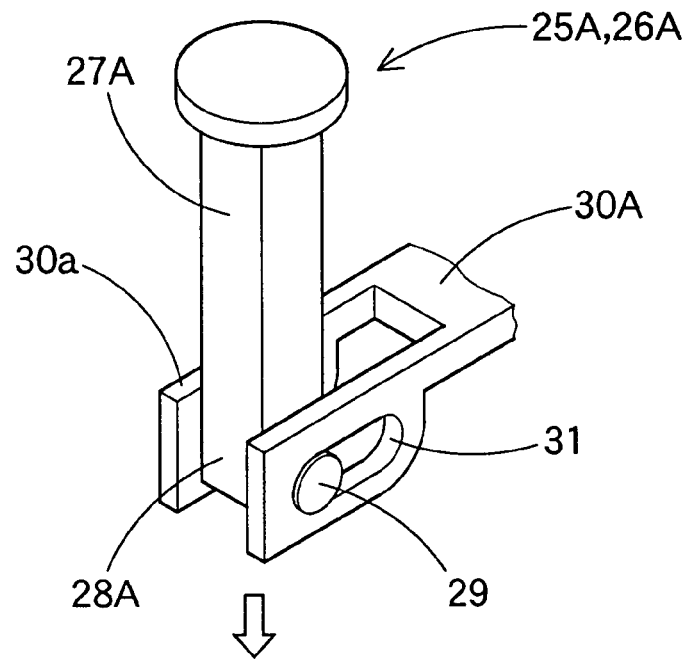
FIGS. 10A and 10B are partial perspective views of a rotation drive mechanism used for the second embodiment in operation.
Figure 10B:
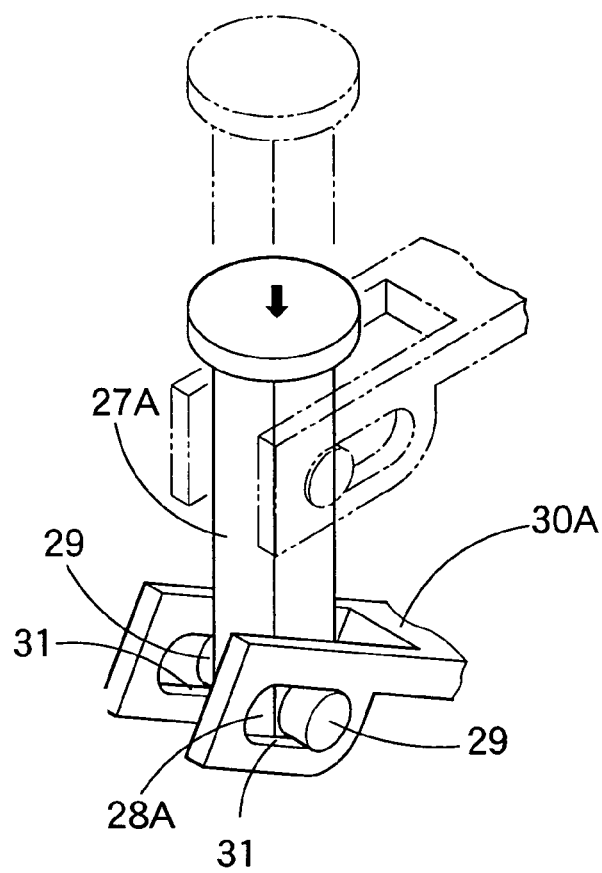
Figure 11:
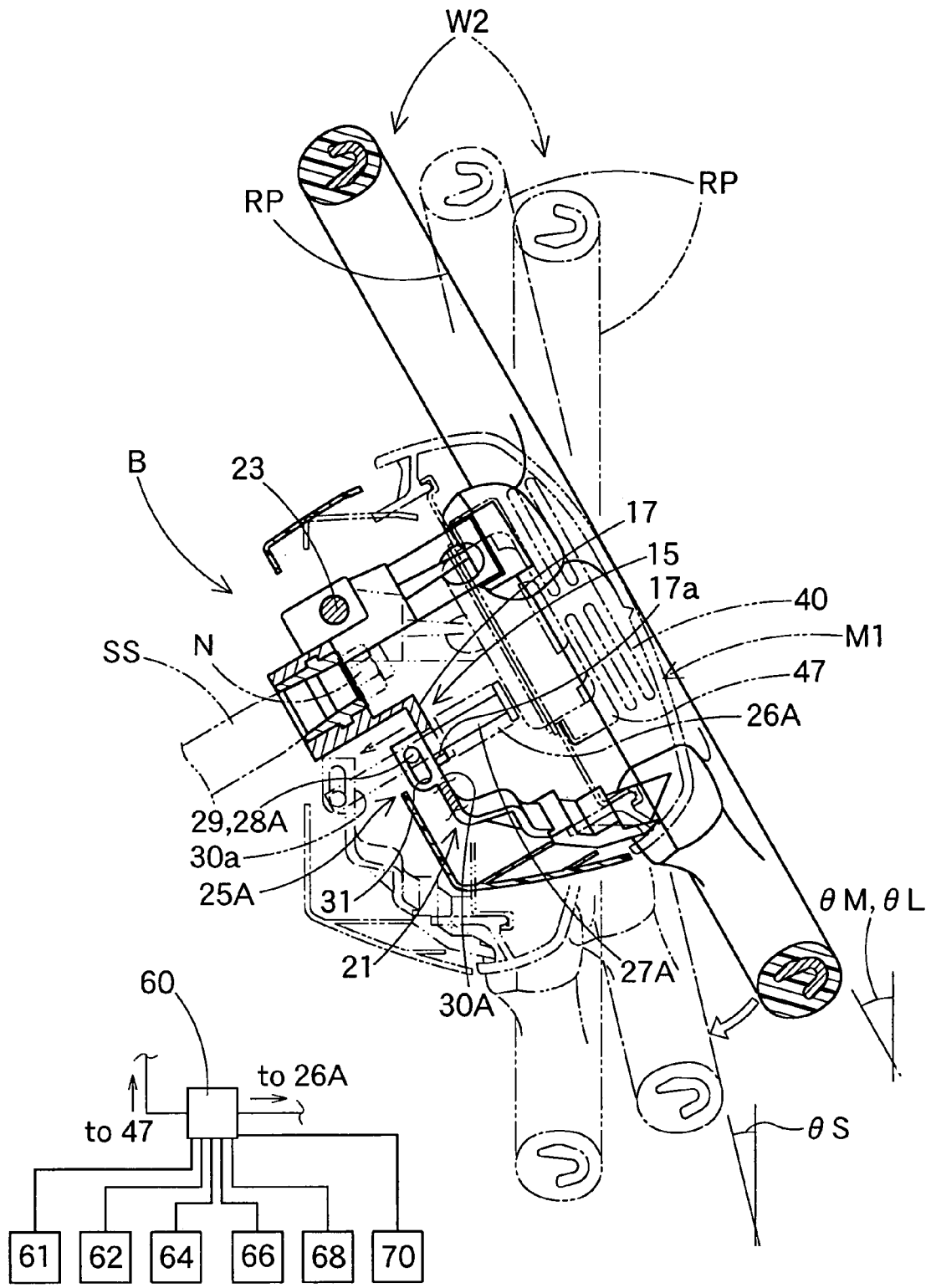
FIG. 11 is a schematic vertical section of a steering wheel according to the second embodiment.
Figure 12A:
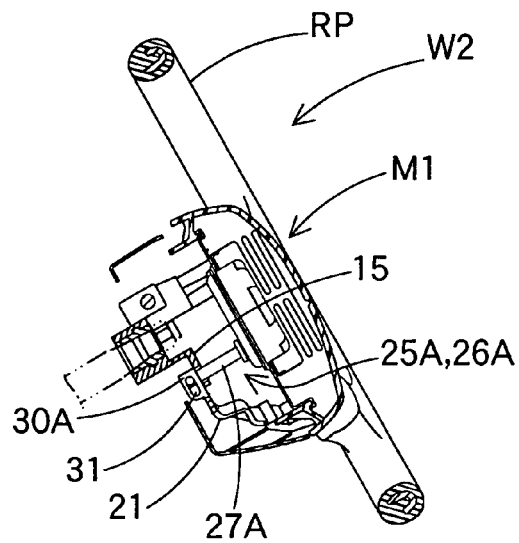
FIGS. 12A, 12B and 12C schematically show a returning process of the ring plane to the original position by operation of a rotation drive mechanism of the steering wheel of the second embodiment in order.
Figure 12B:
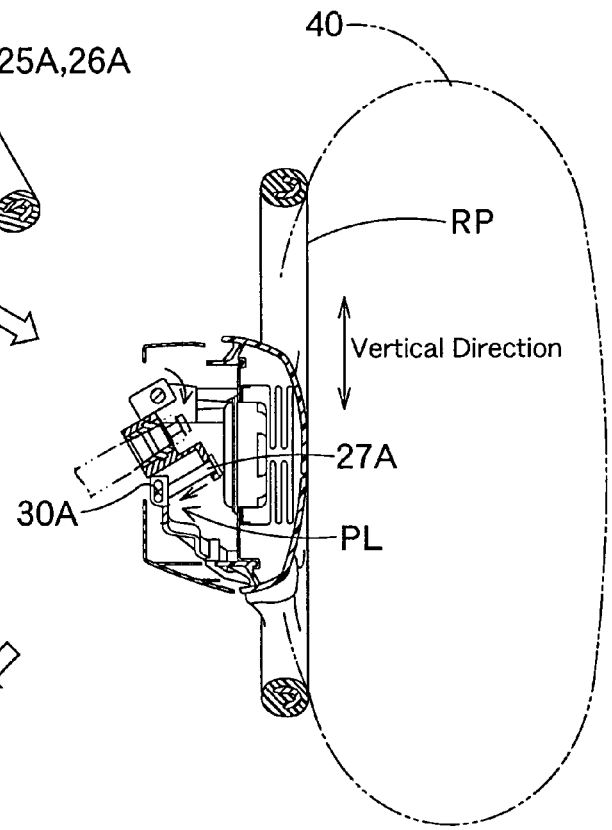
Figure 12C:
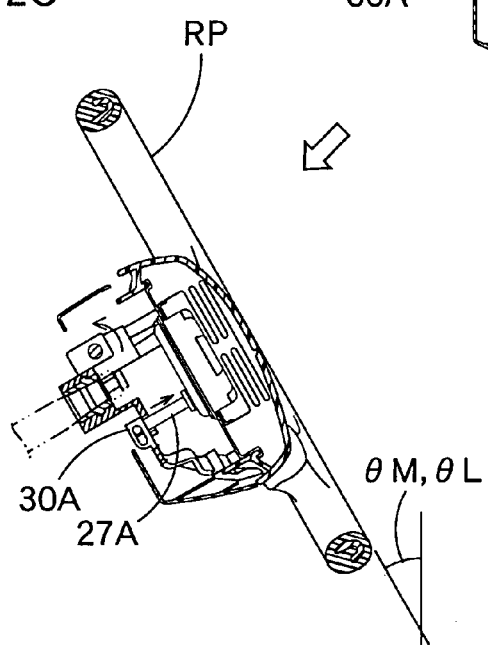

As shown in FIGS. 10A, 10B and 11, a rod 27A of actuator 26A to be pushed out downward upon operation has a pin 29 formed in such a manner as to project from the leading end of rod 27 or a pressing or engaging portion 28. A movable base 30A of ring side division 21 has an elongate guide hole 31 (FIG. 11) extending in parallel with ring plane RP. Pin 29 is inserted through guide hole 31 for sliding therein. As shown in FIGS. 12A, 12B and 12C, when rod 27A plunges, pin 29 pushes down movable base 30A while sliding on the inner (and lower) circumference of guide hole 31. When rod 27A moves upward to return to the original position, pin 29 lifts movable base 30A while sliding on the inner (and upper) circumference of guide hole 31 and thereby putting steering wheel W2 into a standby mode for a next chance of crash or holding ring side division 21 at the position of large angle θL of ring plane RP (refer to FIG. 13B or double-dotted lines in FIG. 11). Further stopping rod 27A at intermediate position PS between maximum projected position PL and the original position will allow ring side division 21 to be held at the position of small angle θS of ring plane RP (refer to single-dotted lines in FIG. 11).

Figure 13A:
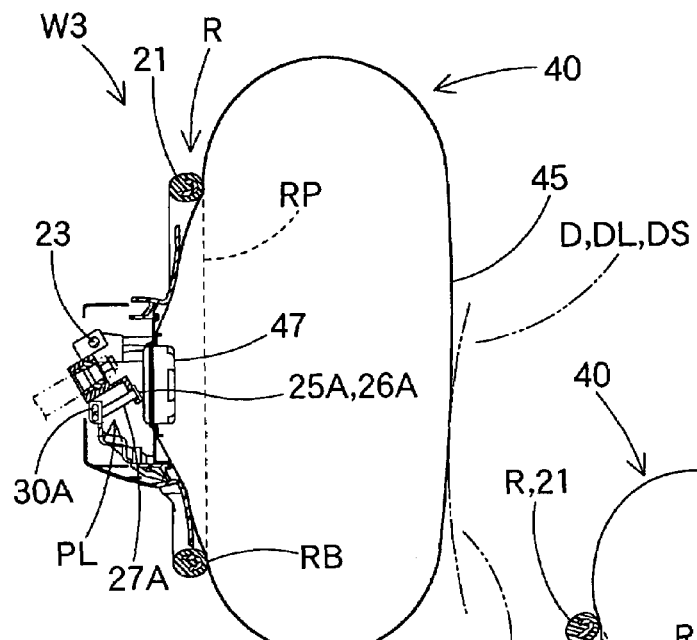
FIGS. 13A, 13B and 13C illustrate the way the steering wheel of the second embodiment deals with a driver coming close with his head plunged forward and the way the rotation drive mechanism operates then.
Figure 13B:
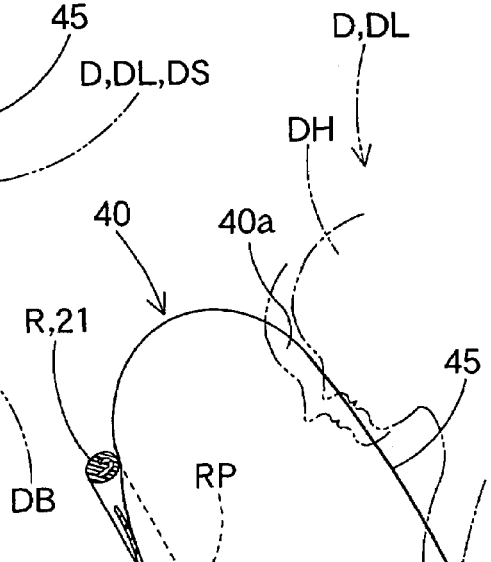
Figure 13C:
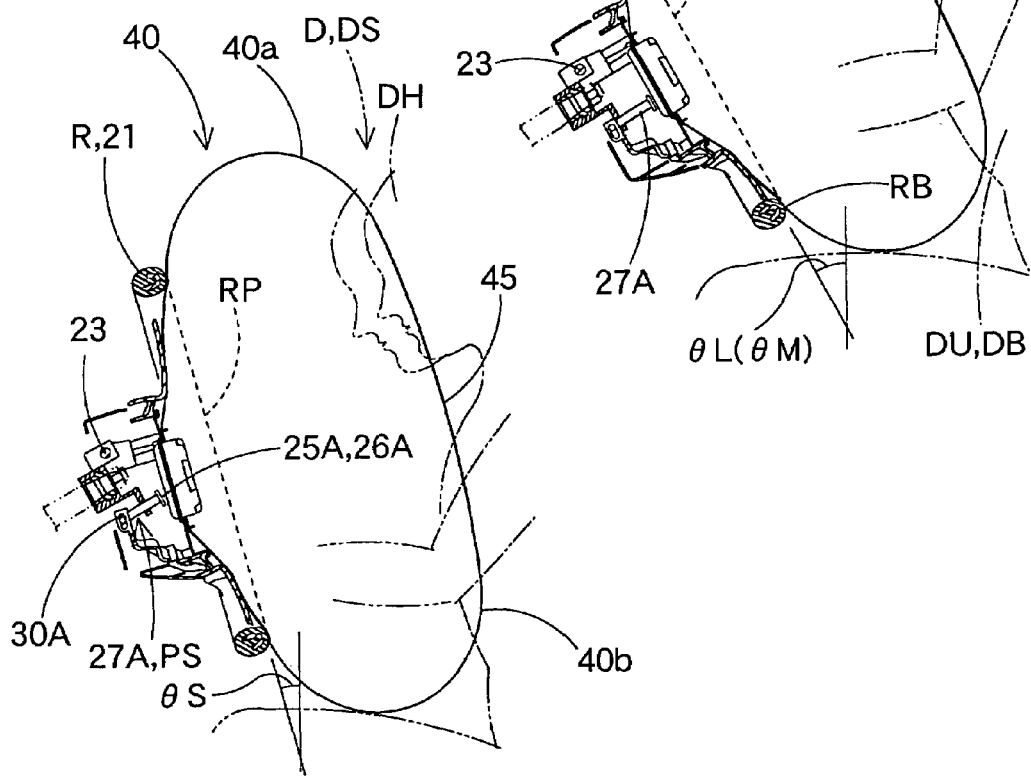

The second embodiment has a similar structure to the first embodiment except in that actuator 26A conducts both the rotational transfer and return movement of ring side division 21. Therefore, the second embodiment operates similarly to the first embodiment including the advantages that airbag 40 is capable of receiving belted driver D (DL or DS)(FIG. 13A), large driver DL approaching airbag 40 inclined forward (FIG. 13B), and undersized driver DS approaching airbag 40 inclined forward (FIG. 13C).

Figure 14:
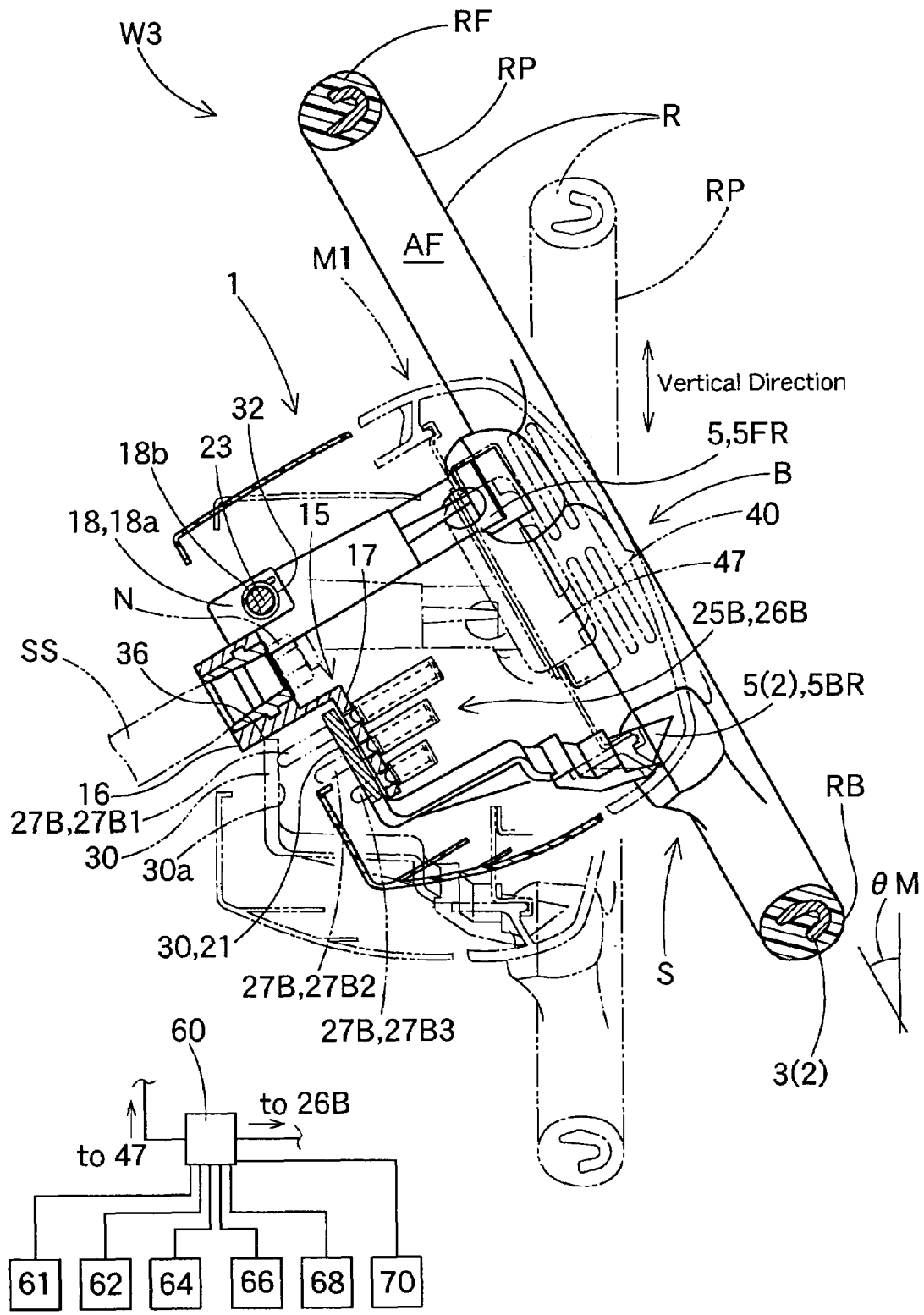
FIG. 14 is a schematic vertical section of a steering wheel according to the third embodiment.
Figure 15A:
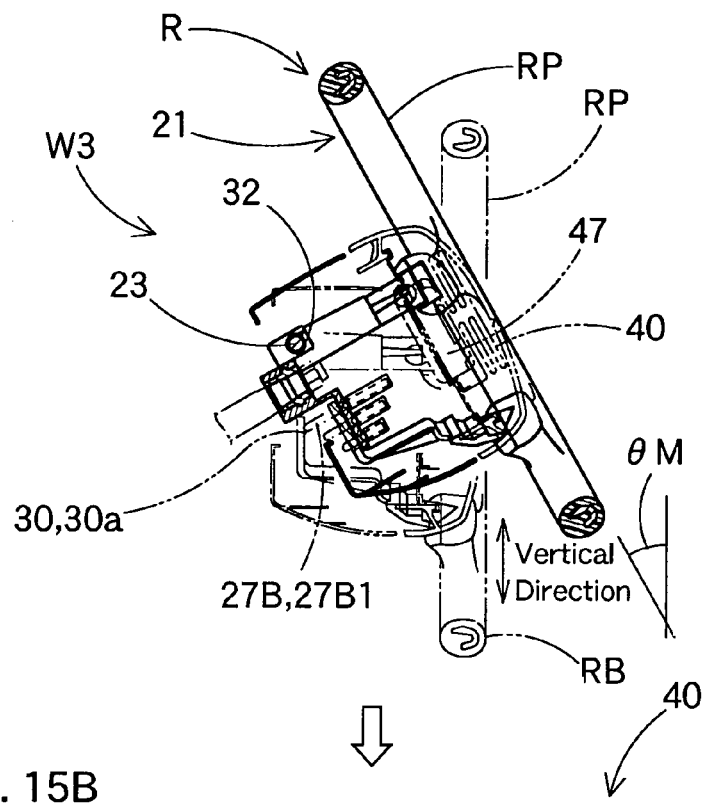
FIGS. 15A and 15B illustrate the steering wheel of FIG. 14 in operation in order by vertical sections.
Figure 15B:
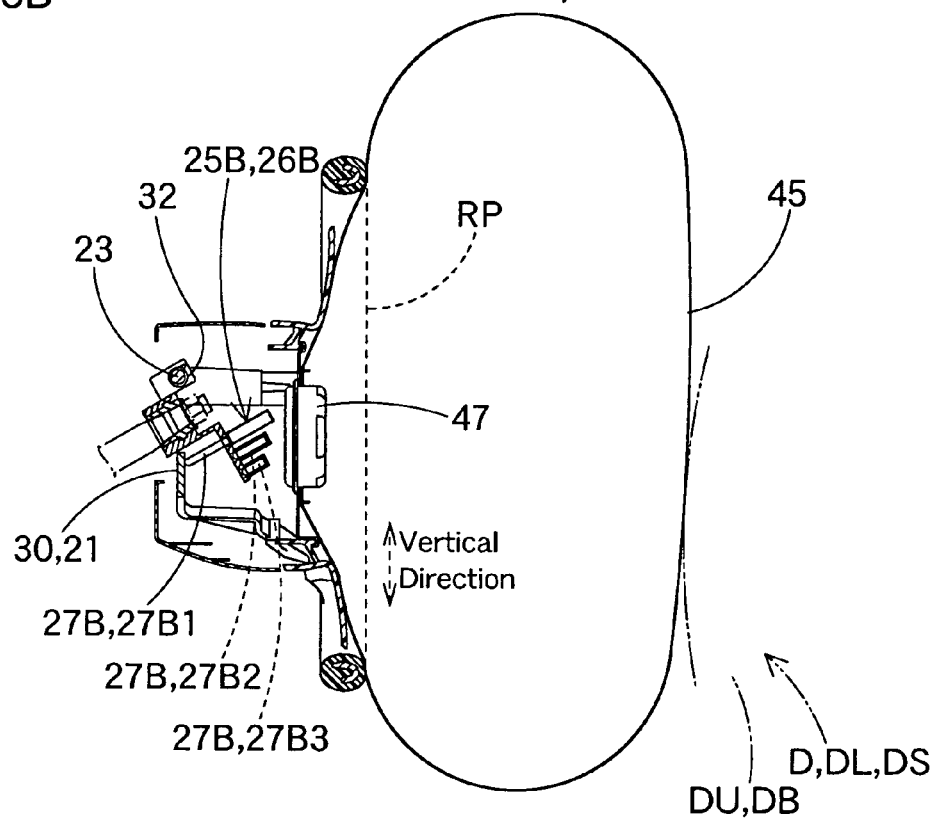

FIGS. 14, 15A, 15B, 16A, 16B and 16C illustrate a steering wheel W3 according to the third embodiment of the present invention. In the third embodiment, the large angle θL of ring plane RP from the vertical direction for receiving large driver DL is shallower than the original angle θM of ring plane RP before the operation of rotation drive mechanism 25B (FIGS. 15A and 16A). Large driver DL is received by airbag 40 supported by ring R whose ring plane RP is held at large angle θL.

The third embodiment differs from the first embodiment only in that an actuator 26B is formed by a plurality (three, in this specific embodiment) of electromagnetic solenoids whose rods 27B, 27B1, 27B2 and 27B3 have different maximum projected lengths (FIG. 14). Other structural details being similar to those of the first embodiment, descriptions of the same or similar members will be omitted by using common reference numerals.

In the third embodiment, if control device 60 judges that an impact is unavoidable based on signals fed from pre-crash sensor 62, it activates actuator 26B to launch rod 27B1 which has the longest projected length. If rod 27B1 presses the top face 30a of movable base 30 of ring side division 21, ring side division 21 rotates clockwise about rotary shaft 23 resisting the biasing force of springs 32 such that ring plane RP is aligned along the vertical direction (see solid lines and double-dotted lines in FIGS. 14, 15A and 15B).

If control device 60 acknowledges that the impact was avoided within a predetermined time period, it retracts rod 27B1 so ring side division 21 returns to the original position.

On the contrary, if control device 60 detects a collision based on signals fed from crash sensor 61, it activates inflator 47 to inflate airbag 40 (FIG. 15B), so that torso DB of driver D is received by protection plane 45 expanded wide and upright of airbag 40, thereby the kinetic energy of driver D is absorbed.

Thereafter, if control device 60 makes sure that a seated driver D is belted based on seatbelt sensor 70, it maintains rod 27B1 as is projected so ring side division 21 is fixed with ring plane RP oriented upright (FIG. 16C). In this case, the whole protection plane 45 of airbag 40 supported by ring R will expand along the vertical direction, i.e., in parallel to upper body DU including torso DB and head DH of driver D moving forward. Therefore, airbag 40 will be able to receive head DH of driver D with enough cushioning property, which head will move forward in parallel to torso DB without being inclined forward.

On the other hand, if control device 60 identifies driver D as an unbelted large driver DL based on information from driver sensor 66, distance sensor 68 and seatbelt sensor 70, protection plane 45 of airbag 40 expanded wide and upright firstly receives torso DB of large driver DL (FIG. 15B) to absorb the kinetic energy of driver DL. Then control device 60 controls actuator 26B of rotation drive mechanism 25B to retract rod 27B1 and launch rod 27B3 having the shortest projected length in time with the entrance of head DH into airbag 40. As shown in FIG. 16A, then the biasing force of springs 32 rotates ring side division 21 counter-clockwise about rotary shaft 23, and springs 32 and rod 27B3 or pressing portion 28 of rotation drive mechanism 25B position ring side division 21 at a point where the angle of ring plane RP from the vertical direction is a large angle θL which is smaller than original angle θM (FIG. 15A) and hold it thereat. Accordingly, as shown in FIG. 16A, airbag 40 supported by ring R stably receives head DH of large driver DL with its upper area 40a having an enough thickness to exert cushioning property without wobbling.

If control device 60 identifies driver D as an unbelted undersized driver DS, protection plane 45 of airbag 40 expanded wide and upright firstly receives torso DB of undersized driver DS (FIG. 15B) to absorb the kinetic energy of driver DS. Then control device 60 controls actuator 26B of rotation drive mechanism 25B to retract rod 27B1 and launch rod 27B2 having a middle projected length in time with the entrance of head DH into airbag 40. As shown in FIG. 16B, then the biasing force of springs 32 rotates ring side division 21 counter-clockwise about rotary shaft 23, and springs 32 and rod 27B2 or pressing portion 28 of rotation drive mechanism 25B position ring side division 21 at a point where the angle of ring plane RP from the vertical direction is a small angle θS smaller than large angle θL (FIG. 16B) and hold it thereat. Hence airbag 40 supported by ring R stably receives head DH of undersized driver DS with its upper area 40a having an enough thickness to exert cushioning property while lower area 40b of airbag 40 supported by ring R does not press torso DB of driver DS.

If there is a possibility that a belted driver D enter airbag 40 with his/her head DH inclined forward, it will be appreciated that airbag 40 initially inflates upon ring plane RP aligned along the vertical direction so as to receive torso DB of driver D with its protection plane 45 expanded wide and upright (FIG. 15B) and absorb the kinetic energy of driver D, and that ring plane RP is then displaced to the position where its angle from the vertical direction is small angle θS (FIG. 16B) so airbag 40 receives head DH of driver D with its upper area 40a having an enough thickness to exert cushioning property.

In the third embodiment, when a driver D does not wear a seatbelt, it will also be appreciated, irrespective of the size of driver D, that airbag 40 initially inflates upon ring plane RP aligned along the vertical direction so as to receive torso DB of driver D with its protection plane 45 expanded wide and upright (FIG. 15B) and absorb the kinetic energy of driver D, and that ring plane RP is then displaced to the position where its angle from the vertical direction is large angle θ L (FIG. 16A) smaller than original angle θM (FIG. 15A) in time with the entrance of head DH into airbag 40 so airbag 40 receives head DH of driver D with its upper area 40a having an enough thickness.

In the first and second embodiments, too, when a driver D is not belted, it will be appreciated, irrespective of the size of driver D, that airbag 40 initially inflates upon ring plane RP aligned along the vertical direction so as to receive torso DB of driver D with its protection plane 45 expanded wide and upright (FIGS. 6 and 13A) and absorb the kinetic energy of driver D, and that ring plane RP is then displaced to the position where its angle from the vertical direction is small angle θS (FIGS. 9B and 13C) smaller than original angle θM (FIGS. 8B and 13B) in time with the entrance of head DH into airbag 40 so airbag 40 receives head DH of driver D with its upper area 40a having an enough thickness.

Figure 17:
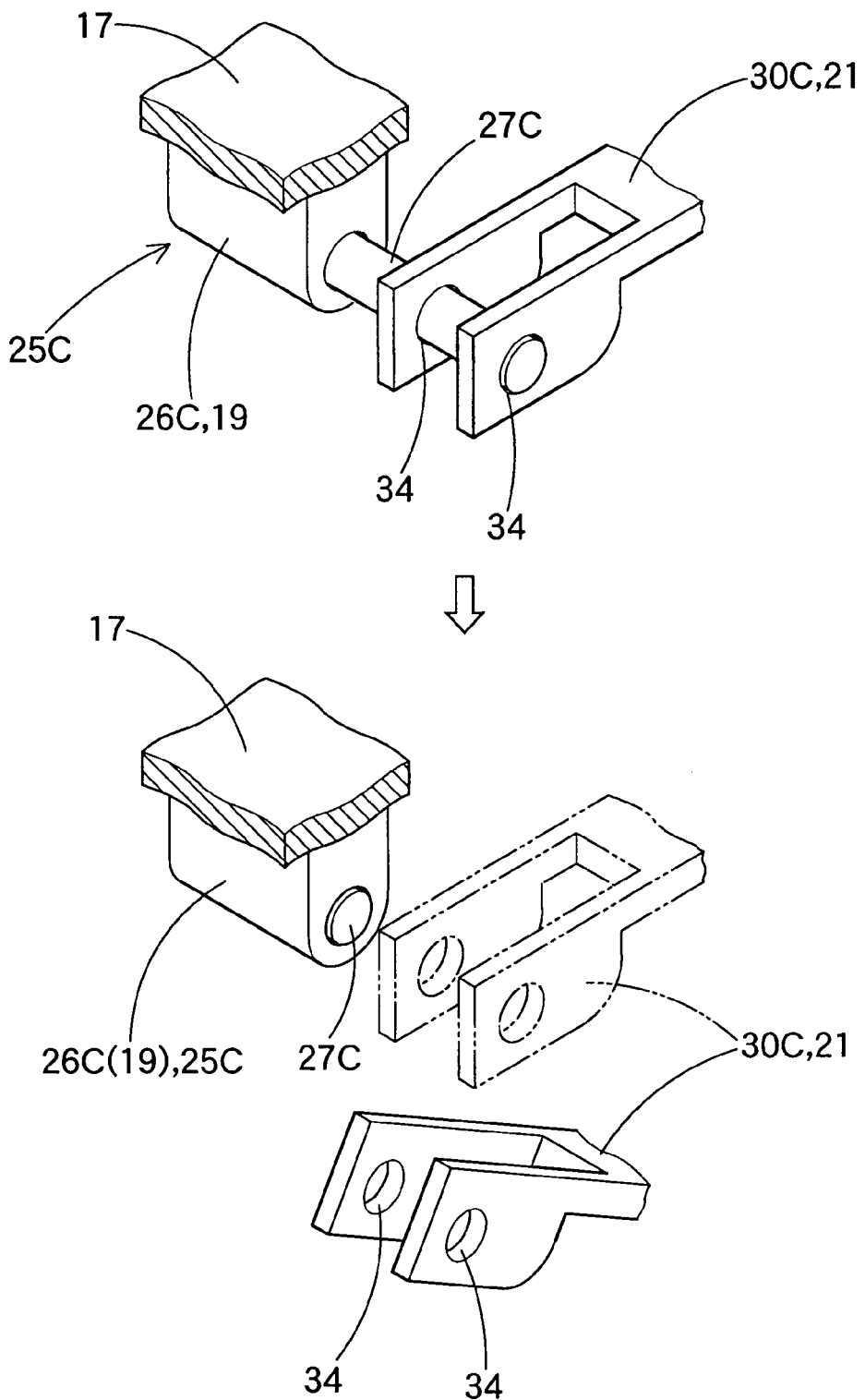
FIG. 17 shows partial perspective views of a rotation drive mechanism used for the fourth embodiment in operation.
Figure 18A:
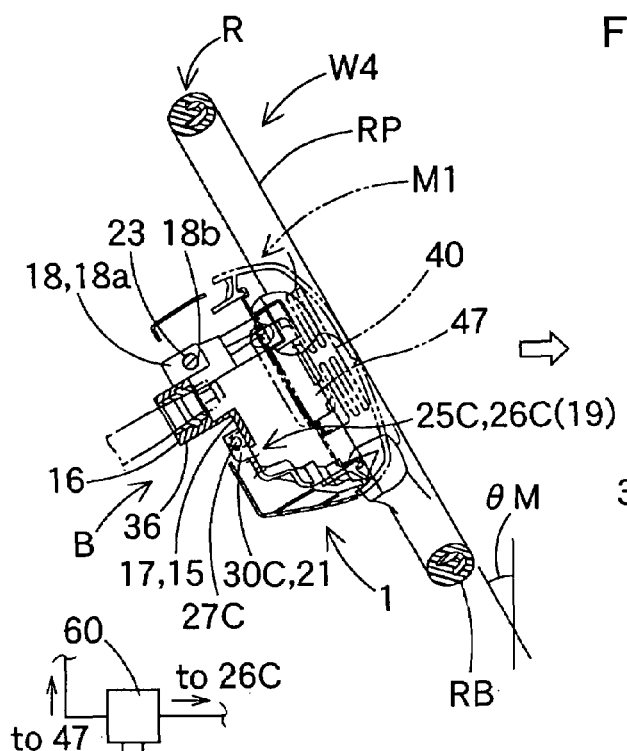
FIGS. 18A, 18B and 18C illustrate the steering wheel of the fourth embodiment in operation in order by vertical sections.

The fourth embodiment of the present invention will now be described referring to FIGS. 17 to 19B. In a steering wheel W4 of the fourth embodiment, the weight of ring side division 21 is used as a drive source of rotation drive mechanism 25C for pushing down ring side division 21. Specifically, in the fourth embodiment, an actuator 26C of rotation drive mechanism 25C is a holding member 19 formed of an electromagnetic solenoid operating to retract a rod 27C by control device 60. Actuator 26C or holding member 19 is attached to a mounting base 17 of shaft side division 15. As shown in FIG. 17, holding member 19 holds ring side division 21 from falling down by its rod 27C projected to be put through retaining holes 34 formed on a movable base 30C of ring side division 21. When control device 60 activates holding member 19 to pull rod 27C out of retaining holes 34, rod 27C stops retaining movable base 30C, and therefore, as shown in FIGS. 18A and 18 B, ring side division 21 rotates about rotary shaft 23 by its own weight such that ring plane RP is aligned along the vertical direction. At this time, movable base 30C hits a stopper 36 which is an outer circumference of tubular region 16 of shaft side division 15, thereby stopping further rotation of ring side division 21 and holding ring plane RP in the upright orientation. The fourth embodiment does not include springs 32 for returning ring side division 21 to the original position. Accordingly, unless a forward pressing force is applied to an upper (or front, before being displaced) part RF of ring R in the upright orientation, ring side division 21 does not rotate forward to move the part RF back forward. In other words, after once rotation drive mechanism 25C is activated, if such forward pressing force is applied to upper or front part RF of ring R, ring side division 21 and ring plane RP are allowed to rotate toward the original position (the position before activation of drive mechanism 25C, see FIG. 18A) along with the pressing force.

The fourth embodiment differs from the first only in the structures of actuator 26C of rotation drive mechanism 25C and of movable base 30C for holding rod 27C, in having no springs 32, and in not including pre-crash sensor 62, driver sensor 66 and seatbelt sensor 70. Other structural details being similar to those of the first embodiment, descriptions of the same or similar members will be omitted by using common reference numerals.

Figure 18B:
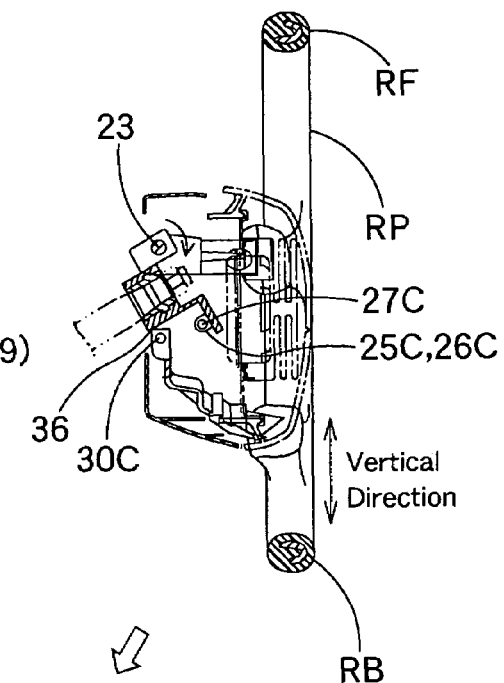

In operation of steering wheel W4 of the fourth embodiment, when control device 60 detects an impact based on signals from crash sensor 61 while traveling straight ahead, it activates actuator 26C or regulating member 19 to pull rod 27C out of retaining holes 34. Then as shown in FIGS. 18A and 18B, rod 27C stops holding movable base 30C thereby ring side division 21 rotates about rotary shaft 23 by its own weight such that ring plane RP is aligned along the vertical direction. Since movable base 30C abuts against stopper 36, ring plane RP is held in the upright orientation. Control device 60 further activates inflator 47 to inflate airbag 40 (FIG. 18C), so that airbag 40 receives torso DB of driver D by its protection plane 45 expanded wide and upright and absorbs the kinetic energy of driver D.

Figure 18C:
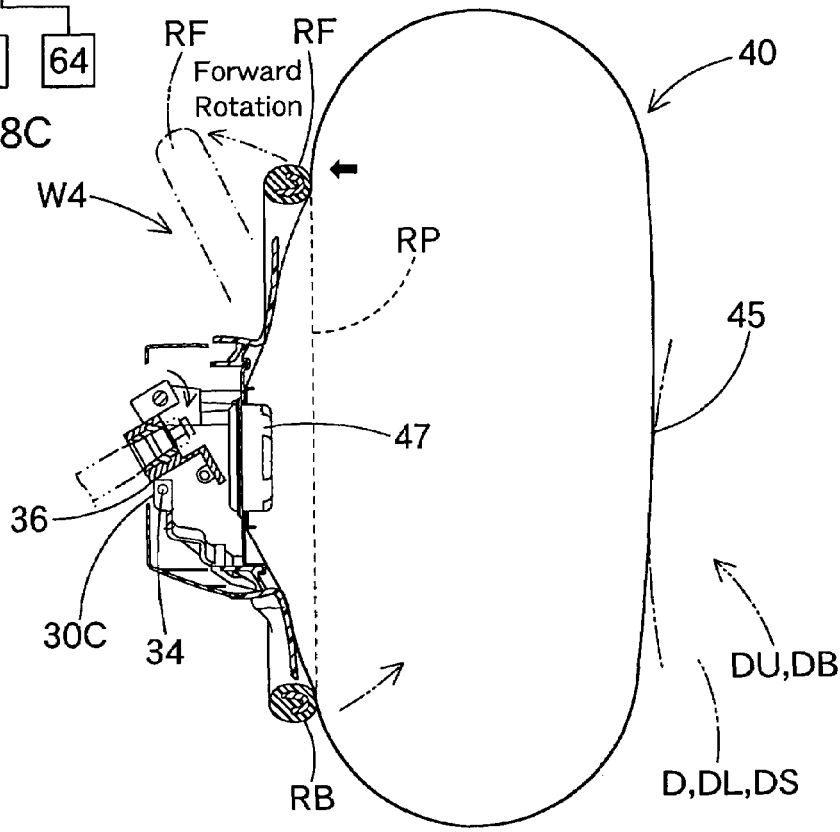
Figure 19A:
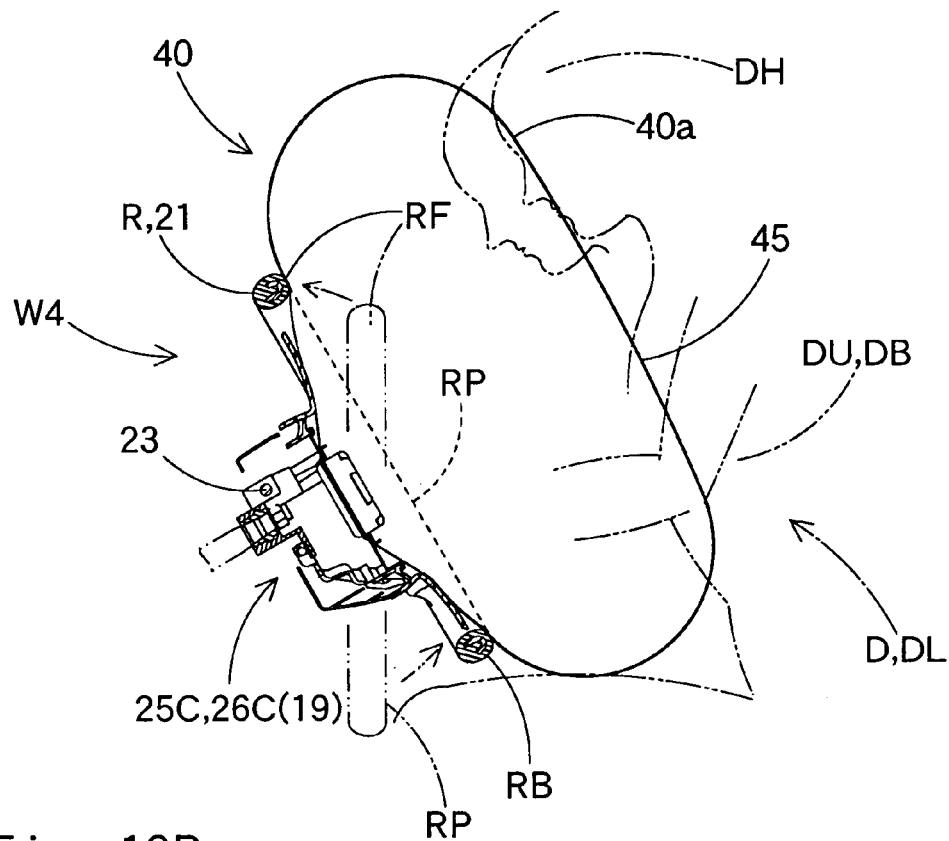
FIGS. 19A and 19B illustrate the way the steering wheel of the fourth embodiment deals with a driver coming close with his head plunged forward and the way the rotation drive mechanism operates then.
Figure 19B:
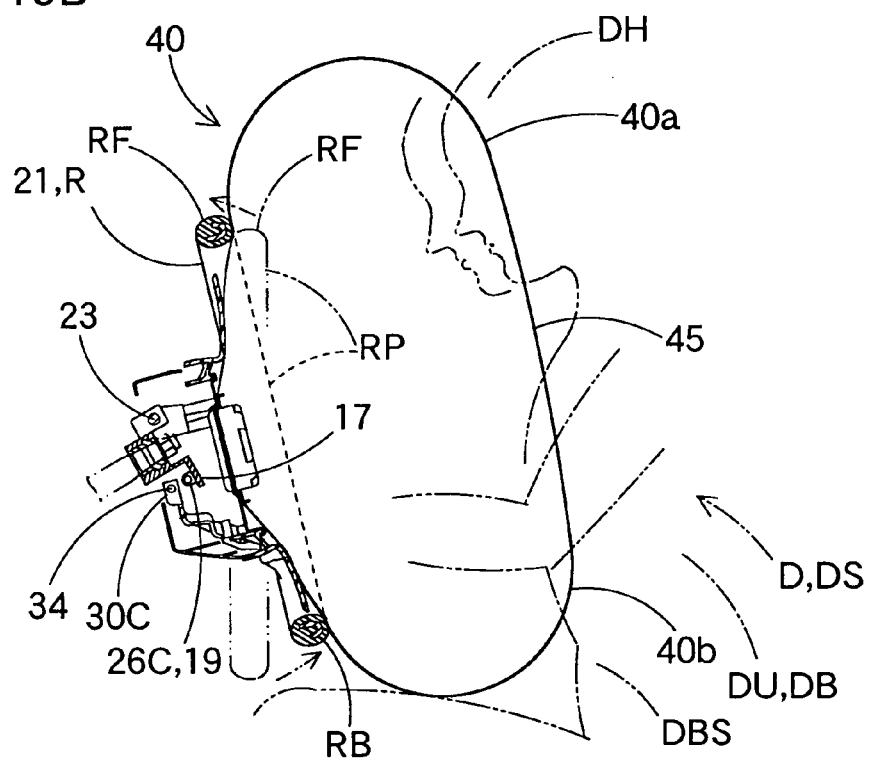

Further in the fourth embodiment, if rotation drive mechanism 25C is once activated to pull rod 27C out of retaining holes 34, ring side division 21 is freed from movement control and allowed to rotate toward the original position while the inflated airbag 40 receives driver D moving forward. If driver D is unbelted, airbag 40 initially receives torso DB of driver D with its protection plane 45 expanded wide and upright to absorb the kinetic energy of driver D. Thereafter, when head DH of driver D enters airbag 40, driver D comes entering into airbag 40 with his/her upper body DU plunged or inclined forward. At this time in the fourth embodiment, as shown in FIGS. 18C, 19A and 19B, the whole protection plane 45 of airbag 40 rotates forward in such a manner as to move upper part 40a forward along with the movement of upper body DU of driver D together with ring side division 21, thereby allowing upper part 40a of airbag 40 to inflate to have enough thickness between head DH of driver D and upper or front part RF of ring R. Accordingly, airbag 40 receives head DH of driver D by its upper part 40a with enough cushioning property.

In such an arrangement where ring side division 21 is movable according to the entering manner of driver D into airbag, the weight of ring side division 21 does not necessarily have to be used in the initial stage of operation of rotation drive mechanism 25C as in the fourth embodiment. For instance, it will be appreciated to arrange steering wheel W2 of the second embodiment as follows: Actuator 26A of rotation drive mechanism 25A is activated to launch rod 27A up to maximum projected position PL so ring side division 21 is pushed downward (FIGS. 12A and 12B). After airbag 40 is further inflated, power distribution to actuator 26A is stopped. Then rod 27A loses its pressing force and allows ring side division 21 to rotate forward. Accordingly, in steering wheel W2, too, the whole protection plane 45 of airbag 40 is allowed to move along with the movement of upper body DU of driver D as shown in FIGS. 13A, 13B and 13C, together with ring side division 21, so upper part 40a of airbag 40 moves forward.

Figure 20A:
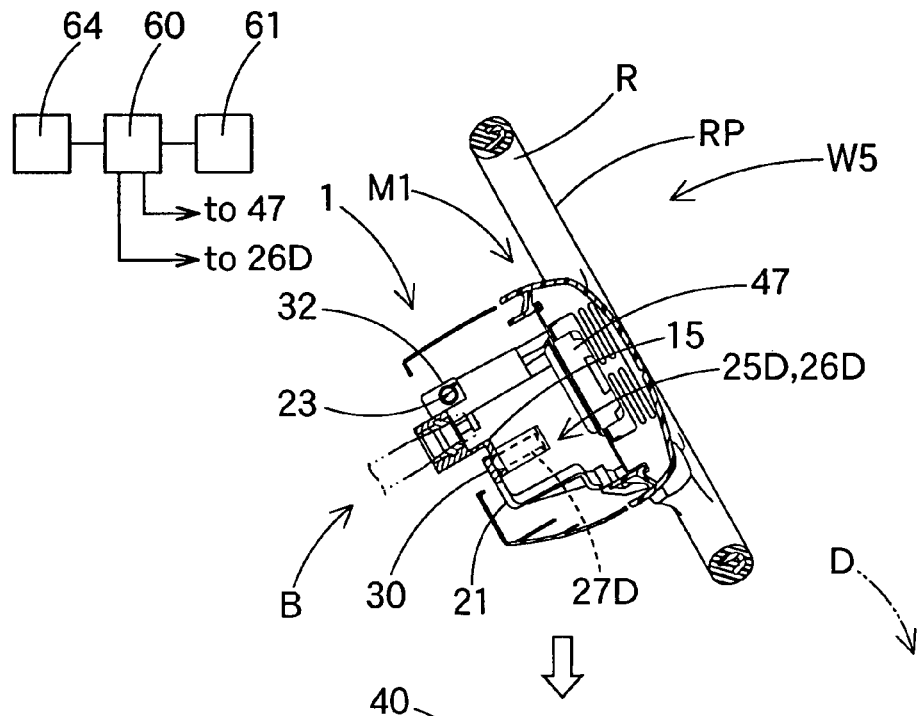
FIGS. 20A and 20B illustrate a steering wheel of the fifth embodiment in operation in order by vertical sections.
Figure 20B:
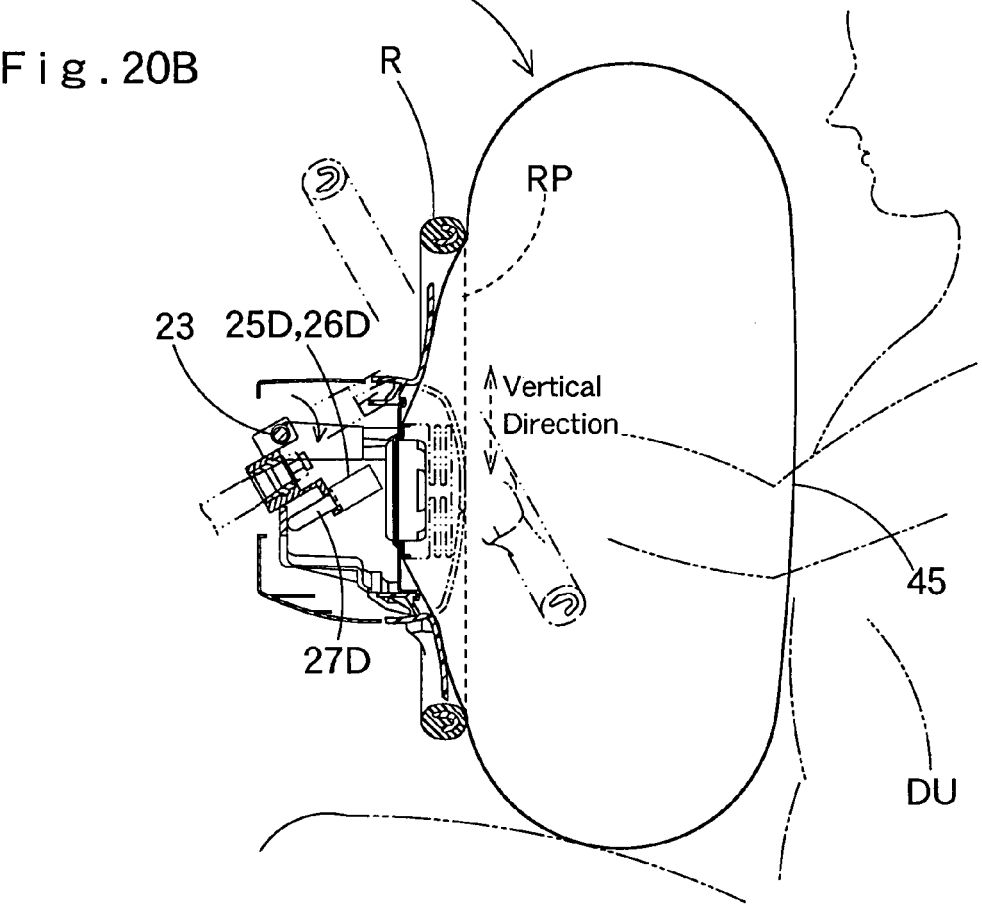

FIG. 20 illustrates the fifth embodiment of the present invention. Steering wheel W5 of the fifth embodiment employs an actuator 26D such as a micro gas generator using pressure of combustion gas generated by ignition without considering a return movement of ring side division 21 after once being moved. Actuator 26D is activated together with inflator 47 when control device 60 detects a crash based on signals from crash sensor 61. Except these points, the fifth embodiment are similar to the first embodiment in other structural details, and therefore, the fifth embodiment will achieve the same working-effects as in the best receiving mode of belted driver D in the first embodiment.

It is sufficient that the rotation drive mechanism 25D completes its operation to rotate ring side division 21 such that ring plane RP is aligned along the vertical direction by the time an advancing driver D engages the inflated airbag 40. Accordingly, the mechanism 25D does not have to be operated simultaneously with inflator 47, but may be operated before or after inflator 47.

Figure 21A:
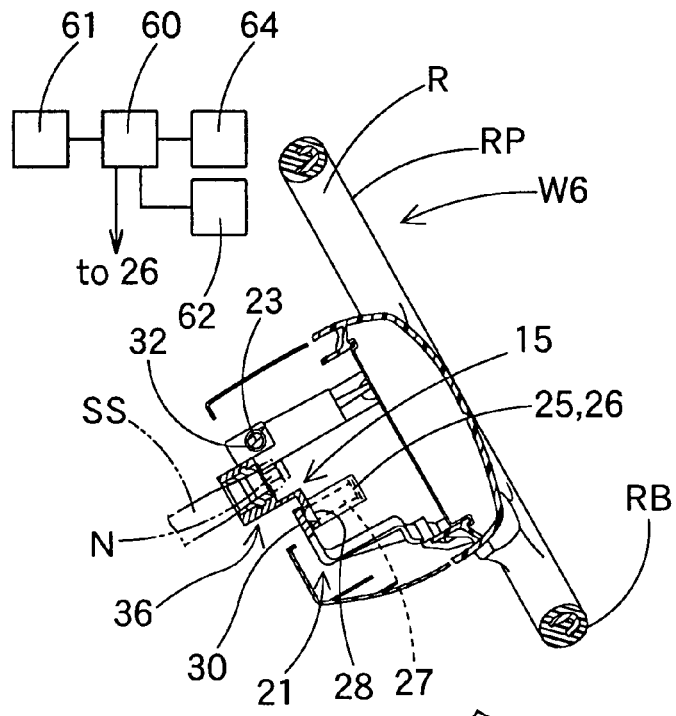
FIGS. 21A, 21B and 21C illustrate a steering wheel of the sixth embodiment in operation in order by vertical sections.
Figure 21B:
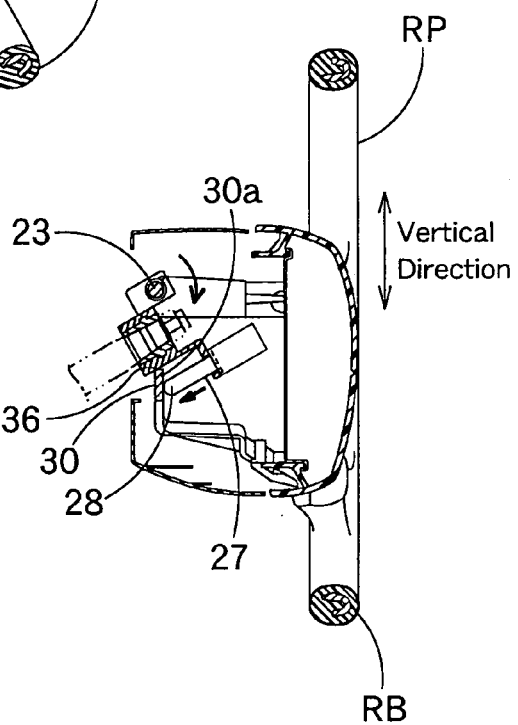
Figure 21C:
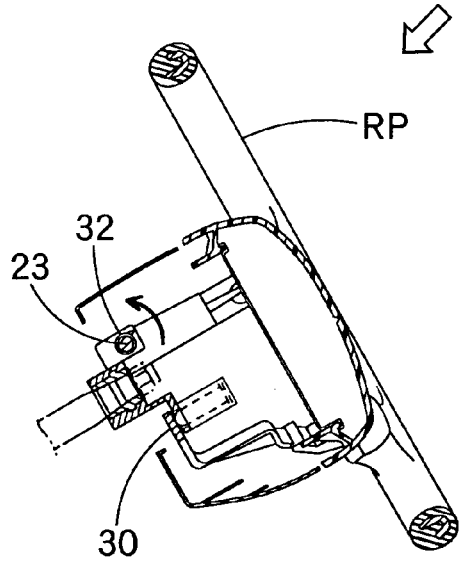

FIG. 21 illustrates the sixth embodiment of the present invention. Steering wheel W6 of the sixth embodiment is similar to the first embodiment in the structure except in that wheel W6 does not include an airbag apparatus. Therefore, descriptions of common members will be omitted by using common reference numerals.

Even with such steering wheel W6, if rotation drive mechanism 25 is activated, ring plane RP is forced to be aligned along the vertical direction and ring side division 21 is held thereat. At this time, although driver D may contact with ring R with no airbag deployed there between, as described above, ring plane RP expands along the vertical direction, i.e., along the front side of upper body of the driver, and therefore, ring R will not hit the driver partially with its rear or lower portion RB, but will receive the driver evenly with its respective regions out of wide face. Moreover, rotation drive mechanism 25 for rotating ring side division 21 is mounted on steering wheel W6 itself, not on steering shaft SS away downward from wheel W6. This structure makes the turning radius of ring side division 21 small, and therefore, when ring R is rotated to align ring plane RP along the vertical direction, the downward displacement of ring R is kept to a minimum.

In steering wheels W1 to W6 according to the first to sixth embodiments, when rotation drive mechanism 25, 25A, 25B, 25C and 25D completes its operation to rotate ring R, ring plane RP is aligned along the vertical direction. However, ring plane RP after rotation of ring R does not necessarily have to expand along the exact vertical direction. Instead, front part RF of ring R may be located slightly front side or rear side of a right-above position of rear part RB of ring R. Ring plane RP after operation of rotation drive mechanism 25 is, however, most desirably aligned along the vertical direction because with that arrangement ring plane RP expanded wide and upright is disposed orthogonal to the forward and horizontal moving direction of upper body DU of drive D upon an impact of vehicle, so that protection plane 45 of the fully inflated airbag 40 is disposed head-on against upper body DU of driver D, or in an instance without airbag 40, ring plane RP is disposed head-on against the front side of upper body DU of driver D. That is, upper body DU of driver D will be received while the reaction force is suppressed.

Steering wheels W1 to W6 may be constructed to absorb the kinetic energy of driver D by plastically deforming core metal 2 or the like after operation of rotation drive mechanisms 25, 25A, 25B, 25C and 25D. For instance, a plastically alignment control units PD is formed on a steering wheel by reducing the sectional area of a portion of spoke core 5 as indicated by double-dotted lines in FIG. 3. If spoke core 5 is bent or plastically deformed at alignment control unit PD, ring plane RP is moved forward as a whole from the upright orientation.

Moreover, in the case where rotation drive mechanisms 25, 25A and 25B are controlled by control drive 60 which can estimate a crash before an actual crash, the timing to activate the rotation drive mechanisms may be varied. More specifically, if driver D is seated away rearward from steering wheels W1 to W3 or W6, . . . for example, a large driver will usually be seated away from steering wheel, and even an undersized driver may be seated toward the back . . . it will take longer time for driver D to reach a contact point on airbag 40 or ring plane RP from the seated position in comparison with an instance where driver D is seated toward the front. In that instance, the timing to activate the rotation drive mechanisms may be adjusted to delay the timing to align ring plane RP vertically, and during which delayed time, driver D may steer the steering wheels to avoid an actual crash.

In addition to the adjustment of the timing to activate, rotation drive mechanism 25D of steering wheel W5 in the fifth embodiment may be constructed to be activated if driver D is unbelted whereas it will not if driver D is belted. For example, depending on a vehicle, even when belted, a driver sometimes gets inclined forward upon a frontal collision with his/her upper body or head moved forward whereas his/her waist fixed by seatbelt. In that instance, ring plane RP in the original position will correspond better to the front side of the upper body of the inclined driver than in the upright orientation, and therefore, rotation drive mechanism 25D may be set not to operate. However, if a belted driver is seated proximate steering wheel W5, rotation drive mechanism 25D is desirably activated for allowing a space for airbag 40, especially rear part RB of ring R, to inflate therein. Additionally, when a belted driver is seated proximate steering wheel W5 with no airbag 40, it is desired that rotation drive mechanism 25D is activated to move ring plane RP into the upright orientation. With that arrangement, rear part RB of ring R, which is projected toward driver's seat, is moved forward, so that ring plane RP expanded flat along the vertical direction is capable of receiving an upper body of the driver with reaction force suppressed.

Figure 22:
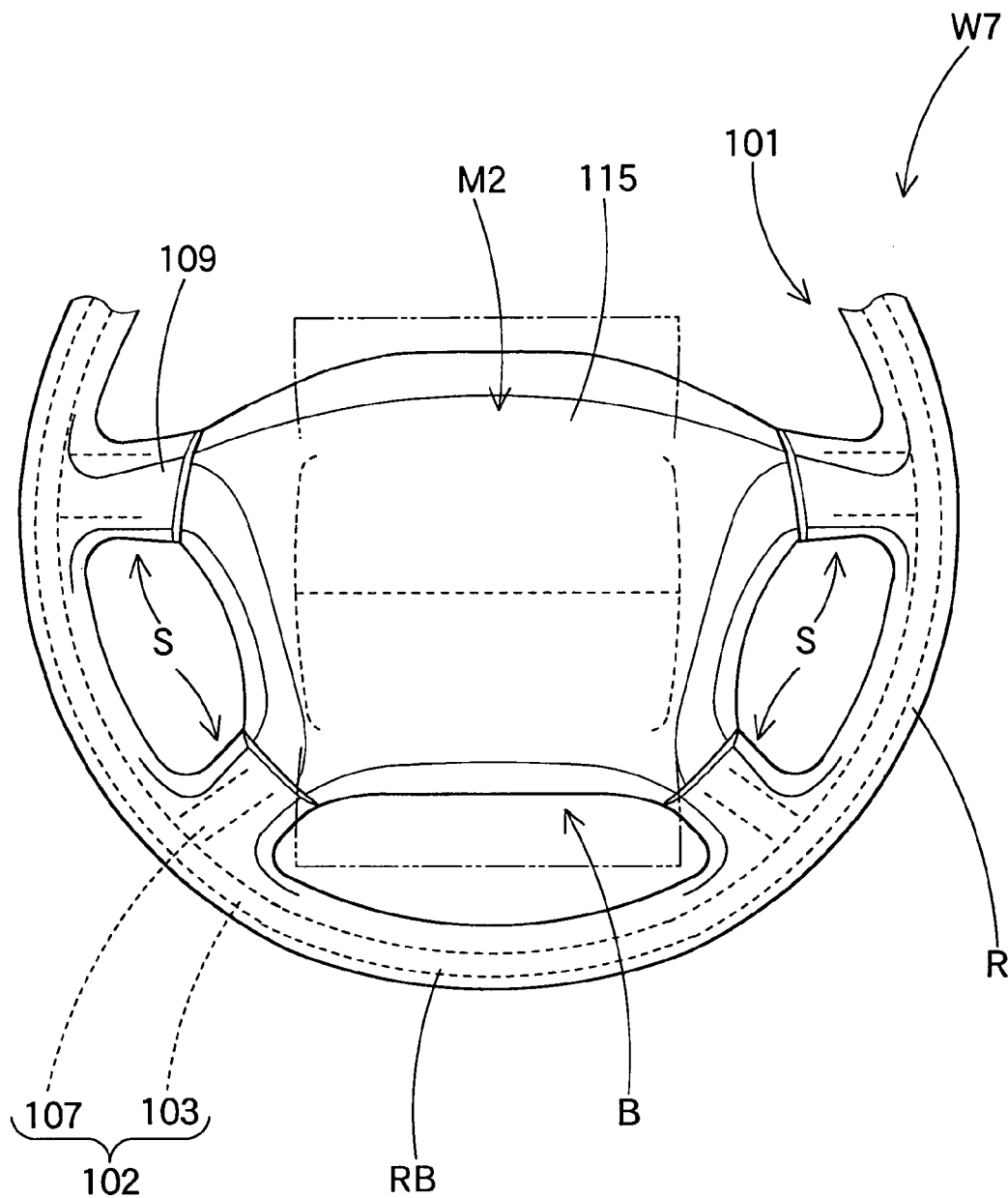
FIG. 22 is a partially omitted plan view of a steering wheel according to the seventh embodiment of the present invention.
Figure 23:
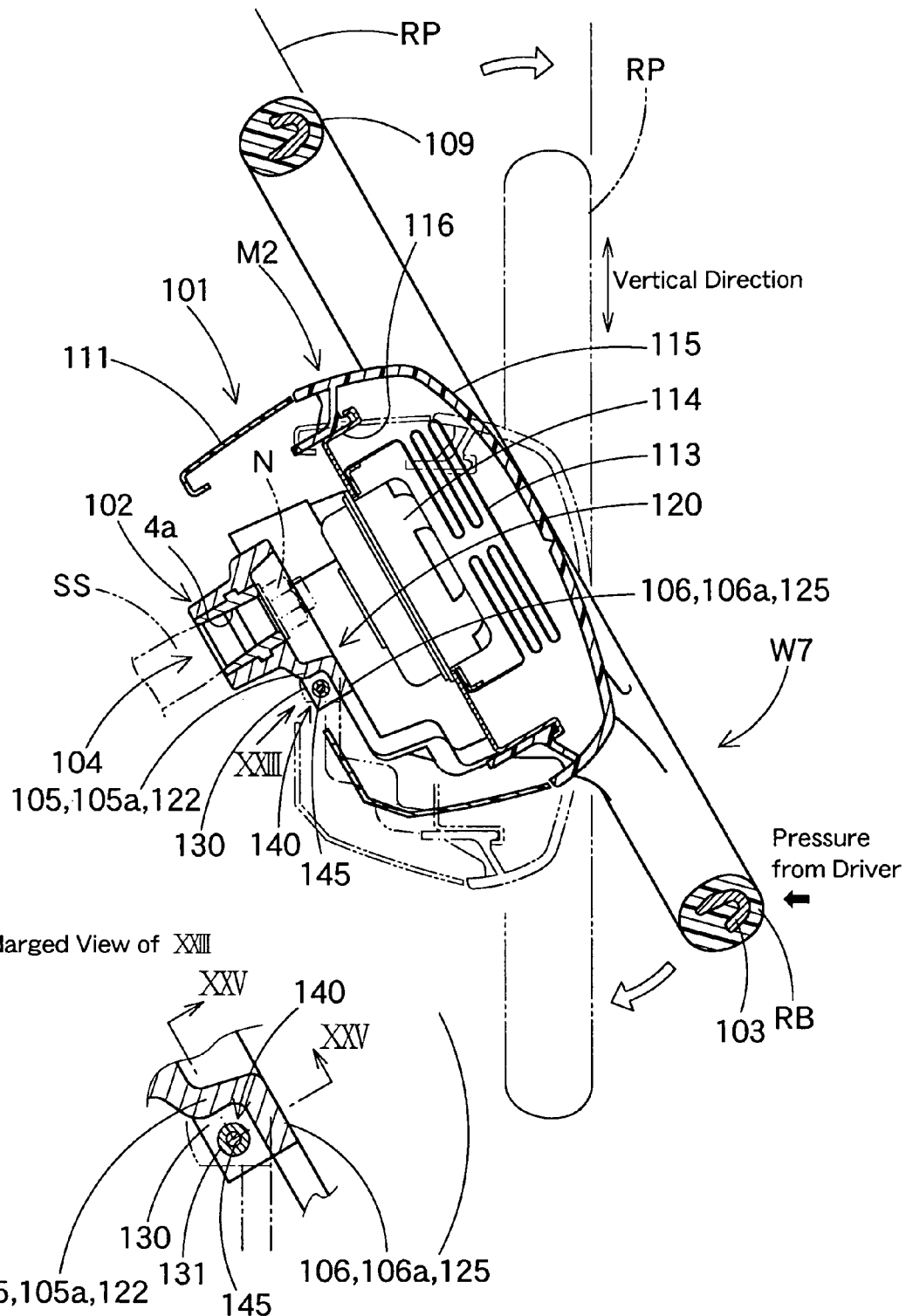
FIG. 23 is a schematic section of the steering wheel of FIG. 22 as is mounted on a vehicle.
Figure 24:
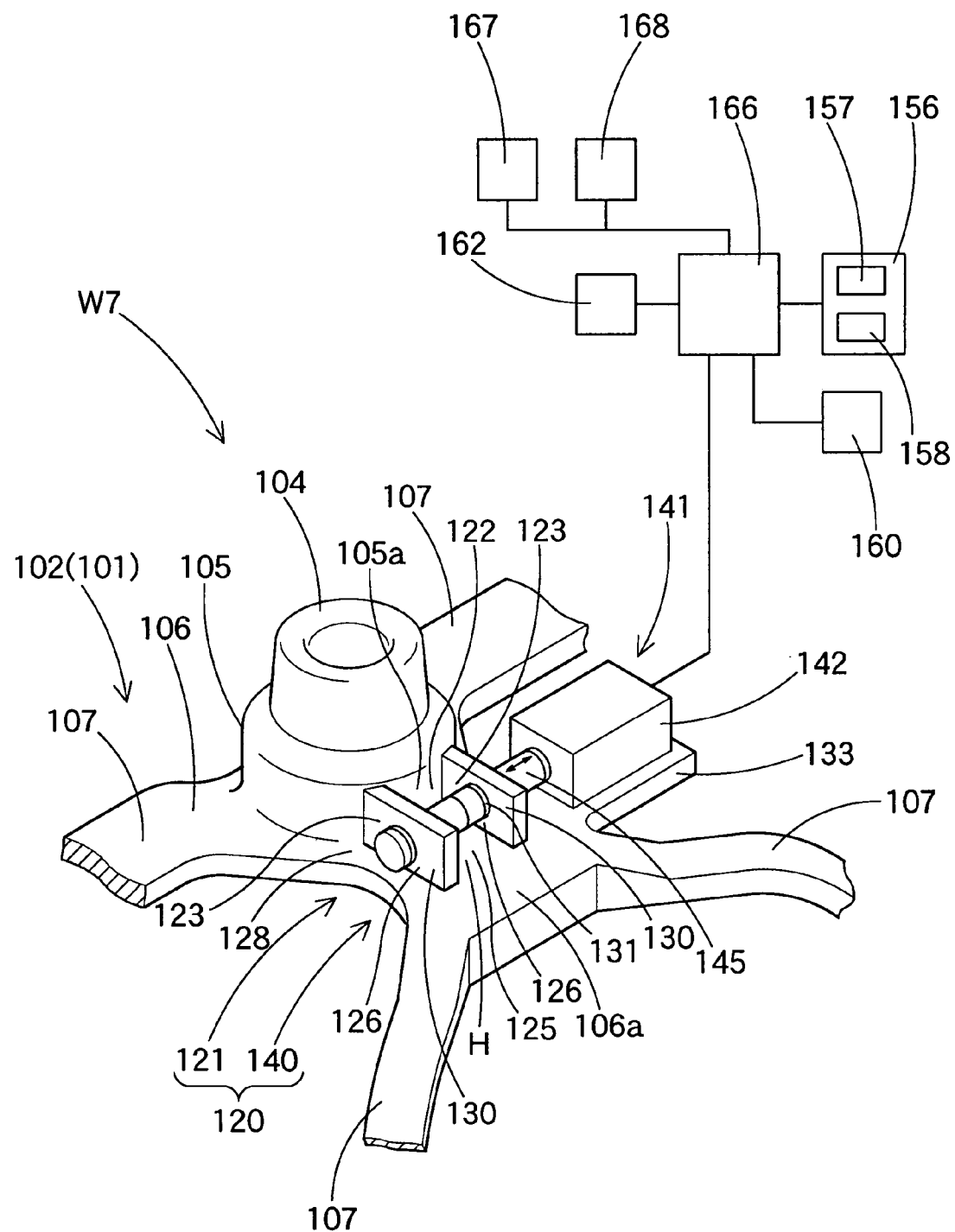
FIG. 24 is a perspective view of the vicinity of a boss core of a core of the steering wheel of FIG. 22 as viewed from bottom side.

FIGS. 22 to 24 illustrate a steering wheel W7 according to the seventh embodiment of the present invention. Steering wheel W7 includes a wheel body 101 and an airbag apparatus M2 disposed on top of a boss area B at the center of wheel body 101. Wheel body 101 includes an annular ring R, boss area B and four spokes S. Ring R is for holding at the time of steering operation. Boss area B is disposed at the center of ring R, and is joined with a steering shaft SS. Spokes S connect ring R and boss area B. Two of the four spokes S are arranged at the left hand side of steering wheel W7 whereas the rest of spokes S are arranged at the right hand side. Underneath wheel body 101 is a lower cover 111 made from synthetic resin for covering the lower side of boss area B.

Unless otherwise specified, the up-down direction in the seventh and eighth embodiments corresponds to the up-down direction extending along the axial direction of steering shaft SS. The front-rear direction corresponds to the front-rear direction running orthogonal to the axial direction of steering shaft SS being steered straight ahead. The left-right direction corresponds to the left-right direction running orthogonal to the axial direction of steering shaft SS being steered straight ahead. To describe a ring plane RP or a top plane of ring R not based on steering shaft SS, steering wheel W7 is joined to steering shaft SS with ring plane RP inclined diagonally downward and rearward from the horizontal plane.

Airbag apparatus M2 includes a folded and housed airbag 113, an inflator 114 for supplying airbag 113 with inflation gas, a pad 115 for covering the folded airbag 113 from above, and a case 116 for housing airbag 113 and inflator 114 and for supporting pad 115. Pad 115 is openable when pushed by the inflated airbag 113. Case 116 is used to mount airbag apparatus M2 on wheel body 101 while having an unillustrated horn switch 117 (FIG. 34) interposed there between. Inflator 114 is actuated by a control device 166 when it detects a collision of vehicle by signals fed from crash sensor 167 (FIG. 24). Upon actuation of inflator 114, airbag 113 pushes and opens pad 115 and projects therefrom, and then expands into a discoid contour thickened at the center and having a greater outer diameter than that of ring R on top of ring R.

Steering wheel body 101 has such a contour that ring R, boss area B and spokes S are interconnected. Wheel body 101 includes a core 102 fabricated of plastically deformable metal such as die-cast light alloy of aluminum or the like. Core 102 includes a ring core 103 arranged at ring R, boss core 104 arranged at boss area B, and spoke cores 107 arranged at spokes S. Ring core 103 and regions of spoke cores 107 in the vicinity of ring R are coated by synthetic resin, thereby providing a coating layer 109. Airbag apparatus M2 is attached to unillustrated mounting seats arranged to connect each pair of front and rear spoke cores 107 in the left hand side and right hand side.

Boss core 104 includes a steel boss 104a through which steering shaft SS is inserted and then fixed by nut N, a tubular region 105 arranged around boss 104 in a generally tubular shape and extending along the axial direction of steering shaft SS, and a plate-shaped region 106 extending from upper side of tubular region 105 outward and orthogonally to the axial direction of steering shaft SS. Spoke cores 107, tubular region 105 and plate-shaped region 106 are integrally die cast. Spoke cores 107 extend from the outer circumference of plate-shaped region 106.

Steering wheel W7 of the seventh embodiment includes an alignment control unit 120 that is adapted to deform when a rear portion RB of ring R is pushed horizontally forward in order to align ring plane RP along the upright or vertical orientation. This movement of ring plane RP into the vertical orientation will be called "vertical alignment" herein below. Alignment control unit 120 is located on a bendable portion 121 ranging over a rear region 105a of tubular region 105 and a rear region 106a of plate-shaped region 106 in the state where the vehicle travels straight ahead. In other words, in this bendable portion 121, upon vertical alignment of ring R, rear region 105a of tubular region 105 constitutes shaft side division 122 which is proximate steering shaft SS whereas rear region 106a of plate-shaped region 106 constitutes ring side division 125 proximate ring R. That is, bendable portion 121 deforms plastically in such a manner as to bring ring side division 125 close to shaft side division 122, thereby causing the vertical alignment of steering wheel W7.

Between shaft side division 122 and ring side division 125 is an adjusting mechanism 140 which adjusts a plastic deformation load required to deform alignment control unit 120 at the vertical alignment. Adjusting mechanism 140 includes a resistive element 145 pinched between shaft side division 122 and ring side division 125 upon the vertical alignment of ring R, and a moving mechanism 141 for moving resistive element 145.

Figure 25A:
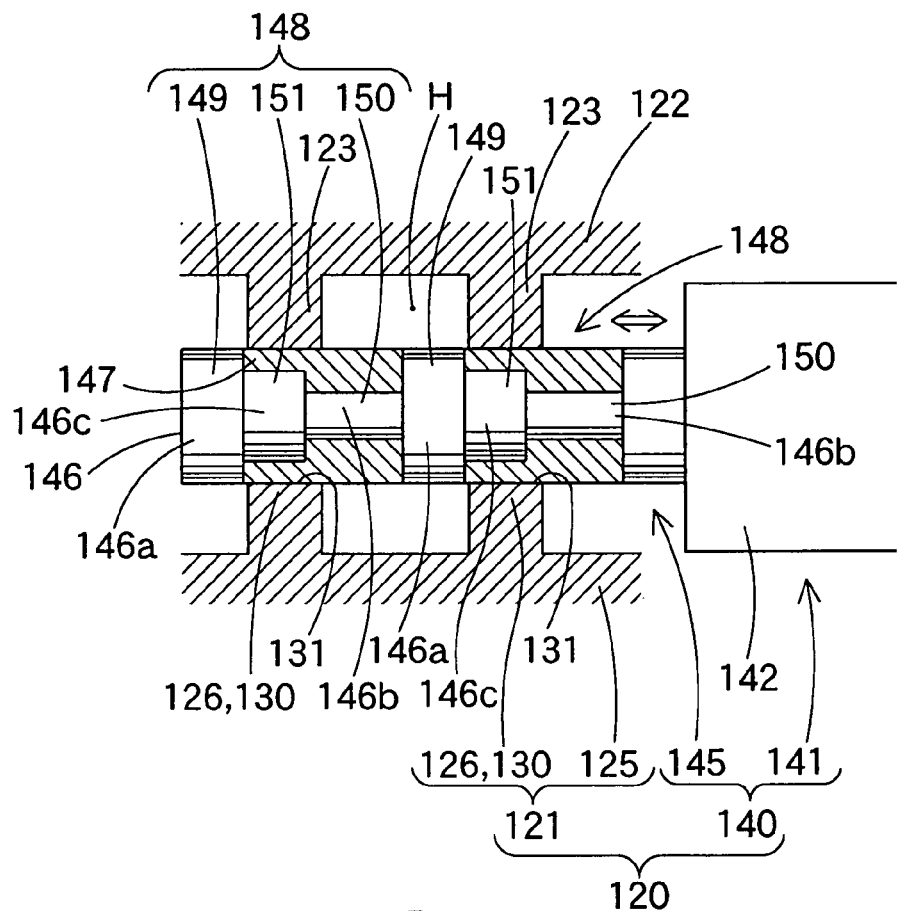
FIGS. 25A and 25B are schematic sections of a resistive element used for the steering wheel of FIG. 22 taken axially along line XXV-XXV of FIG. 23 for explaining an operation of an adjusting mechanism, wherein a plastic deformation load is set medium.
Figure 25B:
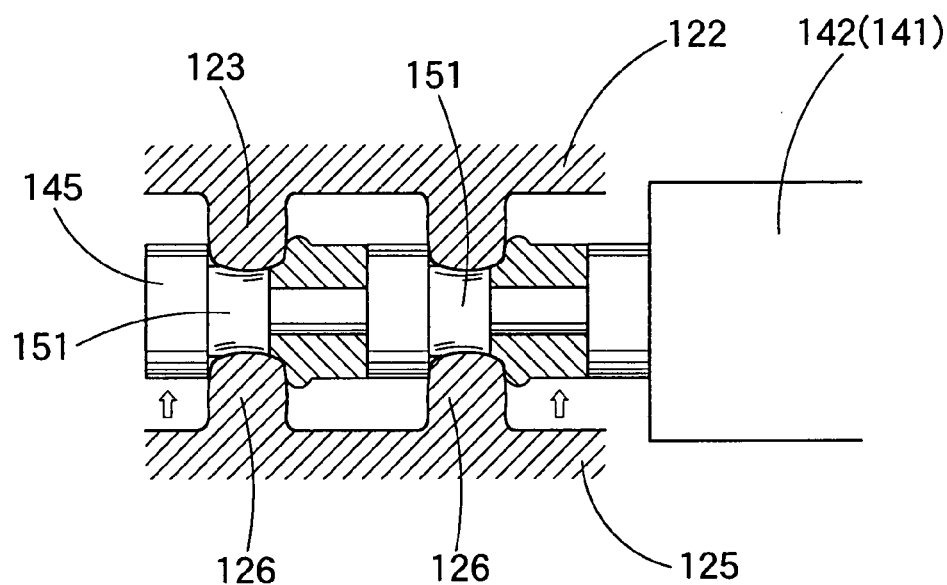

As best shown in FIGS. 25A and 25B, each of shaft side division 122 and ring side division 125 has a butt portion 123/126 projecting to face resistive element 145. Butt portions 123 and 126 are brought close to each other to butt against resistive element 145 forcefully to hold resistive element 145. As shown in FIG. 24, two pairs of butt portions 123 and 126 corresponding to each other are disposed side by side axially of resistive element 145 in a rear part of boss core 104. Furthermore, each of the pairs of corresponding butt portions 123 and 126 are formed into a single rectangular plate-shaped support wall 130. That is, shaft side division 122 and ring side division 125 are coupled with each other through support walls 130. Each of support walls 130 has a through hole 131 for receiving resistive element 145. Rear region 105a of tubular region 105 in an inner circumference of through hole 131 constitutes butt portion 123 of shaft side division 122, whereas rear region 106a of plate-shaped region 106 in the inner circumference of through hole 131 constitutes butt portion 126 of ring side division 125.

Moving mechanism 141 is formed by an actuator 142 such as an electromagnetic solenoid or the like which is capable of returning resistive element 145 to the original position after once operating to move resistive element 145. Actuator 142 is attached to a mounting portion 133 extending from the periphery of rear region 106a of plate-shaped region 106. Operation of actuator 142 is controlled by control device 166 also adapted to actuate inflator 114 of airbag apparatus M2. Actuator 142 holds resistive element 145 by its unillustrated drive unit. Actuator 142 is adapted to move resistive element 145 laterally in such a manner as to make it project as shown in FIG. 26A from the original position shown in FIG. 25A or retract it as shown in FIG. 27A, respectively by a pitch slightly greater than the thickness of support wall 130. Resistive element 145 set in the original position locates a later-described medium load section 151 of shift portion 148 between butt portions 123 and 126. When resistive element 145 is projected as shown in FIG. 26A, it locates a later-described low load section 150 of shift portion 148 between butt portions 123 and 126, whereas when resistive element 145 is moved back as shown in FIG. 27A, it locates a high load section 149 of shift portion 148 between butt portions 123 and 126.

Resistive element 145 is formed into a columnar rod shape. It is held by the above-mentioned drive unit of actuator 142 such that actuator 142 moves resistive element 145 back and forth axially. Resistive element 145 extends along the lateral direction at the rear side of rear region 105a of tubular region 105 and in the lower side of rear region 106a of plate-shaped region 106 in the area of bendable portion 121. Resistive element 145 is so designed as to vary compressive load acting orthogonal to the axial direction of resistive element 145 such that plastic deformation load required to deform alignment control unit 120 is adjusted when the vertical alignment of ring R takes place with resistive element 145 held between shaft side division 122 and ring side division 125. In the seventh embodiment, resistive element 145 includes a shift portion 148 which has a high load section 149, a medium load section 151 and a low load section 150 arranged axially in order so the plastic deformation load or the compressive load are adjustable in three stages. Corresponding to the number of support walls 130, resistive element 145 of the specific embodiment has two shift portions 148 disposed at two positions along the axial direction.

Change of the compressive load in three stages is enabled in this embodiment by varying the sectional area of rigid material of resistive element 145. Specifically, resistive element 145 includes a rod-shaped core member 146 of metal such as steel, and a cladding portion 147 mounted around core member 146 and fabricated of aluminum or the like having less rigidity than core member 146. Outer diameter of core member 146 is varied along the axial direction in three tiers so that resistive element 145 is provided with a large-diameter portion 146a, a medium-diameter portion 146c and a small-diameter portion 146b corresponding to the high, medium and low load values of shift portion 148. Cladding portion 147 is arranged to even the outer diameters of medium-diameter portion 146c and small-diameter portion 146b.

With this resistive element 145, if high load section 149 having high rigidity is held between butt portions 123 and 126 of shaft side division 122 and ring side division 125 when the vertical alignment of ring R takes place, a high deformation load is required to cause such a plastic deformation in alignment control unit 120 as to bring ring side division 125 close to shaft side division 122 as shown in FIGS. 27A and 27B. Plastic deformation in this instance will include a compressive deformation of resistive element 145 toward a direction orthogonal to the axial direction of element 145 caused by being clamped by butt portions 123 and 126, a bending deformation occurring away from butt portions 123 and 126, a compressive, bending, or buckling deformation of butt portions 123 and 126 or further a bending deformation of a crossing portion 128 of shaft side division 122 and ring side division 125 in bendable portion 121, and so on. In short, a high deformation load is required to deform alignment control unit 120 so the vertical alignment of ring R takes place.

If low load section 150 is held between butt portions 123 and 126 of shaft side division 122 and ring side division 125 as shown in FIGS. 26A and 26B at the vertical alignment of ring R, alignment control unit 120 is deformed with a low deformation load. Moreover, if medium load section 151 is held between butt portions 123 and 126 as shown in FIGS. 25A and 25B at the vertical alignment of ring R, the alignment takes place with a medium deformation load.

Figure 28:
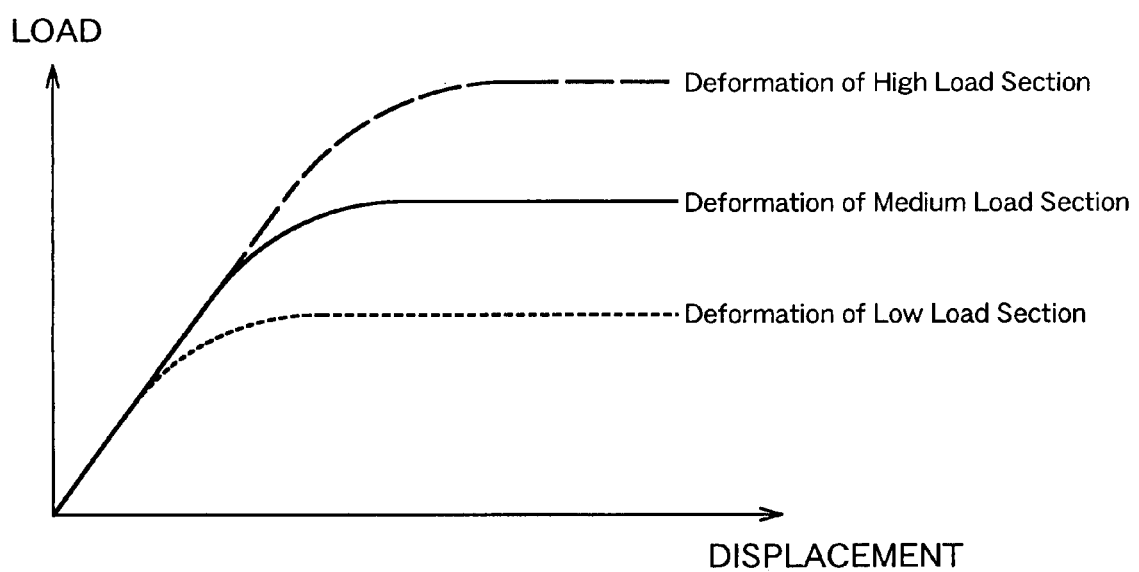
FIG. 28 shows a graph of deformation loads and displacements at the vertical alignment measured with the plastic deformation load set high, medium and low.

FIG. 28 is a graph showing the deformation loads and displacements at the vertical alignment under various conditions. More specifically, the graph shows load values and horizontal displacements of rear portion RB of ring R upon applying a horizontal load to rear portion RB in a state where steering wheel W7 is joined to steering shaft SS.

Operation of actuator 142 of the seventh embodiment is controlled by control device 166 also adapted to actuate inflator 114 of airbag apparatus M2. Control device 166 controls operation of actuator 142 after judging whether the kinetic energy of a driver is large or small. To this end, control device 166 is communicated with and receives signals from driver sensor 156 (FIG. 24) for detecting the size or weight of driver, and which driver sensor 156 includes such a size detecting sensor 157 as image sensor or camera mounted on gauge panel, instrument panel or roof for detecting the size of driver, and a weight sensor 158 mounted on the seat for detecting the weight of driver. Control device 166 also receives signals from a position sensor mounted on the seat or a distance sensor 160 mounted on a meter cluster or a roof for detecting a clearance between steering wheel and driver. Moreover, control device 166 receives signals from a speed sensor mounted on an axle or speed meter, a crash sensor 168 exemplified by an acceleration sensor for detecting an impact on vehicle, and a pre-crash sensor 168 such as a radar mounted on a front bumper for estimating the impact.

If control device 166 estimates a crash based on signals from pre-crash sensor 168, it makes judgment on the amount of kinetic energy of driver. More specifically, if control device 166 detects, based on signals fed from size sensor 157, weight sensor 158, distance sensor 160 and speed sensor 162, that a driver is large, heavy, that the driver is seated away from steering wheel W7, or that the vehicle is traveling fast, the kinetic energy of the driver approaching steering wheel W7 is presumed great. In that case, control device 166 activates actuator 142 of adjusting mechanism 140 to move resistive element 145 such that high load section 149 is disposed between butt portions 123 and 126 of shaft side division 122 and ring side division 125 in the bendable portion 121 as shown in FIG. 27A. If then the driver engages ring R upon impact to align steering wheel W7 vertically as shown in FIGS. 27B and 23 (by double-dotted lines), alignment control unit 120 is plastically deformed with high deformation load. Consequently, great amount of impact energy is absorbed when the ring R aligns itself vertically, thereby reducing the kinetic energy of the driver considerably and cushioning the shock acting upon the driver when the upright ring plane RP receives the driver.

Incidentally, an impact of vehicle is imparted to control device 166 through crash sensor 167, and then control device 166 activates inflator 114 of airbag apparatus M2 to inflate airbag 113 and locate the same on top of ring R. Accordingly, steering wheel W7 aligns itself vertically with airbag 113 interposed between the driver and ring R.

If control device 166 does not receive a signal from crash sensor 167 within a predetermined period of time after detecting a possibility of crash, it judges that the crash is avoided and then activates actuator 142 to return resistive element 145 to the original position shown in FIG. 25A, and makes it prepared for the next chance of crash.

On the other hand, if control device 166 estimates a crash based on signals from pre-crash sensor 168 and then detects, based on signals from the above-described sensors, that a driver is undersized, light, that the driver is seated proximate steering wheel W7, or that the vehicle is traveling at slow speed, the kinetic energy of the driver moving forward and toward steering wheel W7 is presumed small. In that case, control device 166 activates actuator 142 to move resistive element 145 such that low load section 150 is disposed between butt portions 123 and 126 of shaft side division 122 and ring side division 125 as shown in FIG. 26A. If then the driver engages ring R upon impact to align steering wheel W7 vertically as shown in FIGS. 26B and 23, alignment control unit 120 is plastically deformed with low deformation load. Accordingly, the alignment of ring R goes smoothly without pressing the driver unduly with ring R, so that the driver having small kinetic energy is received softly by the upright ring plane RP.

In this case, too, airbag 113 is inflated and located on top of ring R. Accordingly, steering wheel W7 aligns itself vertically with airbag 113 interposed between the driver and ring R. If the crash is avoided, control device 166 activates actuator 142 to return resistive element 145 to the original position shown in FIG. 25A, and makes it prepared for a next chance of crash.

Moreover, if control device 166 estimates a crash while judging that the kinetic energy of a driver is moderate, it does not activate actuator 142 in order to keep resistive element 145 at the original position shown in FIG. 25A, so medium load section 151 is disposed between butt portions 123 and 126 of shaft side division 122 and ring side division 125 in the bendable portion 121. Hence the vertical alignment of ring R takes place with medium deformation load. In this case, resistive element 145 stays at the original position if the crash is avoided.

In the seventh embodiment, therefore, the plastic deformation load required to deform alignment control unit 120 is adjustable by the use of adjusting mechanism 140. With increased deformation load, more impact energy will be absorbed, and with reduced deformation load, less impact energy will be absorbed. Consequently, steering wheel W7 has an adjustable absorption property of impact energy upon the vertical alignment of ring R.

In the seventh embodiment, control device 166 is used to judge the size of kinetic energy of the driver, based on information from driver sensor 156 including size sensor 157 and weight sensor 158, distance sensor 160 and speed sensor 162, and to operate adjusting mechanism 140 and adjust the absorption property of impact energy. However, it will also be appreciated that adjusting mechanism 140 is set manually not using a control device before mounting a steering wheel on a vehicle so the plastic deformation load is adjusted to the vehicle. The steering wheel thus constructed can be used for various vehicles with customized plastic deformation load required for the vertical alignment of steering wheel. In addition, such steering wheels will not need an actuator 142 since resistive element 145 is set manually.

In the seventh embodiment, adjusting mechanism 140 includes resistive element 145 disposed between shaft side division 122 and ring side division 125 upon the vertical alignment of ring R, and moving mechanism 141 or actuator 142 for moving resistive element 145. The deformation load required to cause the vertical alignment of steering wheel W7 is adjusted according to the way resistive element 145 is held between shaft side division 122 and ring side division 125 upon the plastic deformation.

The way resistive element 145 is held upon the plastic deformation is varied depending on whether resistive element 145 is moved by actuator 142 or not, displacement and moving direction of element 145 if it is moved. That is, the absorption property of impact energy is easily varied by determining whether to move resistive element 145 and by adjusting displacement and moving direction of element 145.

In the seventh embodiment, moreover, resistive element 145 includes shift portion 148 that can vary a load required to deform resistive element 145 along the moving direction thereof by actuator 142 when resistive element 145 is held between shaft side division 122 and ring side division 125 upon the plastic deformation. This structure enables the proper adjustment of the plastic deformation load by locating high load section 149, medium load section 151 and low load section 150 of shift portion 148 in a predetermined position.

Figure 29A:
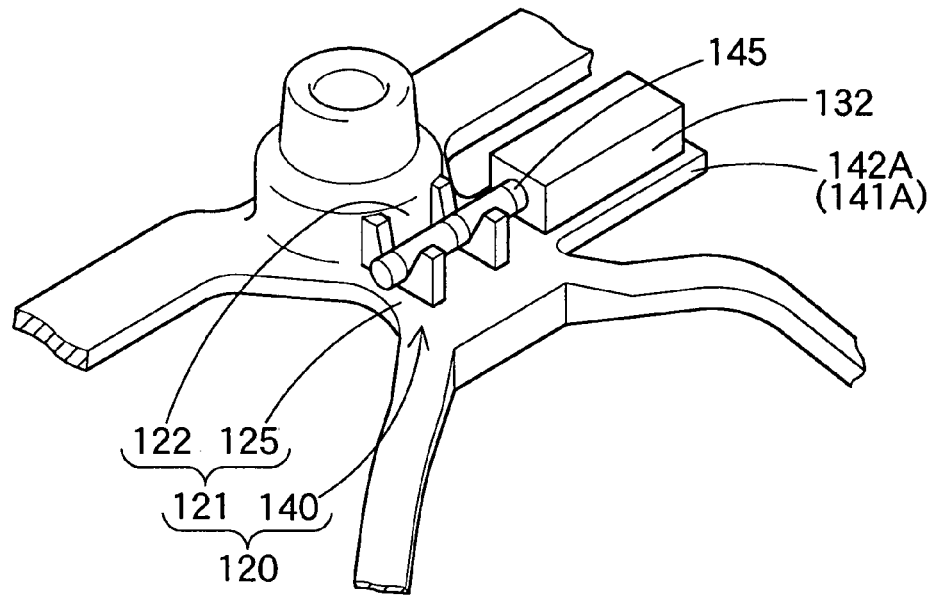
FIGS. 29A and 29B are perspective views of the vicinity of a boss core of a core of a modification of the steering wheel of FIG. 22 as viewed from bottom side for explaining the way the resistive element moves.
Figure 29B:
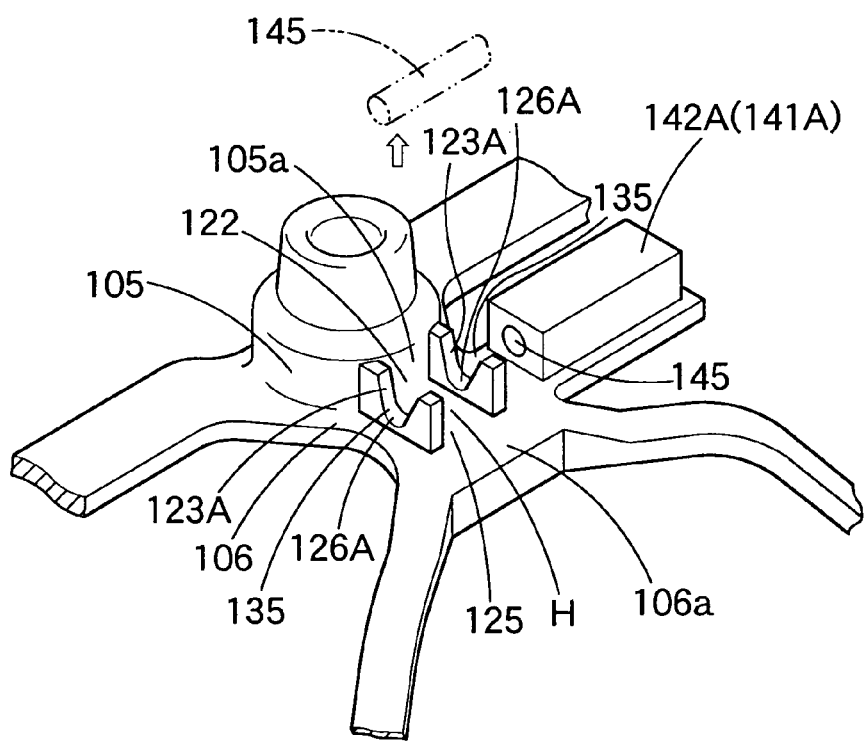

In the seventh embodiment, resistive element 145 serving to adjust the deformation load is constantly located between butt portions 123 and 126 of the shaft side division 122 and ring side division 125. However, it will also be appreciated to locate resistive element 145 off the position between shaft side division 122 and ring side division 125 at the vertical alignment when it is desired to set the deformation load to a minimum. FIGS. 29A and 29B show such an actuator 142A or a moving mechanism 141A wherein resistive element 145 is thoroughly retracted into actuator 142A. High accuracy is not required with respect to where to locate resistive element 145 after removing it from the position between shaft side division 122 and ring side division 125. Accordingly, such arrangement will be made with ease. In addition, the direction to remove resistive element 145 off the position should not be limited to the axial direction of resistive element 145. For example, if an opening 135 is provided between butt portions 123A and 126A for allowing resistive element 145 to move downward orthogonally to the axial direction of resistive element 145, resistive element 145 may move orthogonal to its axial direction as indicated by double-dotted lines in FIG. 29A so it is removed from the position between shaft side division 122 and ring side division 125 so as not to be held by shaft side division 122 and ring side division 125.

In the seventh embodiment, resistive element 145 has a rod-like shape extending orthogonal to the moving direction of ring side division 125 toward shaft side division 122 when alignment control unit 120 is plastically deformed. Each of the shaft side division 122 and ring side division 125 has a butt portion 123/126 to butt against and hold resistive element 145 utilizing part of support walls 130 spaced from each other with a space H (FIG. 24). Two pairs of butt portions 123 and 126 are disposed at two spaced positions along the axis of resistive element 145. With this structure, resistive element 145 is held between shaft side division 122 and ring side division 125 at two positions on its axis upon the plastic deformation. Therefore, resistive element 145 is held more stably in comparison with an instance where it is held at only one position, and bendable portion 121 including butt portions 123 and 126 is plastically deformed in a stable manner.

In the seventh embodiment, actuator 142 of moving mechanism 141 is capable of returning resistive element 145 to the original position after moving resistive element 145. If an impact is once estimated and then avoided, resistive element 145 once moved is returned to the original position. That is, steering wheel W7 is usable repeatedly if resistive element 145 is returned to the original position.

Figure 30A:
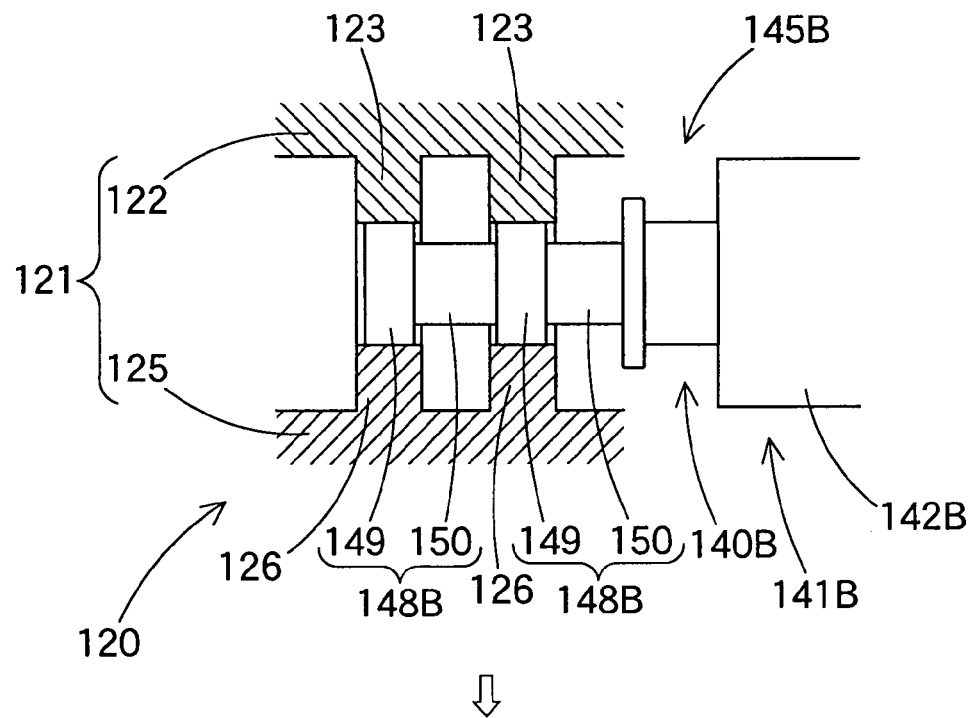
FIGS. 30A and 30B are schematic sections of a resistive element taken axially for explaining the operation of an adjusting mechanism of another modification of the seventh embodiment.
Figure 30B:
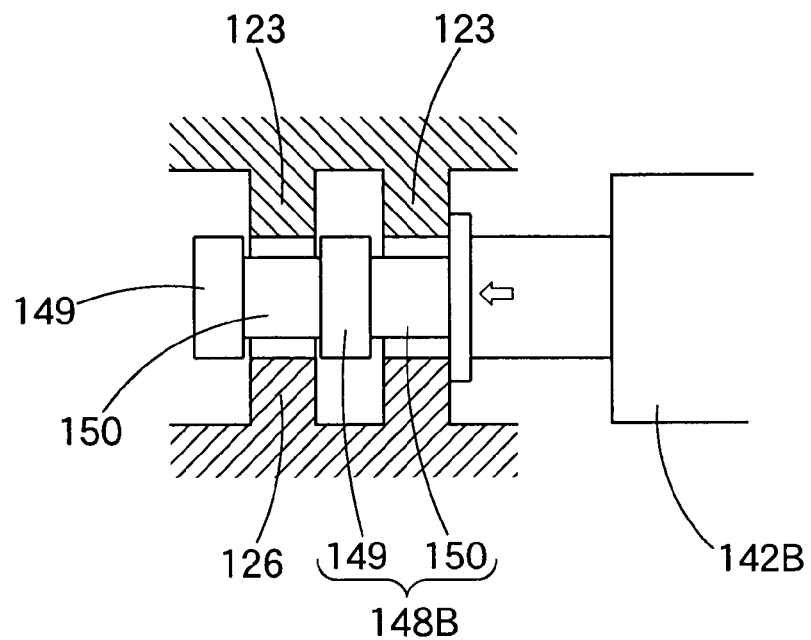

Without considering the return of resistive element 145 to the original position, as shown in FIGS. 30A and 30B, it will be appreciated to use a micro gas generator using pressure of combustion gas generated by ignition as actuator 142B of moving mechanism 141B to move resistive element 145B. Resistive element 145B has a two-tier shift portion 148B having a high load section 149 and a low load section 150. Resistive element 145B, together with moving mechanism 141B, is located between shaft side division 122 and ring side division 125 as an adjusting mechanism 140B so resistive element 145B will be held between the divisions 122 and 125. Resistive element 145B does not include cladding portion 147 unlike resistive element 145 of the seventh embodiment. Before operation, actuator 142B locates high load section 149 between butt portion 123 of shaft side division 122 and butt portion 126 of ring side division 125, and locates low load section 150 between butt portions 123 and 126 upon operation.

Alternatively, such a structure as adjusting mechanism 140C shown in FIGS. 31A and 31B may be adopted. Adjusting mechanism 140C employs an electromagnetic solenoid or the like which is capable of returning to the original position after operation as an actuator 142C or moving mechanism 141C to move resistive element 145C, together with a two-tier shift portion 148C having high load section 149 and low load section 150.

Figure 32A:
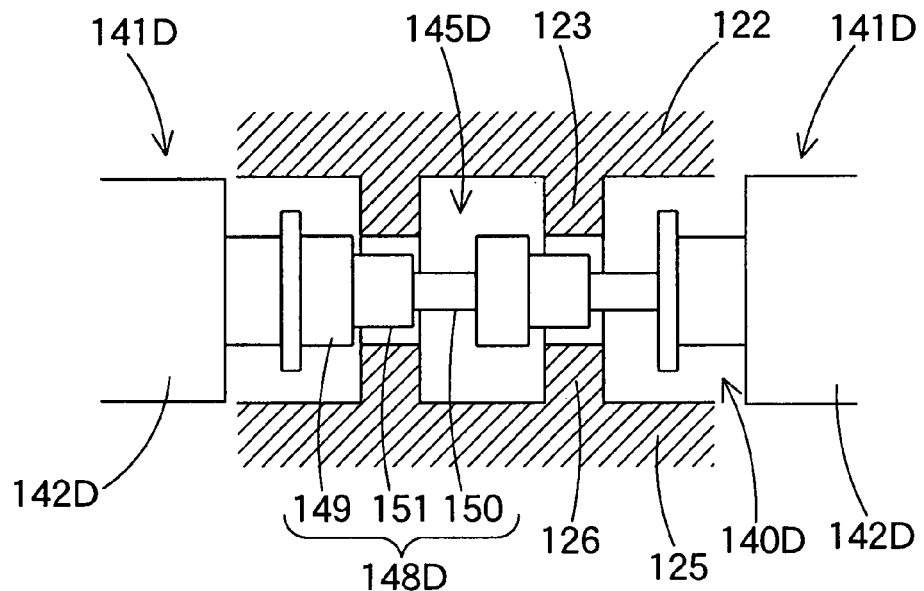
FIGS. 32A, 32B and 32C are schematic sections of a resistive element taken axially for explaining the operation of an adjusting mechanism of still another modification of the seventh embodiment.
Figure 32B:
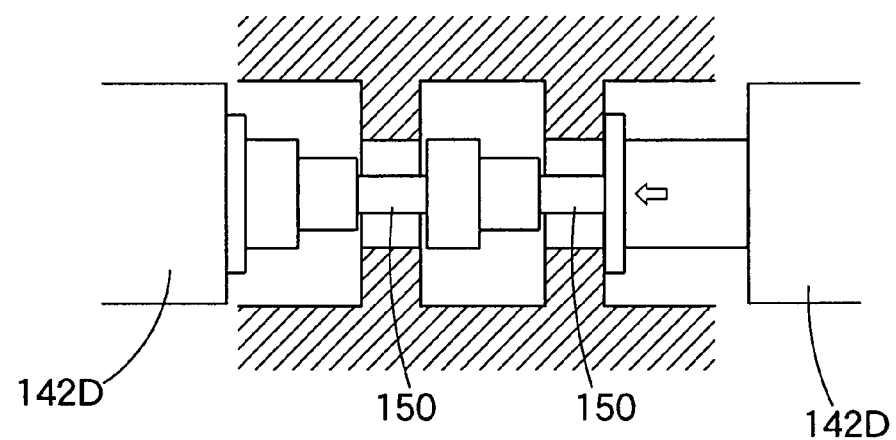
Figure 32C:
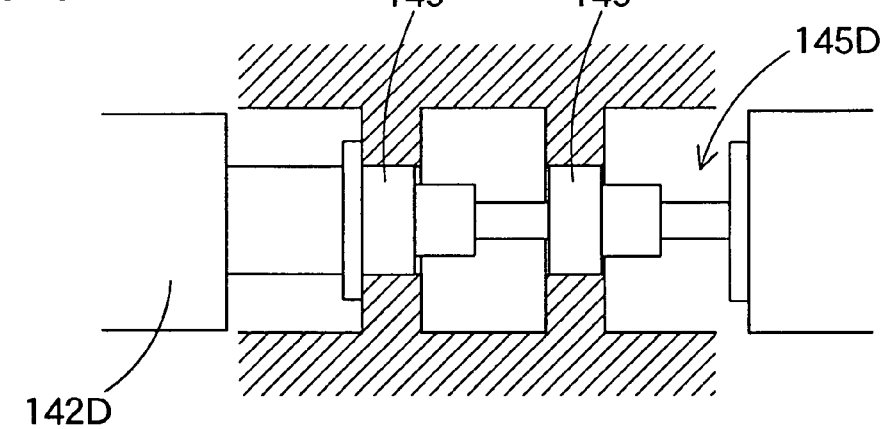

FIGS. 32A, 32B and 32C show a further modification of the seventh embodiment wherein an actuator 142D of a moving mechanism 141D formed of such a micro gas generator as described above is arranged at opposite ends of a resistive element 145D. Resistive element 145D includes a three-tier shift portion 148D having a high load section 149, a low load section 150 and a medium load section 151 though it is unreturnable to the original position after once being moved. Before operation, actuator 142D locates medium load section 151 between butt portion 123 of shaft side division 122 and butt portion 126 of ring side division 125. If actuator 142D arranged at the right hand side in FIG. 32A is operated, low load section 150 is located between butt portions 123 and 126 as shown in FIG. 32B, and if actuator 142D arranged at the left hand side in FIG. 32A is operated, high load section 149 is located between butt portions 123 and 126 as shown in FIG. 32C.

In the seventh embodiment, bendable portion 121 of steering wheel W7 is located in the area of boss core 104. Shaft side division 122 is arranged on the outer circumference of tubular region 105 of boss core 104 extending along the axial direction of steering shaft SS, whereas ring side division 125 is arranged on the lower side of plate-shaped region 106 extending from upper side of tubular region 105 outward and orthogonally to the axial direction of steering shaft SS.

In other words, bendable portion 121 is located on the lower side of boss core 104 positioned proximate steering shaft SS supporting steering wheel W7. With this structure, even if the rigidity of core 102 of steering wheel W7 is enhanced in order to secure the strength in the circumferential direction of steering shaft SS, since the bending deformation load acting upon ring R upon the vertical alignment is likely to concentrate on bendable portion 121, steering wheel W7 will secure a proper strength as a whole.

Figure 33:
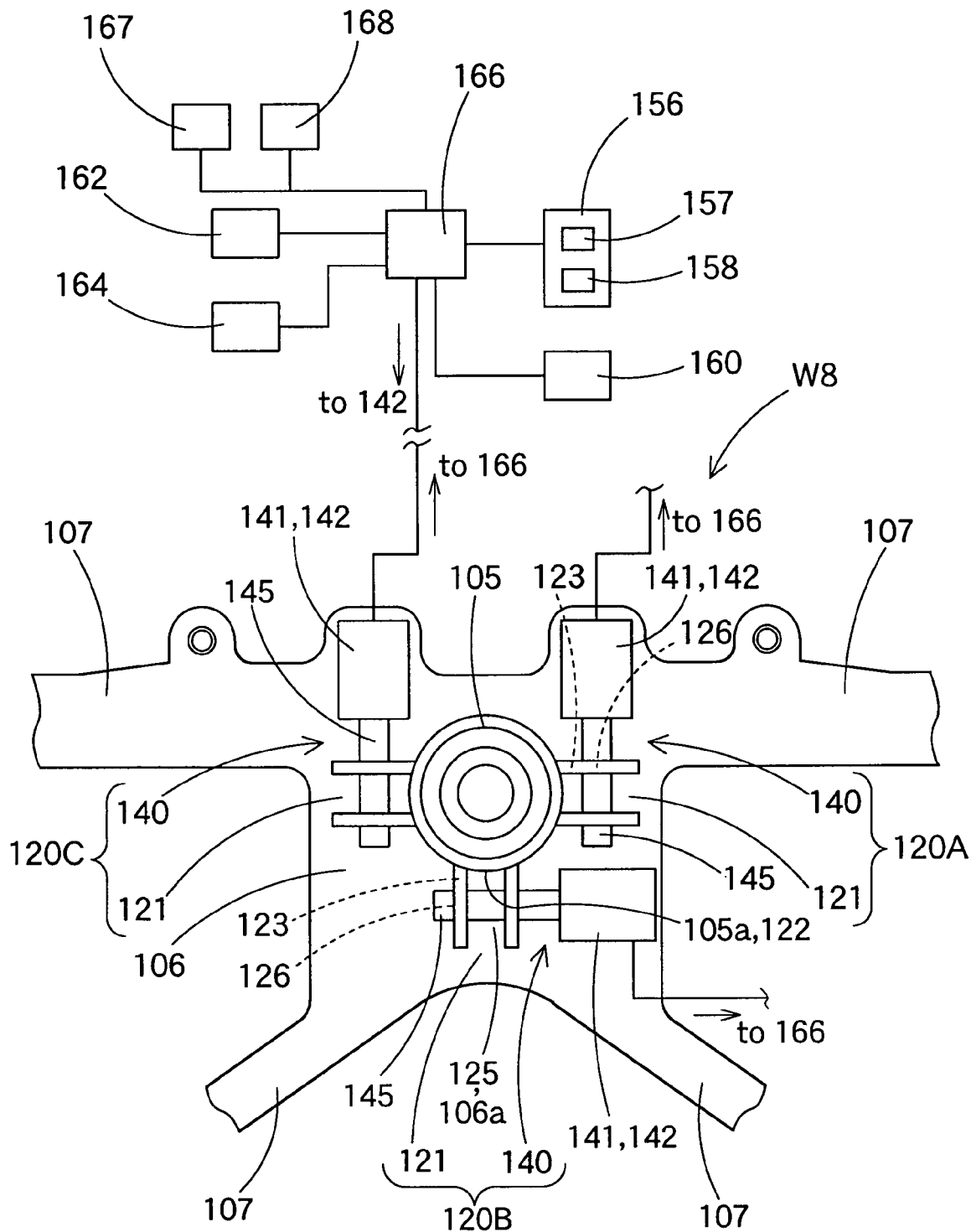
FIG. 33 is a bottom view of the vicinity of a boss core of a core of the steering wheel according to the eighth embodiment.

In the seventh embodiment, steering shaft W7 has only one alignment control unit 120, which includes shaft side division 122, ring side division 125 and adjusting mechanism 140 disposed between shaft side division 122 and ring side division 125, in the rear side of boss core 104 arranged around steering shaft SS being steered straight ahead. However, the steering wheel may include more than one alignment control units 120 as in a steering wheel W8 according to the eighth embodiment shown in FIGS. 33 to 35. Steering wheel W8 includes three alignment control units 120A, 120B and 120C arranged at a rear and lower side of boss core 104, and on left and right spoke cores 107 in the front side of boss core 104. Each alignment control unit 120A, 120B and 120C has a similar structure to that of alignment control unit 120 of the seventh embodiment, and therefore, the description will be omitted by using common reference numerals.

Control device 166 of steering wheel W8 for controlling the operation of actuator 142 is communicated with a rudder angle sensor 164 disposed proximate the lower end of steering shaft SS to receive information on the rudder angle of steering wheel W8. When a driver engages steering wheel W8, control device 166 finds out which alignment control unit is located rearmost as viewed from steering shaft SS depending on the rudder angle judged from signals from rudder angle sensor 164, and decides to operate or not to operate adjusting mechanism 140 of the alignment control units 120A/120B/120C located rearmost, and if it decides to operate the adjusting mechanism, decides on the moving direction so the plastic deformation load is adjusted. The absorption of impact energy is thus determined depending on the kinetic energy of driver.

Figure 34:
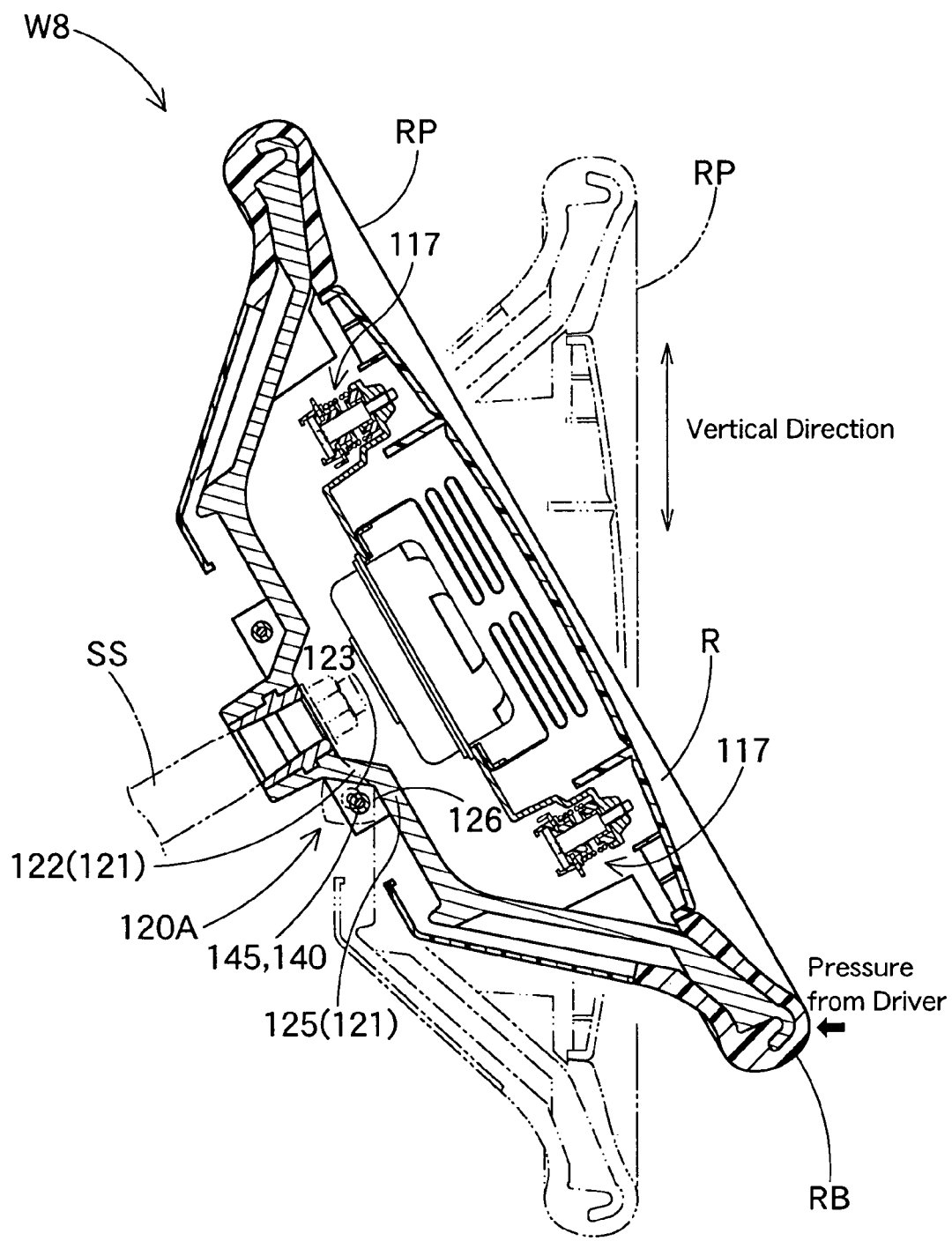
FIG. 34 illustrates the steering wheel of the eighth embodiment aligned vertically at the time the wheel is steered leftward.
Figure 35:
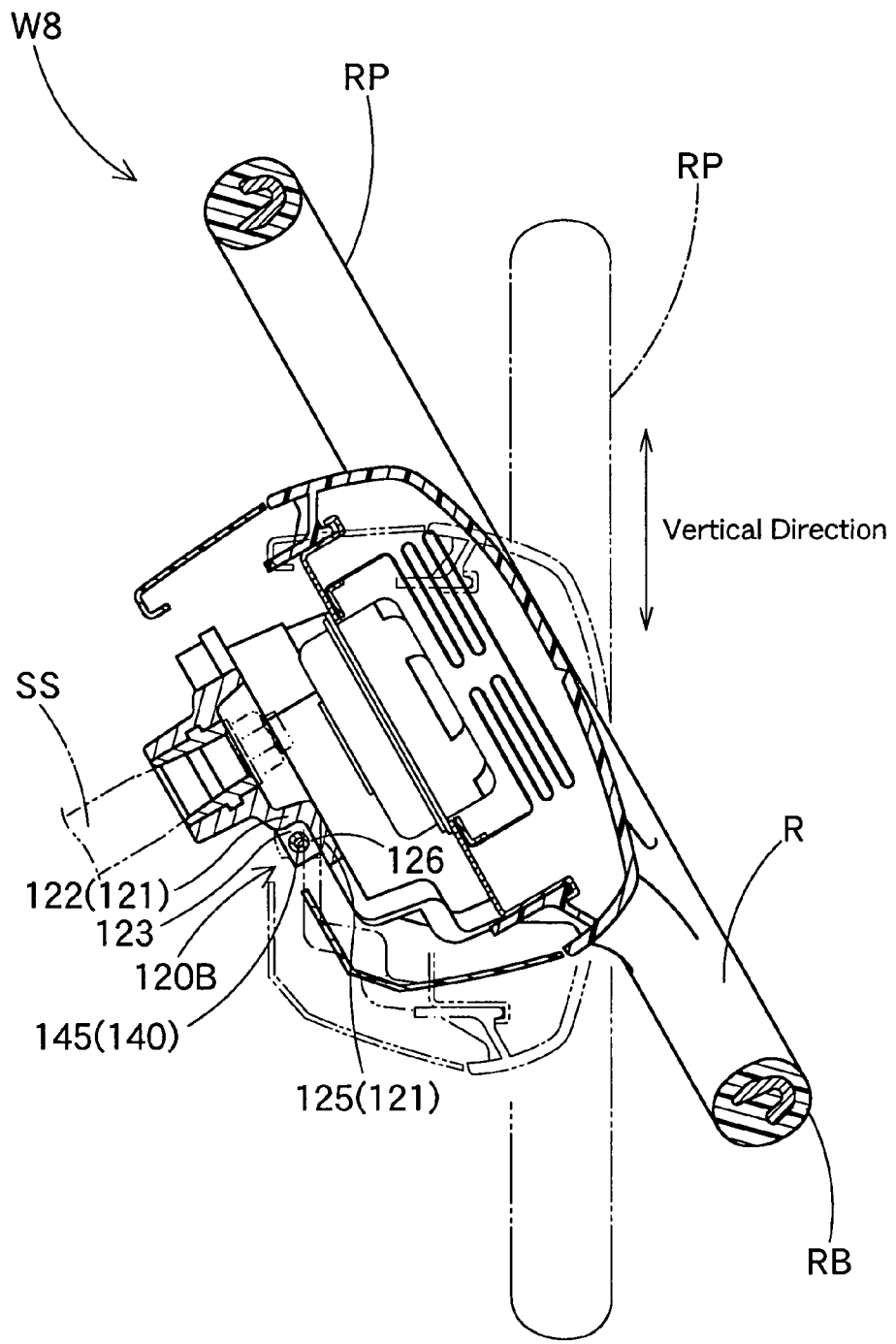
FIG. 35 illustrates the steering wheel of the eighth embodiment aligned vertically at the time the wheel is steered straight ahead.

For instance, if a driver engages steering wheel W8 in a condition where wheel W8 is turned leftward at 90 degree angle as shown in FIG. 34, the plastic deformation takes place on alignment control unit 120A, which is disposed at left hand side when the vehicle is traveling straight ahead, such that ring side division 125 is brought close to shaft side division 122 and resistive element 145 is held between butt portions 123 and 126. Therefore, the deformation load is adjusted on alignment control unit 120A. If the driver engages steering wheel W8 during a straight-ahead driving, the plastic deformation takes place on alignment control unit 120B disposed at the rear side as shown in FIG. 35. Therefore, the deformation load is adjusted on alignment control unit 120B.

That is, steering wheel W8 of the eighth embodiment is prepared not only for an impact during straight-ahead driving, but also for an impact during the driving with wheel W8 turned. In either case, a region of bendable portions 121 proximate rear portion RB of ring R to engage an abdomen of driver is plastically deformed to cause the vertical alignment of steering wheel W8. In addition, the deformation load is adjusted by adjusting mechanism 140 depending on the kinetic energy of driver.

In the seventh and eighth embodiment, a columnar solid core material 146 is used as resistive element 145. However, the resistive element may be fabricated of a hollow tubular material, or a rod material having a V-shaped or U-shaped section. Moreover, the shift portion of the resistive element to change the plastic deformation load may be formed by using stuffing material or cladding material in addition to varying the sectional area of the resistive element.

Figure 36:
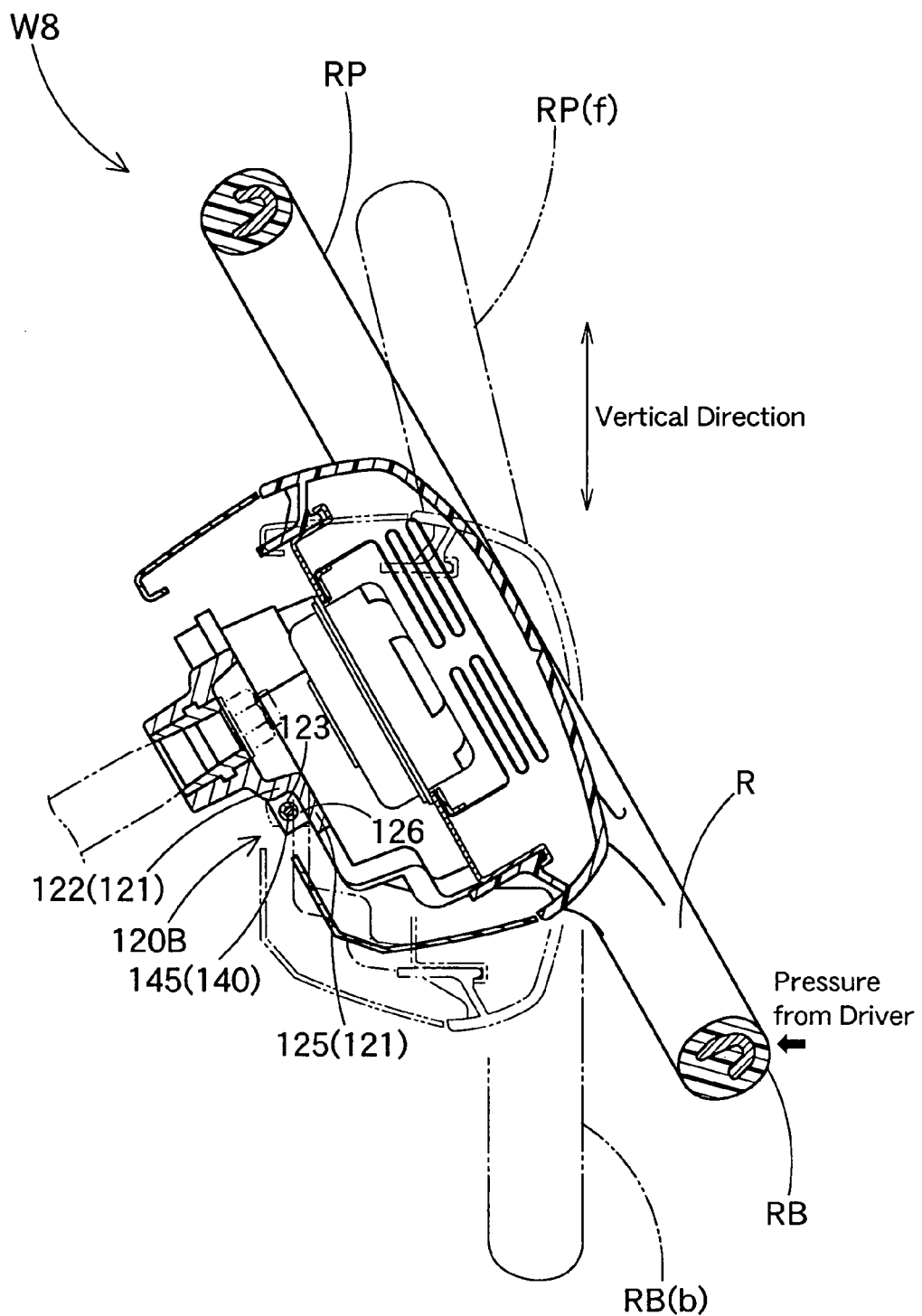
FIG. 36 illustrates a modification of the eighth embodiment.

In steering wheels W7 and W8 of the seventh and eighth embodiments, the entire ring plane RP is aligned generally vertically when a pressure is applied to rear portion RB of ring R. However, the ring plane RP does not necessarily have to be aligned vertically as a whole as long as it is displaced in such a manner that the absorption property of impact energy is adjusted upon the plastic deformation of the alignment control unit. For example, as a alignment control unit 120B shown in FIG. 36, a whole or part of ring plane RP(b) at least in the rear part RB of ring R may be displaced into the upright orientation while leaving a ring plane RP(f) in the front part disposed diagonally.

If the entire ring plane RP is aligned vertically when ring R engages a driver, nevertheless, an upper body of the driver will be received by the flat and wide ring plane RP while the reaction force is suppressed.

In the seventh and eighth embodiments, ring plane RP is aligned along the vertical direction upon the plastic deformation. However, upon the plastic deformation, ring plane RP does not necessarily have to be aligned along the exact vertical direction. Instead, a front part of ring R may be located slightly front side or rear side of a right-above position of rear part RB of ring R. Ring plane RP after the alignment is nevertheless most desirably arranged along the vertical direction because with that arrangement ring plane RP expanded wide and upright is disposed orthogonal to the forward and horizontal moving direction of the upper body of driver upon an impact of vehicle, so that ring plane RP aligned vertically is disposed head-on against the front side of upper body of driver. That is, the upper body of driver will be received by an entire ring plane RP evenly while the reaction force is suppressed.

What is claimed is:

1. A steering wheel comprising a wheel body joined to a steering shaft and an airbag apparatus,
   the wheel body includes as components a ring for holding at steering operation, a boss disposed proximate a center of the ring to be coupled to the steering shaft, and a spoke connecting the ring and the boss,
   when the boss is coupled to the steering shaft, a ring plane on top of the ring is disposed diagonally downward and rearward,
   the wheel body is divided into a shaft side division disposed proximate the steering shaft and joined to the steering shaft, and a ring side division disposed proximate the ring, the ring side division being rotatable with respect to the shaft side division such that the ring plane is aligned along the vertical direction,
   the boss includes a rotation drive mechanism that rotates the ring side division to align the ring plane generally vertically,
   the airbag apparatus includes an inflatable airbag and is disposed on top of the boss of the wheel body,
   the airbag when inflated expands from inside of the ring toward outside of the ring, and is formed greater than an outer diameter of the ring, and
   the rotation drive mechanism completes its operation to align the ring plane generally along the vertical direction by the time a driver contacts the inflated airbag in the course of forward motion.

2. The steering wheel of claim 1, wherein:
   the rotation drive mechanism comprises a rotary axis about which the ring rotates, the rotary axis extending along the lateral direction when the steering wheel is steered straight ahead; and
   the rotation drive mechanism is activated only when the steering wheel is steered straight ahead.

3. The steering wheel of claim 2 wherein:
   the rotation drive mechanism further comprises an actuator for pressing and rotating the ring side division downward; and the rotary axis is disposed forward relative to the steering shaft whereas the actuator is disposed rearward relative to the steering shaft.

4. The steering wheel of claim 1 wherein:
the steering wheel comprises a control device for activating the rotation drive mechanism, the control device being capable of estimating a crash before an actual crash; and
the control device returns the ring side division to the original position if the actual crash is avoided after the rotation drive mechanism is once operated.

5. The steering wheel of claim 1 wherein the airbag apparatus is attached to the ring side division.

6. The steering wheel of claim 1, wherein:
when the inflated airbag receives the driver moving forward, the rotation drive mechanism holds the ring side division at a position where the ring plane is aligned generally vertically.

7. The steering wheel of claim 1, wherein:
in the course the inflated airbag receives the driver moving forward, the rotation drive mechanism stops controlling the movement of the ring side division after once rotating the ring side division, such that the ring side division is allowed to return toward an original position.

8. The steering wheel of claim 1, wherein:
in the course the inflated airbag receives the driver moving forward, the rotation drive mechanism rotates the ring side division once moved to return toward an original position and holds the ring side division at a point on the way back.

9. The steering wheel of claim 1, wherein:
the rotation drive mechanism allows for a return of the ring side division once moved toward an original position; and
when the rotation drive mechanism determines a position of the ring side division on the way back to the original position, the rotation drive mechanism adjusts an angle of the ring plane from the vertical direction depending upon the driver to be received by the airbag.

10. A steering wheel comprising:
a ring for holding at steering operation,
a boss disposed proximate a center of the ring to be coupled to the steering shaft,
a spoke connecting the ring and the boss,
an alignment control unit plastically deformed when the steering wheel contacts with a driver moving forward such that a ring plane formed on top of the ring is aligned generally along the vertical direction, the alignment control unit comprising an adjusting mechanism adjusting a plastic deformation load required to deform the alignment control unit at the alignment of the ring plane.

11. The steering wheel of claim 10 wherein:
the steering wheel further comprises a control device for activating the adjusting mechanism, the device being capable of detecting a size of kinetic energy of the driver approaching the ring; and
the control device activates the adjusting mechanism to adjust the deformation load depending on the size of the kinetic energy of the driver.

12. The steering wheel of claim 10, wherein:
the steering wheel includes a core interconnecting the ring, the boss and the spoke, the core comprising a bendable region bendable in such a manner as to bring the ring side division close to the shaft side division;
the alignment control unit is located on the bendable region;
the adjusting mechanism comprises:

a resistive element held between the shaft side division and the ring side division when the alignment control unit is plastically deformed, and a moving mechanism for moving the resistive element; and
the moving mechanism moves the resistive element such that the deformation load required to deform the alignment control unit is adjusted depending on the way the resistive element is held between the shaft side division and the ring side division when the alignment control unit is plastically deformed.

13. The steering wheel of claim 12, wherein:
when the plastic deformation load is set to a minimum, the moving mechanism removes the resistive element from a position between the shaft side division and the ring side division at the plastic deformation of the alignment control unit.

14. The steering wheel of claim 12, wherein:
the resistive element comprises a shift portion varying a load required to deform the resistive element along a moving direction of the resistive element when the resistive element is held between the shaft side division and the ring side division upon the plastic deformation of the alignment control unit.

15. The steering wheel of claim 12, wherein:
the resistive element has a rod-like shape extending orthogonal to a moving direction of the ring side division toward the shaft side division when the alignment control unit is plastically deformed; and
each of the shaft side division and ring side division has a butt portion to butt against and hold the resistive element at two spaced positions on an axis of the resistive element.

16. The steering wheel of claim 12, wherein:
the moving mechanism is capable of returning the resistive element to an original position after once moving the resistive element.

17. The steering wheel of claim 12, wherein:
the bendable portion is located in a boss core disposed in the boss area of the core;
the boss core includes a tubular region extending along the axial direction of the steering shaft and a plate-shaped region extending from an upper side of the tubular region outward and orthogonally to the axial direction of the steering shaft; and
the shaft side division is arranged on an outer circumference of the tubular region whereas the ring side division is arranged on a lower side of the plate-shaped region.

18. The steering wheel of claim 17, wherein:
the steering wheel comprises more than one alignment control units around the steering shaft, each of which unit including the shaft side division, the ring side division and the adjusting mechanism disposed between the shaft side division and the ring side division; and
the plastic deformation takes place in one of the alignment control units located rearward of the steering shaft with the plastic deformation load adjusted by the adjusting mechanism.

19. The steering wheel of claim 10, wherein:
the alignment control unit is plastically deformed such that the ring plane of at least a rear part of the ring is aligned vertically.

20. The steering wheel of claim 10, wherein:
the alignment control unit is plastically deformed such that the entire ring plane is aligned vertically.

* * * * *